United States Statutory Invention Registration [19]

[11] Reg. Number: H817

Toriuchi et al. [43] Published: Sep. 4, 1990

[54] PHOTOGRAPHIC LIGHT-SENSITIVE MATERIAL

[75] Inventors: Masaharu Toriuchi; Keizo Koya, both of Kanagawa, Japan

[73] Assignee: Fuji Photo Film Co., Ltd., Minami-Ashigara, Japan

[21] Appl. No.: 188,576

[22] Filed: Apr. 29, 1988

[30] Foreign Application Priority Data

Apr. 30, 1987 [JP] Japan ..... 62-104497

[51] Int. Cl.[5] ..... G03C 1/08; G03C 7/26; G03C 7/32

[52] U.S. Cl. ..... 430/544; 430/546; 430/955; 430/956; 430/957; 430/958; 430/959; 430/960

[58] Field of Search ..... 430/505, 443, 493, 542, 430/544, 546, 564, 600, 603, 613, 955, 957, 958, 627, 956, 959, 960

[56] References Cited

U.S. PATENT DOCUMENTS

| | | | |
|---|---|---|---|
| 3,619,195 | 11/1971 | Von Campen | 430/505 |
| 3,926,436 | 12/1975 | Monbaliu et al. | 430/548 |
| 3,984,245 | 10/1976 | Hirose et al. | 430/957 |
| 4,193,795 | 3/1980 | Campbell et al. | 430/958 |
| 4,201,589 | 5/1980 | Sakaguchi et al. | 430/566 |
| 4,214,047 | 7/1980 | Chen | 430/536 |
| 4,340,664 | 7/1982 | Monbaliu et al. | 430/548 |
| 4,358,533 | 11/1982 | Tokitou et al. | 430/546 |
| 4,368,258 | 1/1983 | Fujiahara et al. | 430/546 |
| 4,369,243 | 1/1983 | Credner et al. | 430/561 |
| 4,450,223 | 5/1984 | Van Poucke et al. | 430/223 |
| 4,551,423 | 11/1985 | Koyama et al. | 430/223 |
| 4,612,278 | 9/1986 | Lau et al. | 430/548 |
| 4,729,936 | 3/1988 | Kitaguchi et al. | 430/955 |
| 4,770,990 | 9/1988 | Nakamura et al. | 430/955 |
| 4,783,396 | 11/1988 | Nakamura et al. | 430/353 |

FOREIGN PATENT DOCUMENTS

| | | | |
|---|---|---|---|
| 0220746 | 5/1987 | European Pat. Off. . | |
| 1088257 | 5/1986 | Japan | 430/955 |

OTHER PUBLICATIONS

Research Disclosure 19551, Jul., 1980.

*Primary Examiner*—John F. Terapane
*Assistant Examiner*—Philip Tucker
*Attorney, Agent, or Firm*—Sughrue, Mion, Zinn, Macpeak & Seas

[57] ABSTRACT

A photographic light-sensitive material comprising a support having provided thereon at least one silver halide emulsion layer, wherein said light-sensitive material contains:

(1) a compound represented by formula (I):

$$PWR\text{-}(Time)_t PUG \quad (I)$$

wherein PWR represents a group capable of releasing $\text{-}(Time)_t PUG$ upon being reduced; PUG represents a photographically useful group; Time represents a group capable of releasing PUG through a reaction subsequent to the release from PWR in the form of $\text{-}(Time)_t PUG$; and t represents 0 or 1, and (2) a polymer comprising at least 10 repeating units derived from the same monomer and having a molecular weight of 1000 or more. The photographic light-sensitive material exhibits both high activity of a compound capable of releasing a photographically useful group during development processing and preservation stability before development processing.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PHOTOGRAPHIC LIGHT-SENSITIVE MATERIAL

FIELD OF THE INVENTION

This invention relates to a photographic light-sensitive material, and more particularly it to use of a novel compound in a photographic light-sensitive material.

BACKGROUND OF THE INVENTION

As is well known, a variety of photographically useful compounds are used in photographic materials. Included therein is a group of compounds which are converted to different compounds through photographic processing steps, such as development, fixation, and washing, to release a photographically useful compound that can be used to complete photographic processing. A number of compounds belonging to this group are known and have been put into practical use. The photographically useful compounds include, for example, image forming dyes, filter dyes, sensitizing dyes, development inhibitors, antifoggants, development accelerators, silver halide solvents, redox compounds, hardening agents, discoloration inhibitors, and many others. Some of them release such a photographically useful compound upon being reduced during processing steps. For example, in the case of an image forming dye-releasing compound, it is reduced to release a dye in areas where silver development does not occur while it is not reduced and no dye is released in areas where silver development proceeds. As a result, there is obtained a reverse of a developed silver image. Likewise, a development inhibitor-releasing compound or an anti-foggant-releasing compound releases a development inhibitor to effectively inhibit silver fog in areas where silver development proceeds a little while a development inhibitor is not released in areas where silver development actively proceeds or is necessary thereby to eliminate adverse effects, such as development retardation.

It is required that the above-described compound capable of releasing a photographically useful group upon being reduced should be combined with a reducing agent and, in many cases, the both compounds are incorporated in the same layer or layers adjacent to each other so that a redox reaction may take place between them in an appropriate stage of processing to reduce the photographically useful group-releasing compound.

However, because they exist in close proximity with each other, they unavoidably undergo gradual reaction with each other during long-term preservation. In particular, if activity is increased in an attempt to make the rate or quantity of the release during processing higher, preservation stability is further deteriorated. Thus, preservation stability and activity are counteractive. It has been, therefore, keenly demanded to develop a technique which achieves both high activity during processing and preservation stability.

SUMMARY OF THE INVENTION

One object of this invention is to provide a photographic light-sensitive material which exhibits high activity during processing and satisfactory preservation stability.

It has now been found that the above object of this invention can be accomplished by a photographic light-sensitive material comprising a support having provided thereon at least one silver halide emulsion layer, wherein said light-sensitive material contains:

(1) a compound represented by formula (I):

$$\text{PWR}\text{-}(\text{Time})_t\text{PUG} \qquad \text{(I)}$$

wherein PWR represents a group capable of releasing (Time—$_t$PUG upon being reduced; PUG represents a photographically useful group; Time represents a group capable of releasing PUG through a reaction subsequent to the release from PWR in the form of —Time—$_t$PUG; and t represents 0 or 1, and (2) a polymer comprising at least 10 repeating units derived from the same monomer and having a molecular weight of 1000 or more.

DETAILED DESCRIPTION OF THE INVENTION

The group represented by PWR may be any of: (1) the group that corresponds to a moiety containing an electron accepting center and an intramolecular nucleophilic displacement center in a compound capable of releasing a photographic reagent through reduction followed by intramolecular nucleophilic displacement as disclosed in U.S. Pat. Nos. 4,139,379, 4,139,389 and 4,564,577 and Japanese Patent Application (OPI) No. 185333/84 and 84453/82 (the term "OPI" as used herein means "unexamined published Japanese Patent Application"); (2) the group that corresponds to a moiety containing an electron accepting quinoid center and a carbon atom connecting the quinoid center to a photographic reagent in a compound capable of releasing a photographic reagent through reduction followed by intramolecular electron transfer as disclosed in U.S. Pat. No. 4,232,107, Japanese Patent Application (OPI) No. 101649/84, *Research Disclosure,* No. 24025, IV (1984), and Japanese Patent Application (OPI) No. 88257/86; (3) the group that corresponds to a moiety containing an aryl group substituted with an electron attractive group and an atom (a sulfur, carbon or nitrogen atom) connecting the substituted aryl group to a photographic reagent in a compound capable of releasing a photographic reagent through reduction followed by cleavage of its single bond as disclosed in West German Patent Application (OLS) No. 3,008,588, Japanese Patent Application (OPI) No. 142530/81, and U.S. Pat. Nos. 4,343,893 and 4,619,884; (4) the group that corresponds to a moiety containing a nitro group and a carbon atom connecting the nitro group to a photographic reagent in a nitro compound capable of releasing a photographic reagent after electron acceptance as disclosed in U.S. Pat. No. 4,450,223; and (5) the group that corresponds to a moiety containing a gem-dinitro group and a carbon atom connecting the dinitro group to a photographic reagent in a dinitro compound capable of $\beta$-eliminating a photographic reagent after electron acceptance as disclosed in U.S. Pat. No. 4,609,610.

The groups represented by $\text{-}(\text{Time})_t$ and PUG will be described later.

Of the compounds represented by formula (I), preferred are those represented by formula (II):

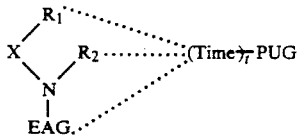

(II)

wherein X represents an oxygen atom, a sulfur atom or a nitrogen-containing group of formula —N($R_3$)—; $R_1$, $R_2$, and $R_3$ each represents a mere bond or a group other than a hydrogen atom; EAG represents an electron accepting group; or $R_1$, $R_2$, $R_3$ and EAG are connected to each other to form a ring; Time represents a group capable of releasing PUG upon cleavage of the N—X bond through a reaction subsequent to the release from the rest of the compound in the form of $\text{-(Time)}_t\text{PUG}$; PUG and t are as defined above; when t is 0, Time represents a mere bond; and the dotted lines represent possible bonds, provided that at least one dotted line is a bond.

In formula (II),

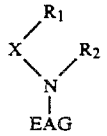

corresponds to PWR of formula (I). $(\text{Time})_t$PUG is bonded to at least one of $R_1$ $R_2$, and EAG.

The group other than a hydrogen atom as represented by $R_1$, $R_2$, and $R_3$ includes a substituted or unsubstituted alkyl or aralkyl group (e.g., methyl, trifluoromethyl, benzyl, chloromethyl, dimethylaminomethyl, ethoxycarbonylmethyl, aminomethyl, acetylaminomethyl, ethyl, 2-(4-dodecanoylaminophenyl)ethyl, carboxyethyl, allyl, 3,3,3-trichloropropyl, n-propyl, isopropyl, butyl, isobutyl, sec-butyl, t-butyl, n-pentyl, sec-pentyl, t-pentyl, cyclopentyl, n-hexyl, sec-hexyl, t-hexyl, cyclohexyl, n-octyl, sec-octyl, t-octyl, n-decyl, n-undecyl, n-dodecyl, n-tetradecyl, n-pentadecyl, n-hexadecyl, sec-hexadecyl, t-hexadecyl, n-octadecyl, and t-octadecyl groups), a substituted or unsubstituted alkenyl group (e.g., vinyl, 2-chlorovinyl, 1-methylvinyl, 2-cyanovinyl, and cyclohexen-1-yl groups), a substituted or unsubstituted alkynyl group (e.g., ethynyl, 1-propynyl, and 2-ethoxycarbonylethynyl groups), a substituted or unsubstituted aryl group (e.g., phenyl, naphthyl, 3-hydroxyphenyl, 3-chlorophenyl, 4-acetylaminophenyl, 4-hexadecanesulfonylaminophenyl, 2-methanesulfonyl-4-nitrophenyl, 3-nitrophenyl, 4-methoxyphenyl, 4-acetylaminophenyl, 4-methanesulfonylphenyl, 2,4-dimethylphenyl, and 4-tetradecyloxyphenyl groups), a substituted or unsubstituted heterocyclic group (e.g., 1-imidazolyl, 2-furyl, 2-pyridyl, 5-nitro-2-pyridyl, 3-pyridyl, 3,5-dicyano-2-pyridyl, 5-tetrazolyl, 5-phenyl-1-tetrazolyl; 2-benzothiazolyl, 2-benzimidazolyl, 2-benzoxazolyl, 2-oxazolin-2-yl, and morpholino groups), a substituted or unsubstituted acyl group (e.g., acetyl, propionyl, butyroyl, isobutyroyl, 2,2-dimethylpropionyl, benzoyl, 3,4-dichlorobenzoyl, 3-acetylamino-4-methoxybenzoyl, methylbenzoyl, and 4-methoxy-3-sulfobenzoyl groups), a substituted or unsubstituted sulfonyl group (e.g., methanesulfonyl, ethanesulfonyl, chloromethanesulfonyl, propanesulfonyl, butanesulfonyl, n-octanesulfonyl, n-dodecanesulfonyl, n-hexadecanesulfonyl, benzenesulfonyl, 4-toluenesulfonyl, and 4-n-dodecyloxybenzenesulfonyl groups), a substituted or unsubstituted carbamoyl group (e.g., carbamoyl, methylcarbamoyl, dimethylcarbamoyl, bis(2-methoxyethyl)carbamoyl, diethylcarbamoyl, cyclohexylcarbamoyl, di-n-octylcarbamoyl, 3-dodecyloxypropylcarbamoyl, hexadecylcarbamoyl, 3-(2,4-di-t-pentylphenoxy)propylcarbamoyl, 3-octanesulfonylaminophenycarbamoyl, and di-n-octadecylcarbamoyl groups), a substituted or unsubstituted sulfamoyl group (e.g., sulfamoyl, methylsulfamoyl, dimethylsulfamoyl, diethylsulfamoyl, bis(2-methoxyethyl)sulfamoyl, di-n-butylsulfamoyl, methyl-n-octylsulfamoyl, n-hexadecylmethylsulfamoyl, 3-ethoxypropylmethylsulfamoyl, N-phenyl-N-methylsulfamoyl, 4-decyloxyphenylsulfamoyl, and methyloctadecylsulfamoyl group), and the like.

$R_1$ and $R_3$ each preferably represents a substituted or unsubstituted alkyl, alkenyl, alkynyl, aryl, heterocyclic, acyl or sulfonyl group, etc. $R_1$ and $R_3$ each preferably contains 1 to 40 carbon atoms.

$R_2$ preferably represents a substituted or unsubstituted acyl or sulfonyl group and preferably contains 1 to 40 carbon atoms.

X preferably represents an oxygen atom.

$R_1$, $R_2$, $R_3$, and EAG may be taken together to form a ring.

More preferred among the compounds represented by formula (II) are those represented by formula (III):

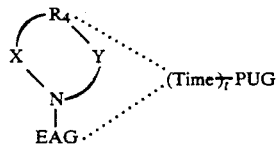

(III)

wherein Y represents a divalent linking group, and preferably

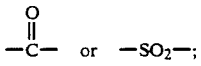

$R_4$ represents an atom group forming a 5- to 8-membered nitrogen-containing monocyclic or condensed heterocyclic ring together with X and Y; X, t, EAG, Time, PUG, and the dotted lines are as defined above.

In formula (III),

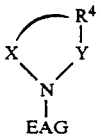

corresponds to PWR in formula (I), and —Time—$_t$-PUG is bonded to at least one of $R_4$ and EAG.

Specific and preferred examples of the heterocyclic ring formed by X, Y, $R_4$, and N are shown below.

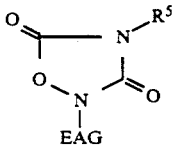

-continued
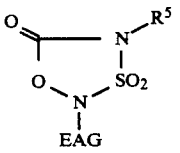
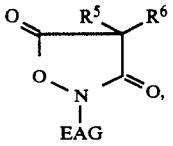
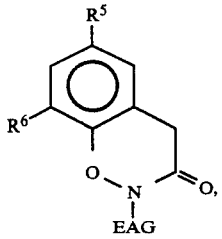
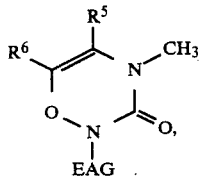
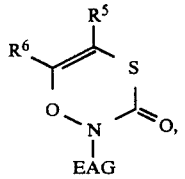
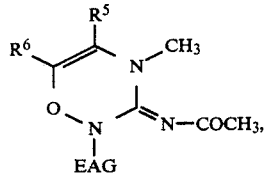
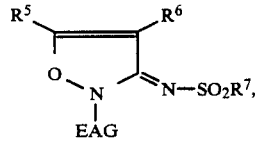
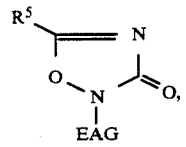
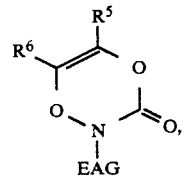
-continued
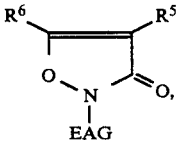
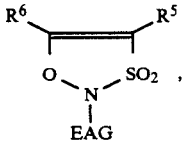
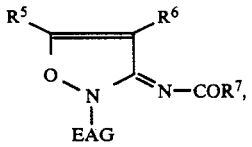
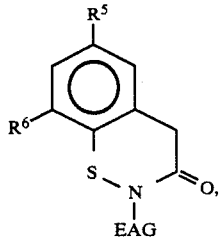
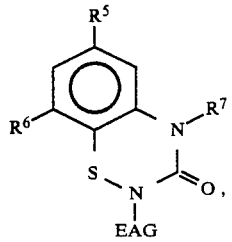
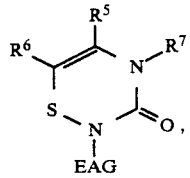
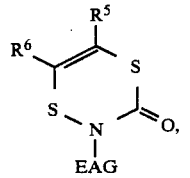
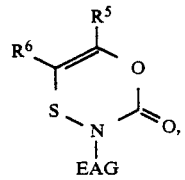

-continued
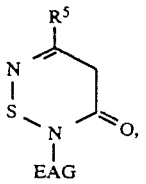
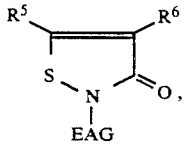
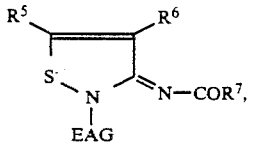
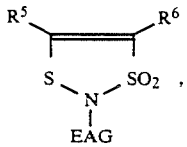
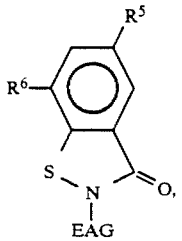
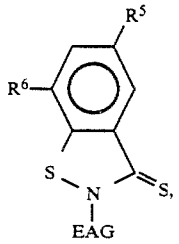
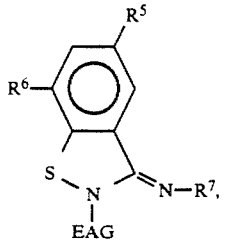
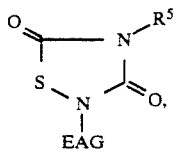
-continued
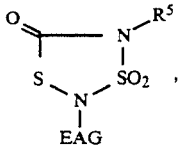
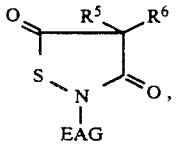
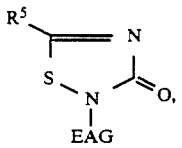
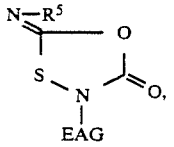
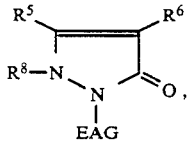
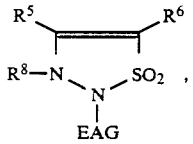
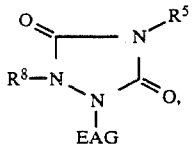
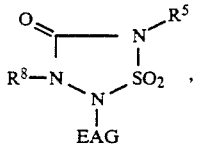
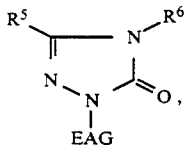
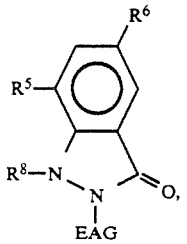

-continued
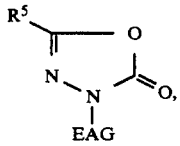
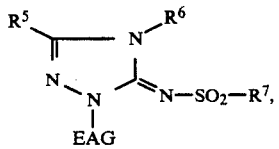
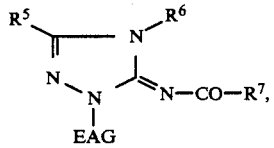
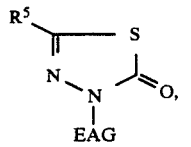
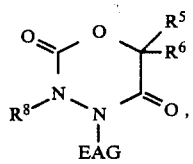
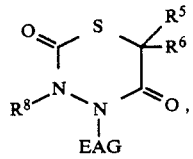
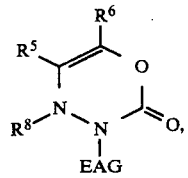
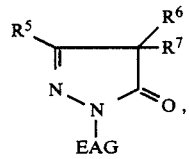
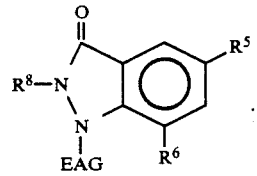
wherein $R^5$, $R^6$, and $R^7$ each represents a hydrogen atom, an alkyl group, an aryl group or a heterocyclic group; and $R^8$ represents an acyl group or a sulfonyl group.
Particularly preferred examples of these heterocyclic rings are shown below, in which the bonding position of $\text{-}(\text{Time})_t\text{PUG}$ is also shown.
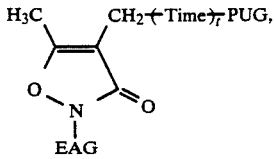
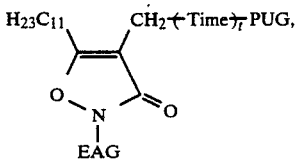
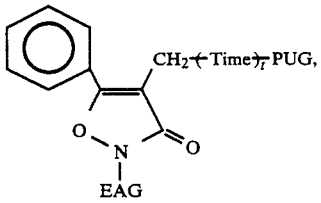
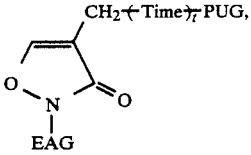
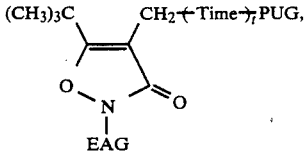
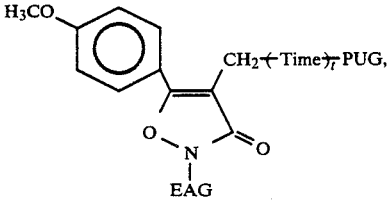
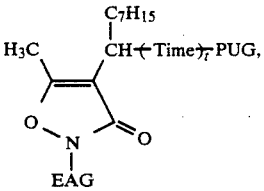
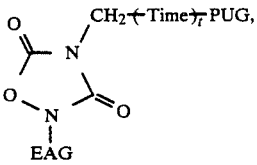

-continued
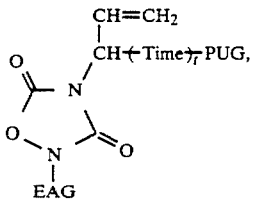
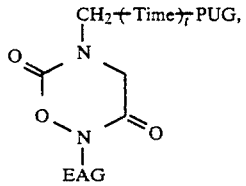
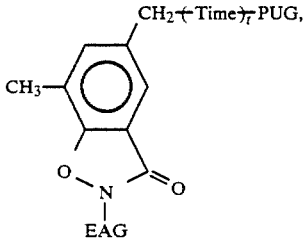
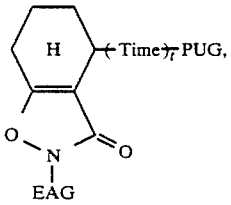
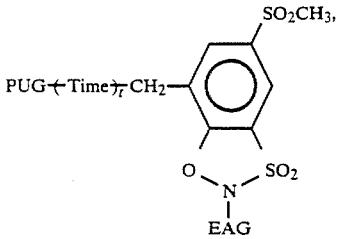
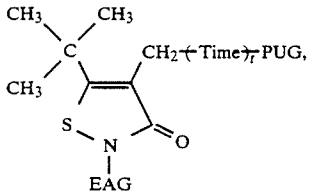
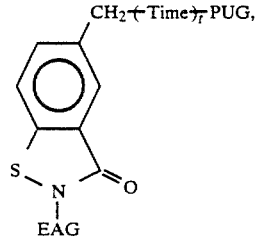
-continued
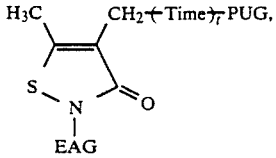
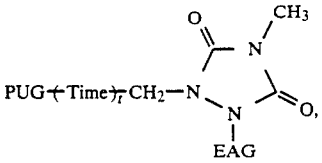
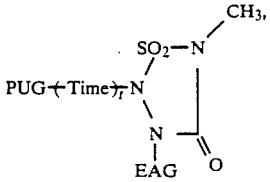
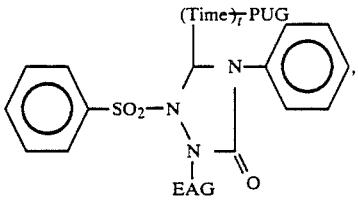
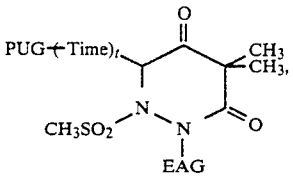
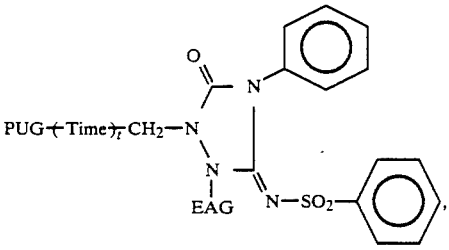
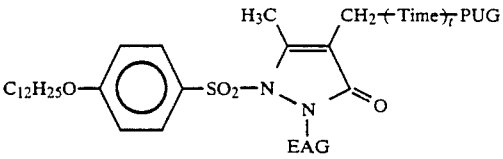
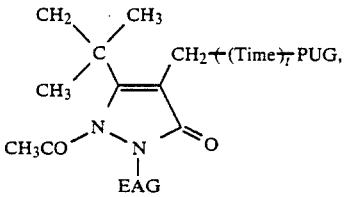

-continued

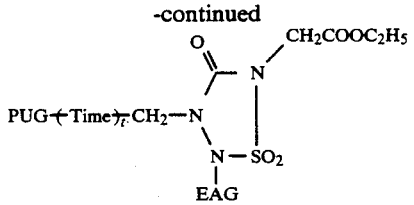

In the foregoing formulae, EAG represents an aromatic group which accepts an electron from a reducing substance and is bonded to the nitrogen atom. EAG preferably includes a group represented by formula (A)

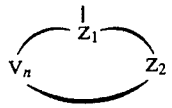

(A)

wherein $Z_1$ represents

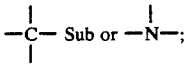

$V_n$ represent an atom group forming a 3- to 8-membered aromatic ring together with $Z_1$ and $Z_2$; n represents an integer of from 3 to 8, $V_3$ is $—Z_3—$, $V_4$ is $—Z_3—Z_4—$, $V_5$ is $—Z_3—Z_4—Z_5—$, $V_6$ is $—Z_3—Z_4—Z_5—Z_6—$, $V_7$ is $—Z_3—Z_4—Z_5—Z_6—Z_7—$, $V_8$ is $—Z_3—Z_4—Z_5—Z_6—Z_7—Z_8—$; $Z_2$, $Z_3$, $Z_4$, $Z_5$, $Z_6$, $Z_7$, and $Z_8$ each represents

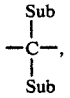

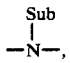

—O—, —S— or $—SO_2—$; and Sub represents a mere bond ($\pi$—bond), a hydrogen atom or a substituent hereinafter described for EAG, provided that when more than one Sub is present, each is the same or different or they are connected to each other to form a 3- to 8-membered saturated or unsaturated carbon ring or heterocyclic ring.

In formula (A), the substituent represented by Sub is selected so that a sum of Hammett's sigma constant and Hammett's para constant is at least +0.50, preferably at least +0.70, and more preferably at least +0.85.

EAG preferably represents an aryl or heterocyclic group substituted with at least one electron attractive group. The substituent on the aryl or heterocyclic group can be taken advantage of for controlling physical properties of the compound as a whole, such as easiness of electron acceptance, water solubility, oil solubility, diffusibility, sublimating property, melting point, dispersibility in a binder (e.g., gelatin), reactivity to a nucleophilic group, reactivity to an electrophilic group, and the like.

Specific examples of the aryl group substituted with at least one electron attractive group are nitrophenyl, 2-nitrophenyl, 2-nitro-4-N-methyl-N-n-butylsulfamoylphenyl, 2-nitro-4-N-methyl-N-n-octylsulfamoylphenyl, 2-nitro-4-N-methyl-N-n-dodecylsulfamoylphenyl, nitro-4-N-methyl-N-n-hexadecylsulfamoylphenyl, 2-nitro-4-N-methyl-N-n-octadecylsulfamoylphenyl, 2-nitro-4-N-methyl-N-(3-carboxypropyl)sulfamoylphenyl, 2-nitro-4-N-ethyl-N-(2-sulfoethyl)sulfamoylphenyl, 2-nitro-4-N-n-hexadecyl-N-(3-sulfopropyl)sulfamoylphenyl, 2-nitro-4-N-(2-cyanoethyl)-N-[(2-hydroxyethoxy)ethyl[sulfamoylphenyl, 2-nitro-4-diethylsulfamoylphenyl, 2-nitro-4-di-n-butylsulfamoylphenyl, 2-nitro-4-di-n-octylsulfamoylphenyl, 2-nitro-4-di-n-octadecylsulfamoylphenyl, 2-nitro-4-methylsulfamoylphenyl, 2-nitro-4-n-hexadecylsulfamoylphenyl, 2-nitro-4-N-methyl-N-(4-dodecylsulfonylphenyl)sulfamoylphenyl, 2-nitro-4-(3-methylsulfamoylphenyl)sulfamoylphenyl, 4-nitro-2-N-methyl-N-n-butylsulfamoylphenyl, 4-nitro-2-N-methyl-N-n-octylsulfamoylphenyl, 4-nitro-2-N-methyl-N-n-dodecylsulfamoylphenyl, 4-nitro-2-N-methyl-N-n-hexadecylsulfamoylphenyl, 4-nitro-2-N-methyl-N-n-octadecylsulfamoylphenyl, 4-nitro-2-N-methyl-N-(3-carboxypropyl)sulfamoylphenyl, 4-nitro-2-N-ethyl-N-(2-sulfoethyl)sulfamoylphenyl, 4-nitro-2-N-n-hexadecyl-N-(3-sulfopropyl)sulfamoylphenyl, 4-nitro-2-N-(2-cyanoethyl)-N-[(2-hydroxyethoxy)ethyl]-sulfamoylphenyl, 4-nitro-2-diethylsulfamoylphenyl, 4-intro-2-di-n-butylsulfamoylphenyl, 4-nitro-2-di-n-octylsulfamoylphenyl, 4-nitro-2-di-n-octadecylsulfamoylphenyl, 4-nitro-2-methylsulfamoylphenyl, nitro-2-n-hexadexylsulfamoylphenyl, 4-nitro-2-N-methyl-N-(4-dodecylsulfonylphenyl)sulfamoylphenyl, 4-nitro-2-(3-methylsulfamoylphenyl)sulfamoylphenyl, 4-nitro-2-chlorophenyl, 2-nitro-4-chlorophenyl, 2-nitro-4-N-methyl-N-n-6-butylcarbamoylphenyl, 2-nitro-4-N-methyl-N-n-octylcarbamoylphenyl, 2-nitro-4-N-methyl-N-n-dodecylcarbamoylphenyl, 2-nitro-4-N-methyl-N-n-hexadecylcarbamoylphenyl, 2-nitro-4-N-methyl-N-n-octadecylcarbamoylphenyl, 2-nitro-4-N-methyl-N-(3-carboxypropyl)carbamoylphenyl, 2-nitro-4-N-ethyl-N-(2-sulfoethyl)carbamoylphenyl, 2-nitro-4-N-n-hexadecyl-N-(3-sulfopropyl)carbamoylphenyl, 2-nitro-4-(2-cyanoethyl)-N-[(2-hydroxyethoxy)ethyl]carbamoylphenyl, 2-nitro-4-diethylcarbamoylphenyl, 2-nitro-4-di-n-butylcarbamoylphenyl, 2-nitro-4-di-n-octylcarbamoylphenyl, nitro-4-di-n-octadecylcarbamoylphenyl, 2-nitro-4-methyl-nitro-4-N-methyl-N-(4-dodecylsulfonylphenyl)carbamoylphenyl, 4-nitro-2-N-methyl-N-n-butylcarbamoylphenyl, nitro-2-N-methyl-N-n-octylcarbamoylphenyl, 4-nitro-2-N-methyl-N-n-dodecylcarbamoylphenyl, 4-nitro-2-N-methyl-N-n-hexadecylcarbamoylphenyl, 4-nitro-2-N-methyl-N-n-octadecylcarbamoylphenyl, 4-nitro-2-N-methyl-N-(3-carboxypropyl) carbamoylphenyl, 4-nitro-2-N-ethyl-N-(2-sulfoethyl)carbamoylphenyl, 4-nitro-2-N-n-hexadecyl-N-(3-sulfopropyl)carbamoylphenyl, 4-nitro-2-N-(2-cyanoethyl)-N-[(2-hydroxyethoxy)ethyl]carbamoylphenyl, 4-nitro-2-diethylcarbamoylphenyl, 4-nitro-2-di-n-butylcarbamoylphenyl, 4-nitro-2-di-n-octylcarbamoylphenyl, 4-nitro-2-di-n-octadecylcarbamoylphenyl, 4-nitro-2-methylcarbamoylphenyl, 4-nitro-2-n-hexadecylcarbamoylphenyl, 4-nitro-2-N-methyl-N-(4-dodecylsulfonylphenyl)carbamoylphenyl, 4-nitro-2-(3-methylsulfamoylphenyl)carbamoylphenyl, 2,4-dimethanesulfonylphenyl, 2-methanesulfonyl-4-benzenesulfonylphenyl, 2-n-octanesulfonyl-4-methanesulfonylphenyl, 2-n-tetradecanesulfonyl-4-methanesulfonylphenyl, 2-n-hexadecanesulfonyl-4-methanesulfonylphenyl, 2,4-di-n-dodecanesulfonylphenyl, 2,4-didodecanesulfonyl-5-trifluoromethylphenyl, 2-n-decanesulfonyl-4-cyano-5-trifluoromethylphenyl, 2-cyano-4-methanesulfonylphenyl, 2,4,6-tricyanophenyl, 2,4-dicyanophenyl, 2-nitro-4-methanesulfonylphenyl, 2-nitro-4-n-dodecanesulfonylphenyl, 2-nitro-4-(2-sulfoethylsulfonyl)phenyl, 2-nitro-4-carboxymethylsulfonylphenyl, 2-nitro-4-carboxyphenyl, 2-nitro-4-ethoxycarbonyl-5-n-butoxyphenyl, 2-nitro-4-ethoxycarbonyl-5-n-hexadecyloxyphenyl, 2-nitro-4-diethylcarbamoyl-5-n-hexadecyloxyphenyl, 2-nitro-4-cyano-5-n-dodecylphenyl, 2,4-dinitrophenyl, 2-nitro-4-n-decylthiophenyl, 3,5-dinitrophenyl, 2-nitro-3,5-dimethyl-4-n-hexadecanesulfonylphenyl, 4-methanesulfonyl-2-benzenesulfonylphenyl, 4-n-octanesulfonyl-2-methanesulfonylphenyl, 4-n-tetradecanesulfonyl-2-methanesulfonylphenyl, 4-n-hexadecanesulfonyl-2-methanesulfonylphenyl, 2,5-didodecanesulfonyl-4-trifluoromethylphenyl, 4-n-decanesulfonyl-2-cyano-5-trifluoromethylphenyl, 4-cyano-2-methanesulfonylphenyl, 4-nitro-2-methanesulfonylphenyl, 4-nitro-2-n-dodecanesulfonylphenyl, 4-nitro-2-(2-sulfoethylsulfonyl)phenyl, 4-nitro-2-carboxymethylsulfonylphenyl, 4-nitro-2-carboxyphenyl, 4-nitro-ethoxycarbonyl-5-n-butoxyphenyl, 4-nitro-2-ethoxycarbonyl-5-n-hexadecyloxyphenyl, 4-nitro-2-diethylcarbamoyl-5-n-hexadecyloxyphenyl, 4-nitro-2-cyano-5-n-dodecylphenyl, 4-nitro-2-n-decylthiophenyl, 4-nitro-3,5-dimethyl-2-n-hexadecanesulfonylphenyl, 4-nitronaphthyl, 2,4-dinitronaphthyl, 4-nitro-2-n-octadecylcarbamoylnaphthyl, 4-nitro-2-dioctylcarbamoyl-5-(3-sulfobenzenesulfonylamino)naphthyl, 2,3,4,5,6-pentafluorophenyl, 2-nitro-4-benzoylphenyl, 2,4-diacetylphenyl, 2-nitro-4-trifluoromethylphenyl, 4-nitro-2-trifluoromethylphenyl, 4-nitro-3-trifluoromethylphenyl, 2,4,5-tricyanophenyl, 3,4-dicyanophenyl, 2-chloro-4,5-dicyanophenyl, 2-bromo-4,5-dicyanophenyl, 4-methanesulfonylphenyl, 4-n-hexadecanesulfonylphenyl, 2-decanesulfonyl-5-trifluoromethylphenyl, 2-nitro-5-methylphenyl, 2-nitro-5-n-octadecyloxyphenyl, 2-nitro-4-N-(vinylsulfonylethyl)-N-methylsulfamoylphenyl, and 2-methyl-6-nitrobenzoxazol-5-yl groups.

Specific examples of the heterocyclic group are 2-pryridyl, 3-pyridyl, 4-pyridyl, 5-nitro-2-pyridyl, 5-nitro-M-hexadecylcarbamoyl-2 -pyridyl, 3,5-dicyano-2-pyridyl, 5-dodecanesulfonyl-2-pyridyl, 5-cyano-2-pyrazyl, 4-nitrothiophen-2-yl, 5-nitro-1,2-dimethylimidazol-4-yl, 3,5-diacetyl-2-pyridyl, 1-dodecyl-5-carbamoylpyridinium-2-yl, 5-nitro-2-furyl, and 5-nitrobenzothiazol-2-yl groups.

The group represented by —Time—$_t$PUG is explained below.

Time represents a group capable of releasing PUG upon cleavage of a nitrogen-oxygen bond, a nitrogen-nitrogen bond or a nitrogen-sulfur bond through a reaction subsequent to the release from PWR in the form of —Time—$_t$PUG.

Various known groups, e.g., those described in Japanese Patent Application (OPI) Nos. 147244/86, 236549/86, and 215270/87, can be exemplified as Time.

PUG represents a photographically useful group either as released from Time or as bonded to Time. The photographically useful groups include development inhibitors, development accelerators, nucleating agents, couplers, diffusion couplers, nondiffusible couplers, desilvering accelerators, desilvering inhibitors, silver halide solvents, competing compounds, developing agents, auxiliary developing agents, fixing accelerators, fixing inhibitors, image stabilizers, toning agents, processing-dependence improving agents, dot improving agents, color image stabilizers, photographic dyes, surface active agents, hardening agents, desensitizers, contrast increasing agents, chelating agents, fluorescent brightening agents, ultraviolet absorbents, and the like, and precursors thereof.

Since many of these photographically useful groups are overlapping with each other in their function, representative examples of these groups are given below.

The development inhibitors include compounds having a mercapto group bonded to a heterocyclic ring, such as substituted or unsubstituted mercaptoazoles (e.g., 1-phenyl-5-mercaptotetrazole, 1-(4-carboxyphenyl)-5-mercaptotetrazole, 1-(3-hydroxyphenyl)-5-mercaptotetrazole, 1-(4-sulfophenyl)-5-mercaptotetrazole, 1-(3-sulfophenyl)-5-mercaptotetrazole, 1-(4-sulfamoylphenyl)mercaptotetrazole, 1-(3-hexanoylaminophenyl)-5-mercaptotetrazole, 1-ethyl-5-mercaptotetrazole, 1-(2-carboxyethyl)-5-mercaptotetrazole, 2-methylthio-5-mercapto-1,3,4-thiadiazole, 2-(2-carboxyethylthio)-5-mercapto-1,3,4-thiadiazole, 3-methyl-4-phenyl-5-mercapto-1,2,4-triazole, (2-dimethylaminoethylthio)-5-mercapto-1,3,4-thiadiazole, 1-(4-n-hexylcarbamoylphenyl)-2-mercaptoimidazole, 3-acetylamino-4-methyl-5-mercapto-1,2,4-triazole, mercaptobenzoxazole, 2-mercaptobenzimidazole, 2-mercaptobenzothiazole, 2-mercapto-6-nitro-1,3-benzoxazole, 1-(1-naphthyl)-5-mercaptotetrazole, 2-phenyl-5-mercapto-1,3,4-oxadiazole, 1-[3-(3-methylureido)phenyl]-5-mercaptotetrazole, 1-(4-nitrophenyl)-5-mercaptotetrazole, 5-(2-ethylhexanoylamino)-2-mercaptobenzimidazole, etc.), substituted or unsubstituted mercaptoazaindenes (e.g., 6-methyl-4-mercapto-1,3,3a,7-tetraazaindene, 6-methyl-2-benzyl-4-mercapto-1,3,3a,7-tetraazaindene, 6-phenyl-4-mercaptotetraazaindene, 4,6-dimethyl-2-mercapto-1,3,3a,7-tetraazaindene, etc.), substituted or unsubstituted mercaptopyrimidines (e.g., 2-mercaptopyrimidine, 2-mercapto-4-methyl-6-hydroxypyrimidine, 2-mercapto-4-propylpyrimidine, etc.), and the like; and heterocyclic compounds capable of forming imino-silver, such as substituted or unsubstituted benzotriazoles (e.g., benzotriazole, 5-nitrobenzotriazole, 5-methylbenzotriazole, 5,6-dichlorobenzotriazole, 5-bromobenzotriazole, 5-methoxybenzotriazole, 5-acetylaminobenzotriazole, butylbenzotriazole, 5-nitro-6-chlorobenzotriazole, dimethylbenzotriazole, 4,5,6,7-tetrachlorobenzotriazole, etc.), substituted or unsubstituted indazoles (e.g., indazole, 5-nitroindazole, 3-nitroindazole, 3-chloro-5-nitroindazole, 3-cyanoindazole, 3-n-butylcarbamoylindazole, 5-nitro-3-methanesulfonylindazole, etc.), substituted or unsubstituted benzimidazoles (e.g., nitrobenzimidazole, 4-nitrobenzimidazole, 5,6-dichlorobenzimidazole, 5-cyano-6-chlorobenzimidazole, 5-trifluoromethyl-6-chlorobenzimidazole, etc.), and the like.

The development inhibitor once released from the compound of formula (I) through an oxidation-reduction reaction and a subsequent reaction in a development processing step may be further converted to a compound having no substantial development inhibitory activity or remarkably reduced development inhibitory activity. Specific examples of this kind are 1-(3-phenoxycarbonylphenyl)-5-mercaptotetrazole, 1-(4-phenoxycarbonylphenyl)-5-mercaptotetrazole, 1-(3-maleinimidophenyl)mercaptotetrazole, 5-(phenoxycarbonyl)benzotriazole, 5-(p-cyanophenoxycarbonyl)benzotriazole, 2-phenoxycarbonylmethylthio-5-mercapto-1,3,4-thiadiazole, 5-nitro-3-phenoxycarbonylindazole, 5-phenoxycarbonyl-2-mercaptobenzimidazole, 5-(2,3-di-chloropropyloxycarbonyl)benzotriazole, 5-benzyloxycarbonylbenzotriazole, 5-butylcarbamoylmethoxycarbonyl)benzotriazole, 5-(butoxycarbonylmethoxycarbonyl)benzotriazole, 1-(4-benzoyloxyphenyl)-5-mercaptotetrazole, 5-(2-methanesulfonylethoxycarbonyl)-2-mercaptobenzothiazole, 1-[4-(2-chloroethoxycarbonyl)phenyl]-2-mercaptoimidazole, 2-[3-(thiophen-2-ylcarbonyl)propyl]-thia-5-mercapto-1,3,4-thiadiazole, 5-cinnamoylaminobenzetriazole, 1-(3-vinylcarbonylphenyl)-5-mercaptotetrazole, 5-succinimidomethylbenzotriazole, 2-(4-succinimidophenyl)-5-mercapto-1,3,4-oxadiazole, 3-[4-(benzo-1,2-isothiazol-3-oxo-1,2-dioxy-2-yl)phenyl]-5-mercapto-4-methyl-1,2,4-triazole, 6-phenoxycarbonyl-2-mercaptobenzoxazole, etc.

The diffusible or nondiffusible dyes as PUG include azo dyes, azomethine dyes, azopyrazolone dyes, indoaniline dyes, indophenol dyes, anthraquinone dyes, triarylmethane dyes, alizarin dyes, nitro dyes, quinoline dyes, indigoid dyes, and phthalocyanine dyes. In addition, leuco compound of these dyes, dyes having the absorption wavelength temporarily shifted, and dye presursors, e.g., tetrazolium salts may also be included. These dyes may form a chelated dye with an appropriate meal. Details of these dyes are described e.g., the U.S. Pat. Nos. 3,880,658, 3,931,144, 3,932,380, 3,932,381, and 3,942,987.

Preferred dyes and precursors thereof are azo dyes, azomethine dyes, and indoaniline dyes, and precursors thereof. Specific examples of preferred dyes and precursors thereof are shown below.

D-1

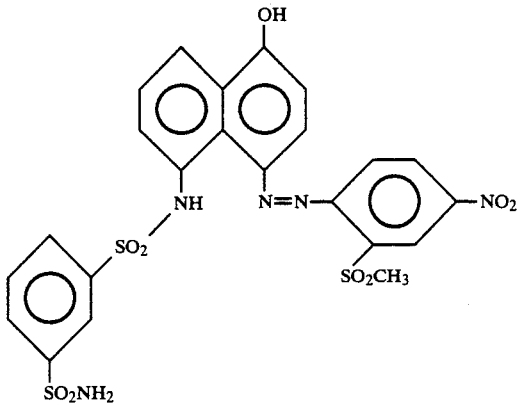

D-2

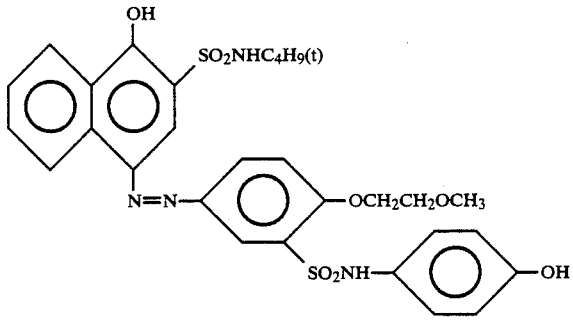

D-3

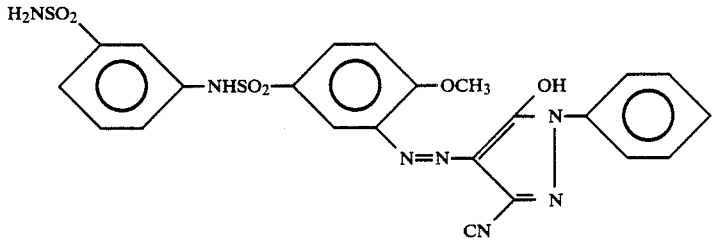

D-4

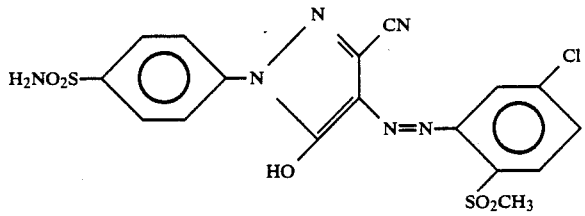

-continued
D-5
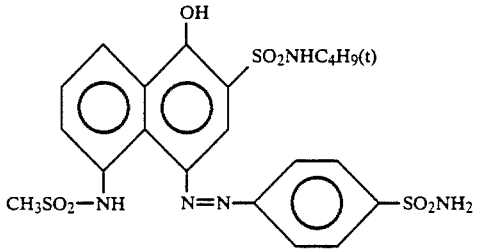
D-6
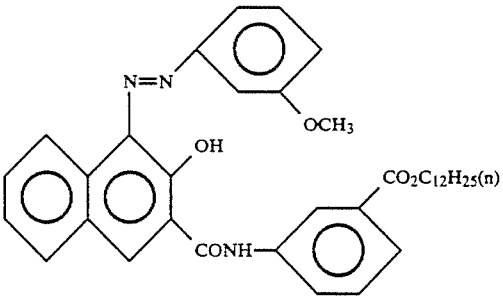
D-7
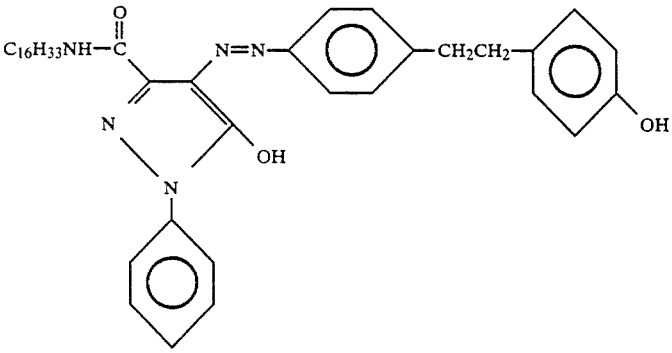
D-8
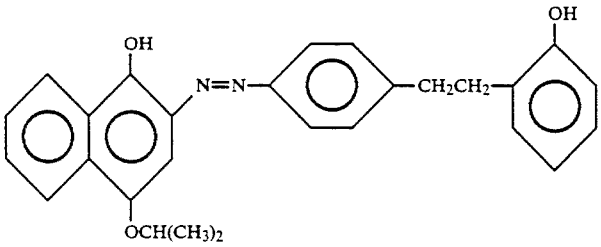
D-9
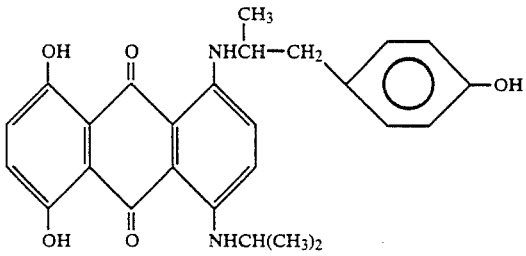

-continued
D-10
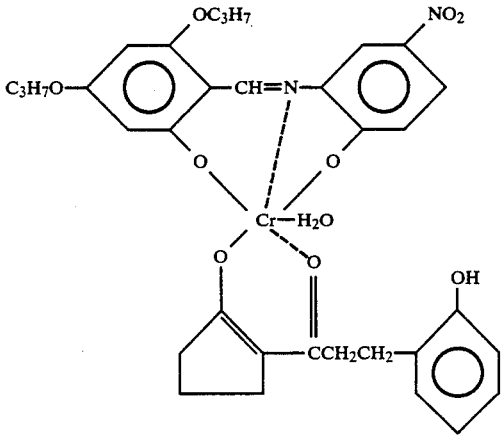
D-11
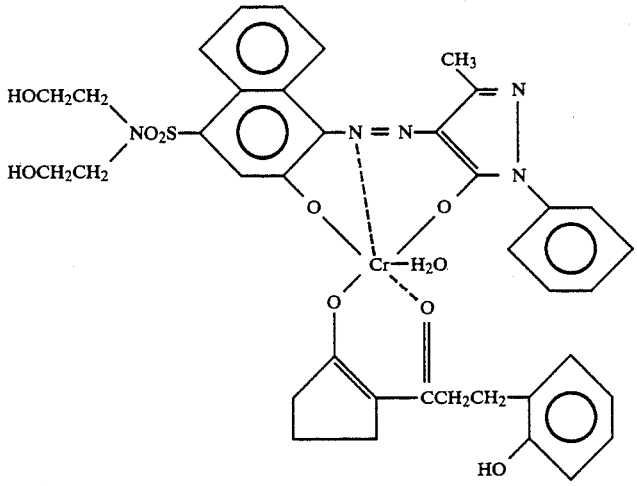
D-12
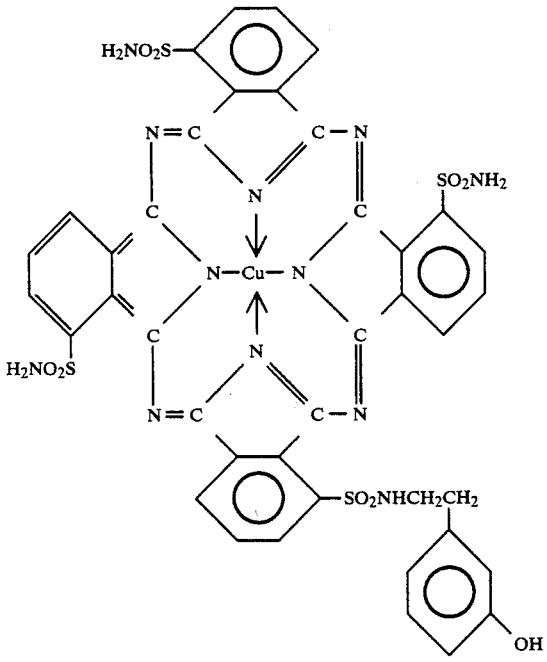

-continued
D-13
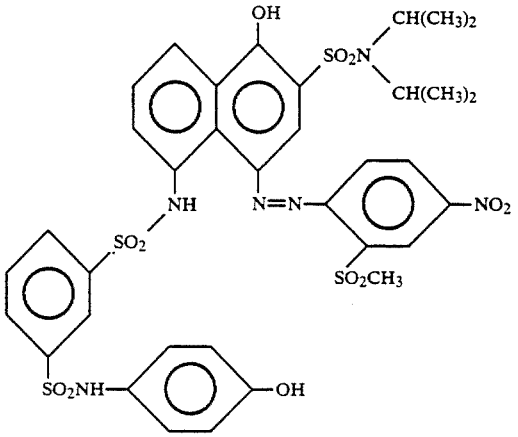
D-14
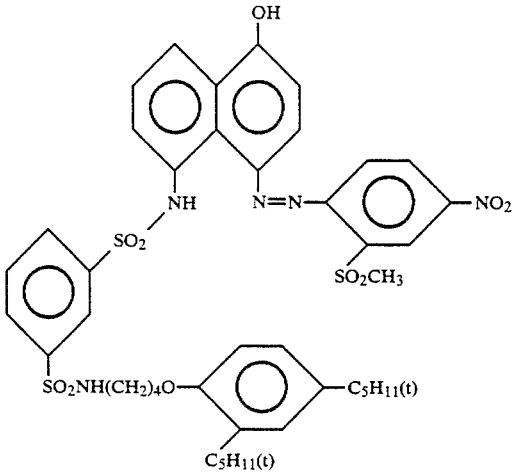
D-15
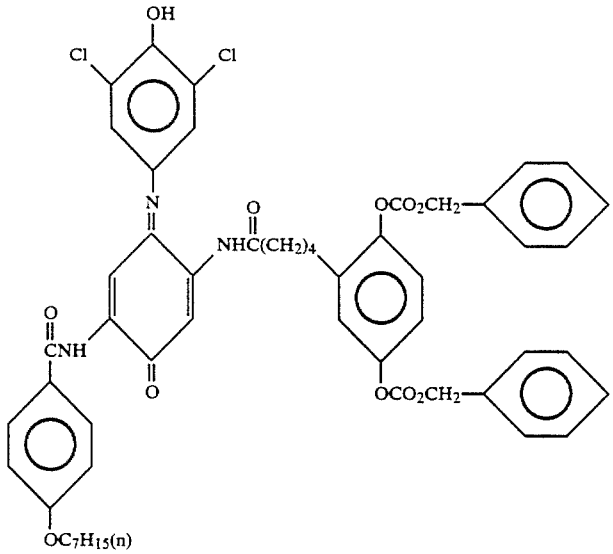

-continued
D-16
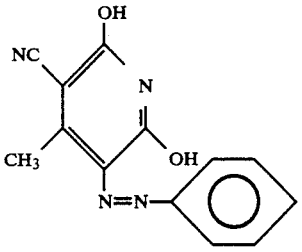
D-17
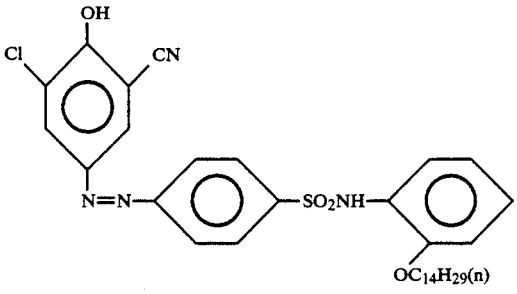
D-18
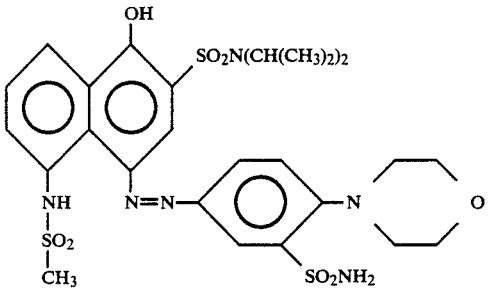
D-19
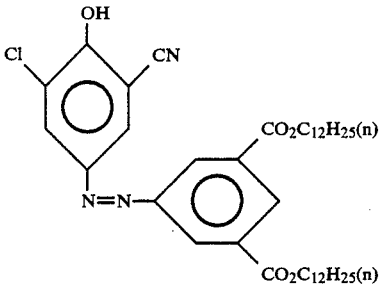
D-20
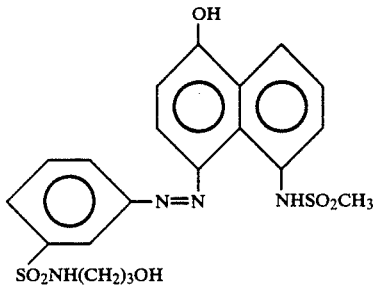
D-21
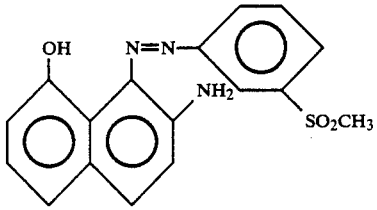

-continued
D-22
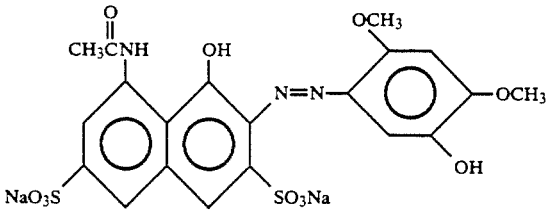
D-23
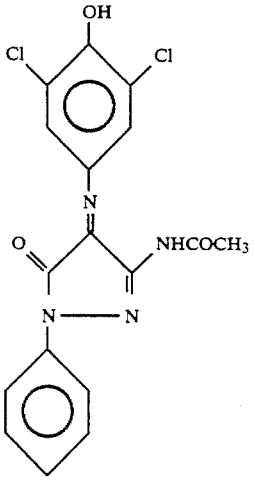
D-24
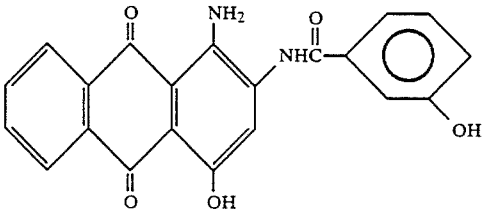
D-25
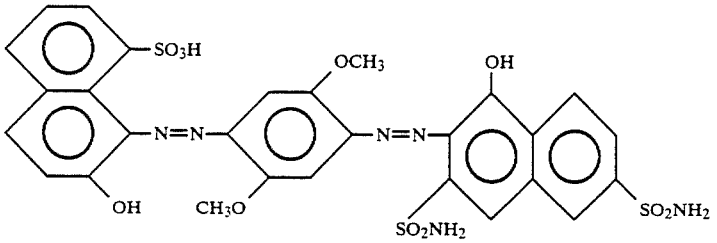
D-26
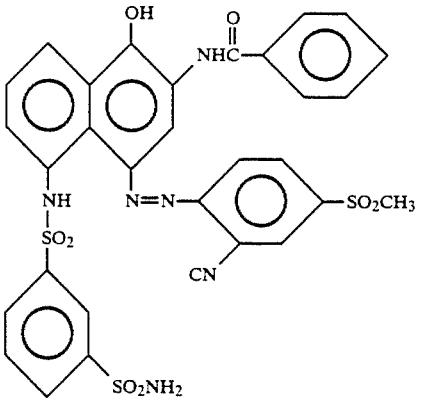

-continued
D-27
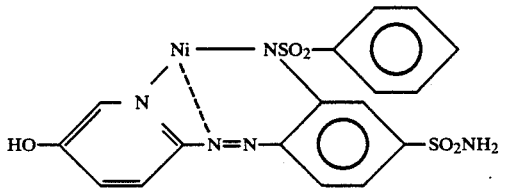
D-28
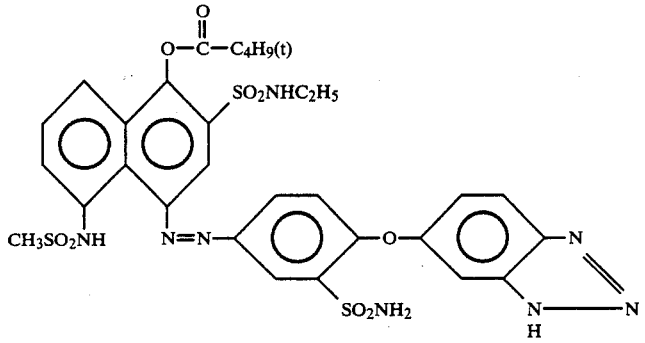
D-29
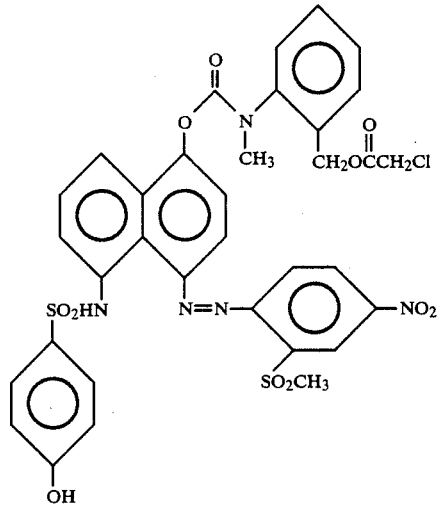
D-30
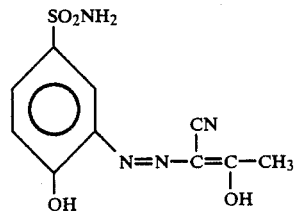

-continued
D-31
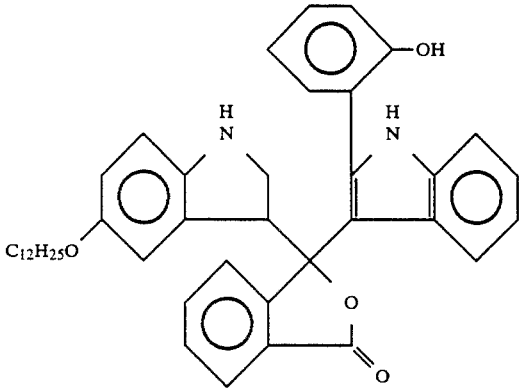
D-32
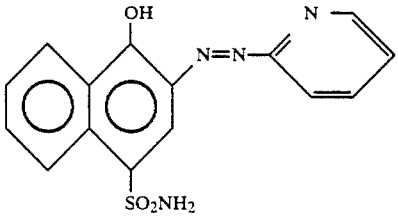
D-33
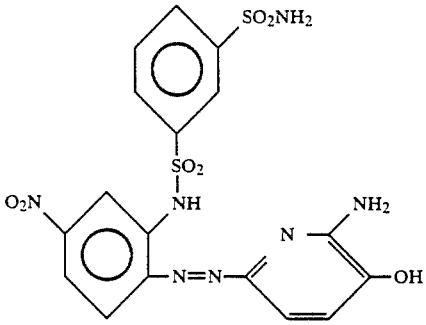
D-34
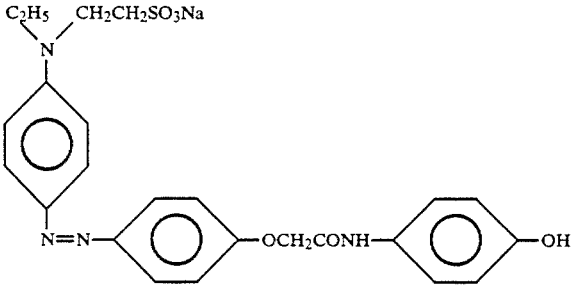
D-35
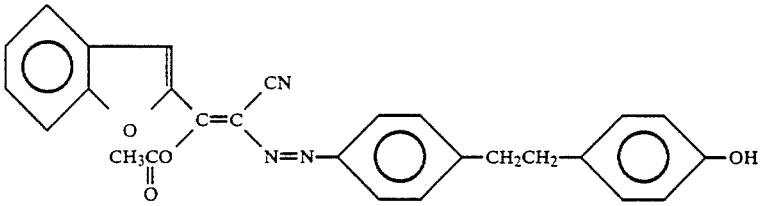

-continued
D-36
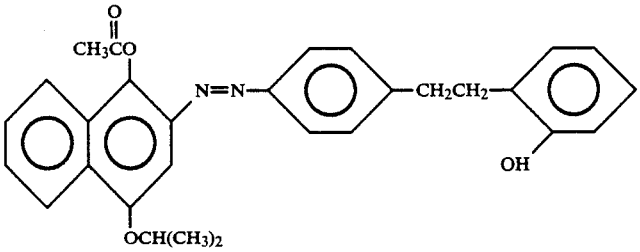
D-37
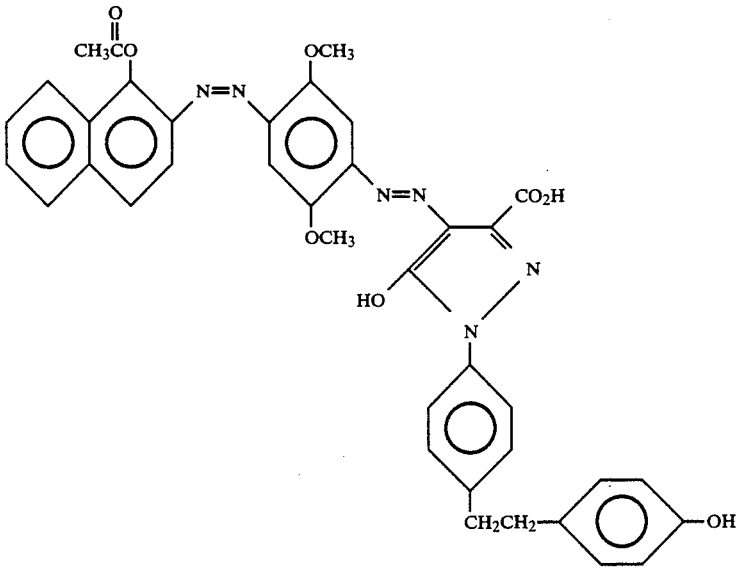
D-38
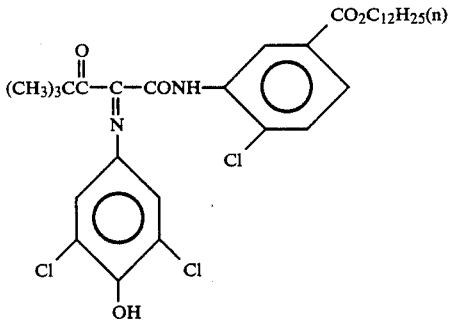
D-39
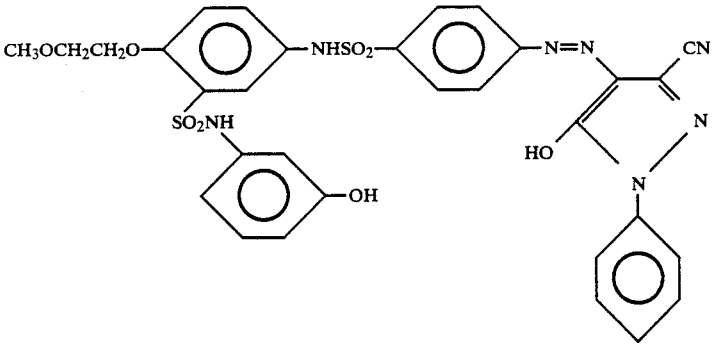

-continued
D-40
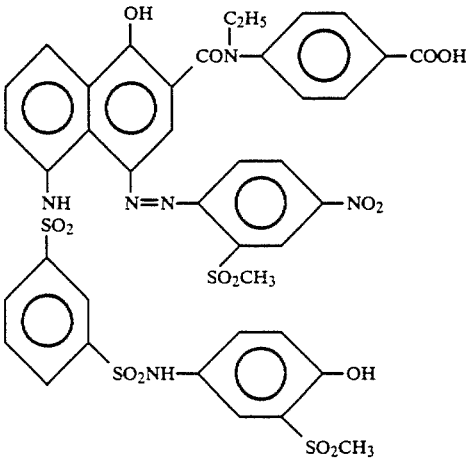
D-41
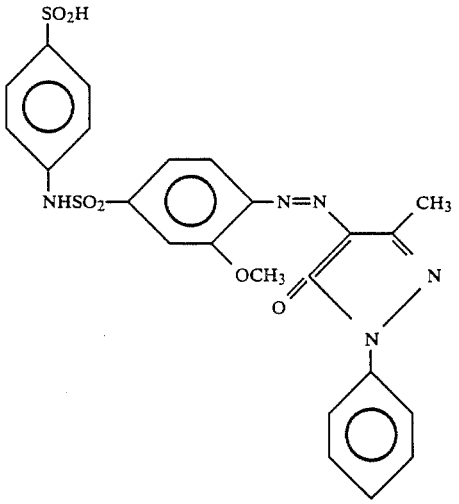
D-42
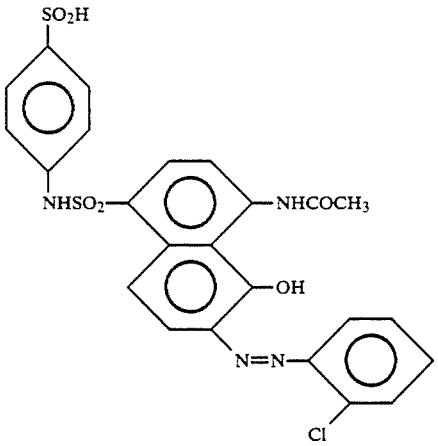

-continued
D-43
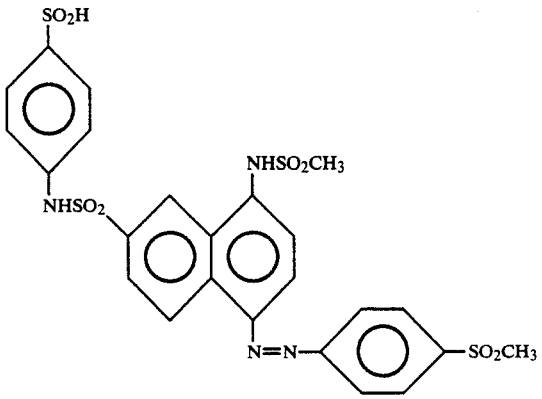
D-44
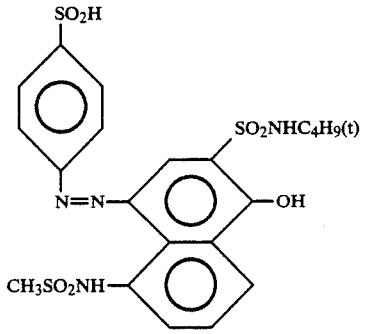
D-45
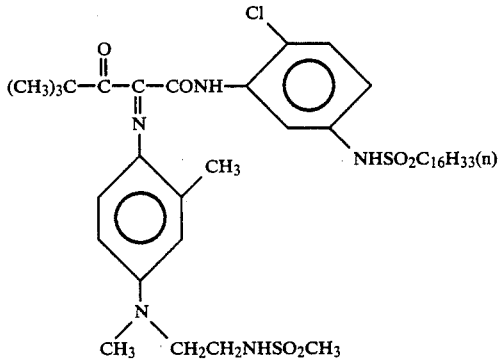
D-46
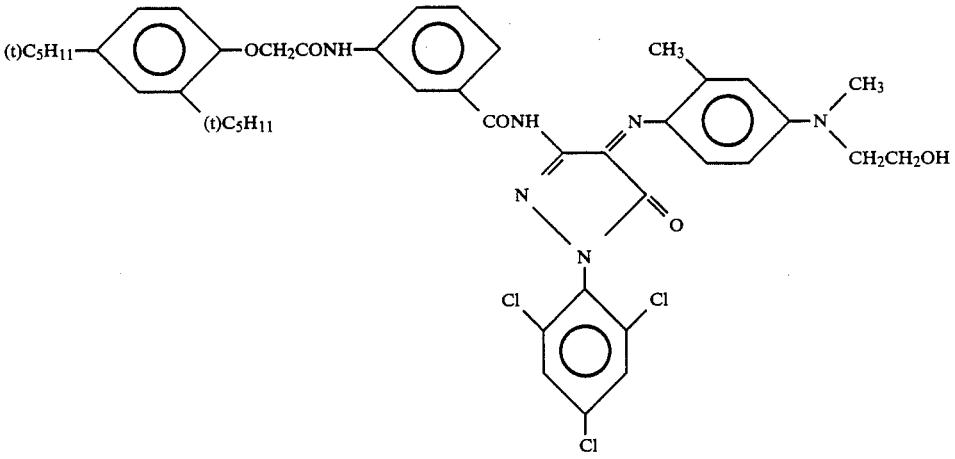

-continued

D-47

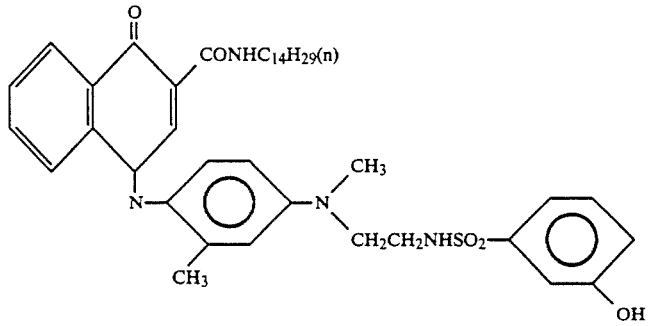

The silver halide solvents represented by PUG include meso-ionic compounds as described in Japanese Patent Application (OPI) No. 163042/85 and U.S. Pat. Nos. 4,033,910 and 4,378,424, and mercaptoazoles or azolethiones substituted with an amino group as described in Japanese Patent Application (OPI) No. 202531/82, and more specifically those described in Japanese Patent Application (OPI) No. 230135/86.

The nucleating agents represented by PUG include the moieties releasable from couplers described in Japanese Patent Application (OPI) No. 170840/84.

With respect to other photographically useful groups represented by PUG, reference can be made to it in Japanese Patent Application (OPI) No. 230135/86, U.S. Pat. No. 4,428,962, etc.

Specific examples of the compounds of formula (I) according to the present invention are shown below for illustrative purpose only but not for limitation.

1

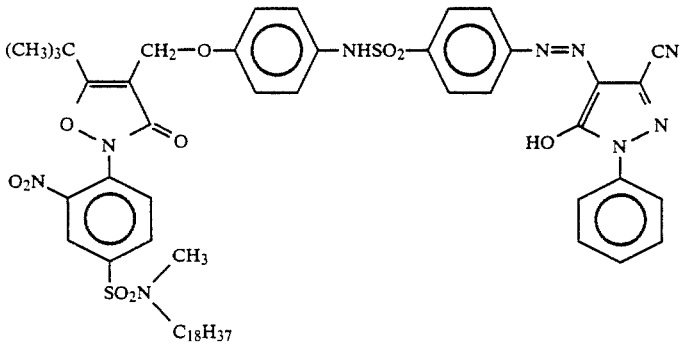

2

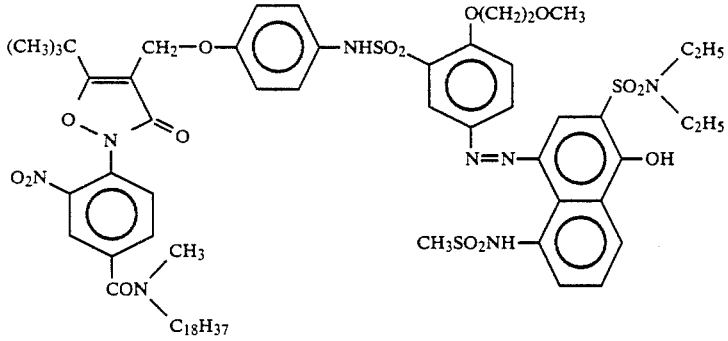

3

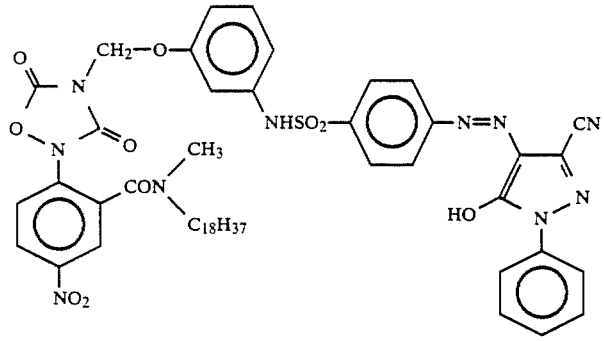

-continued
4
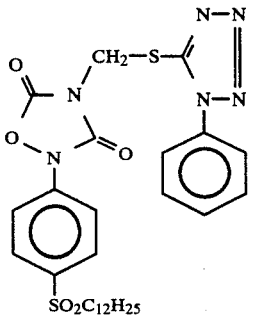
5
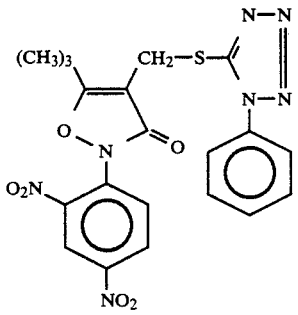
6
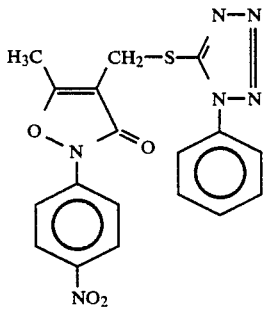
7
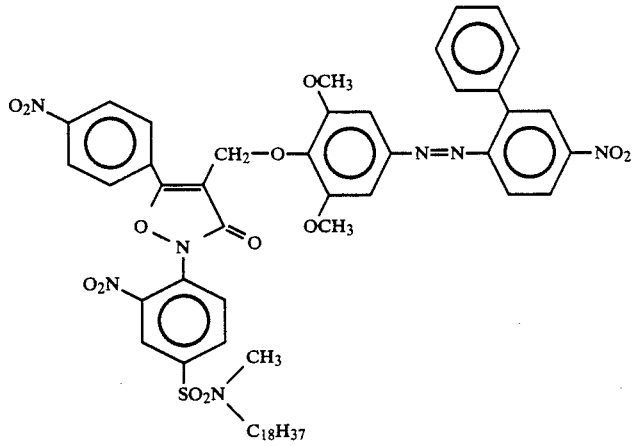

-continued
8
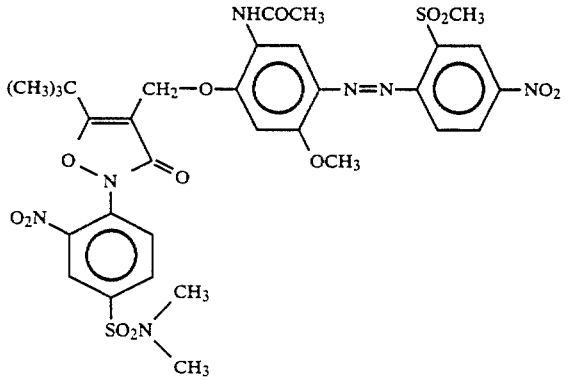
9
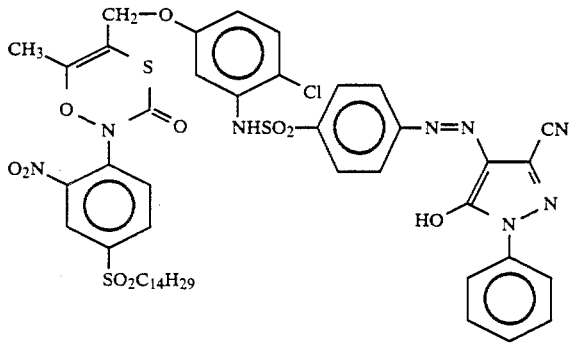
10
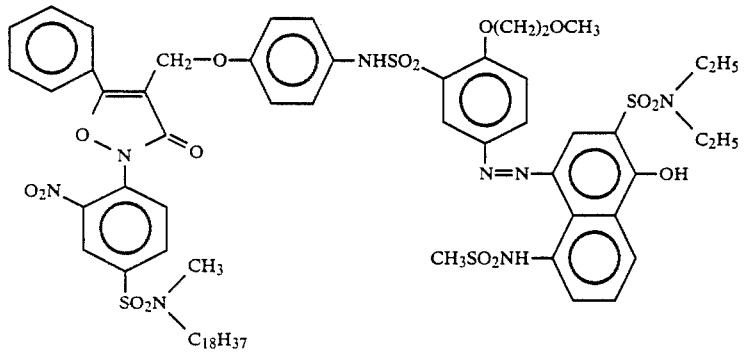
11
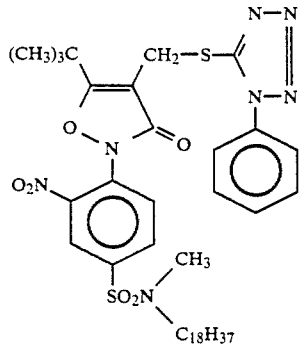

-continued
12
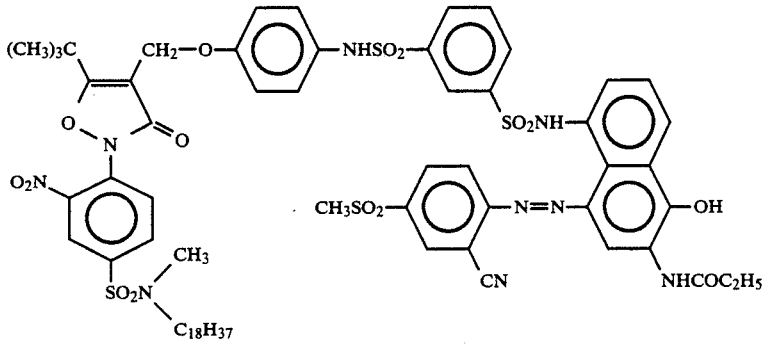
13
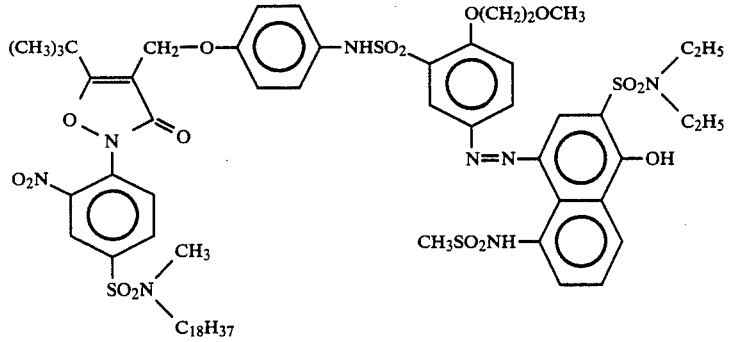
14
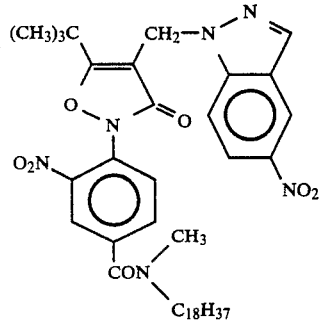
15
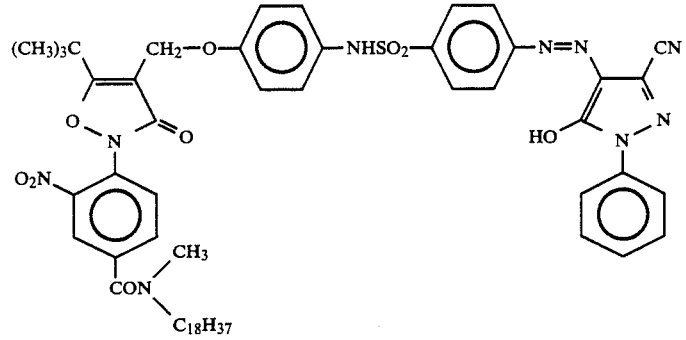

-continued
16
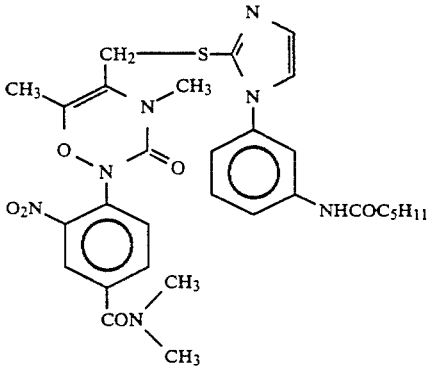
17
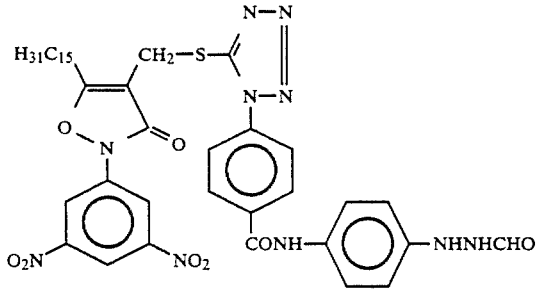
18
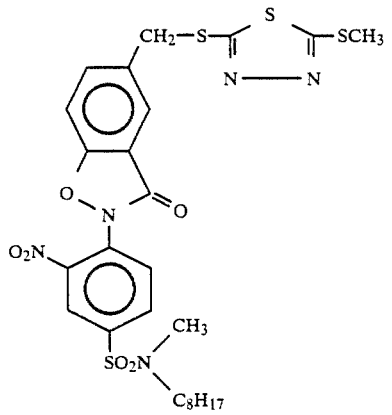
19
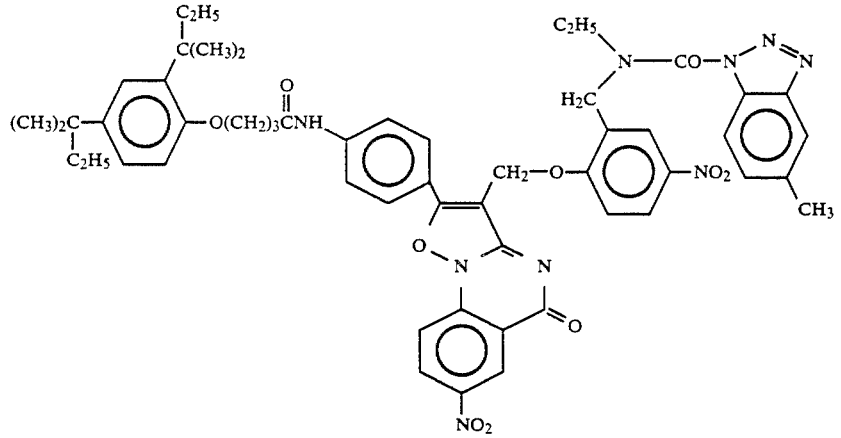

-continued
20
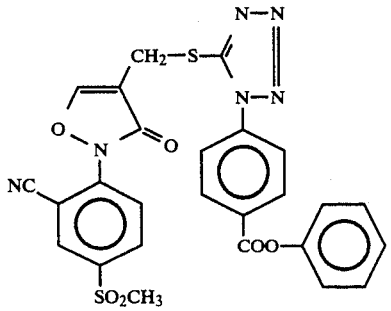
21
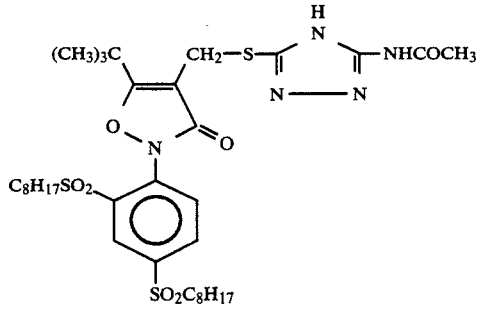
22
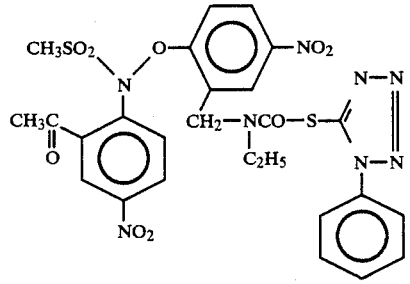
23
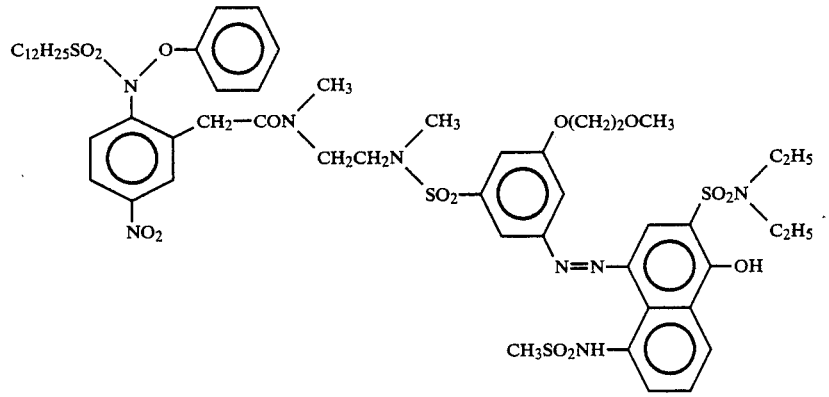
24
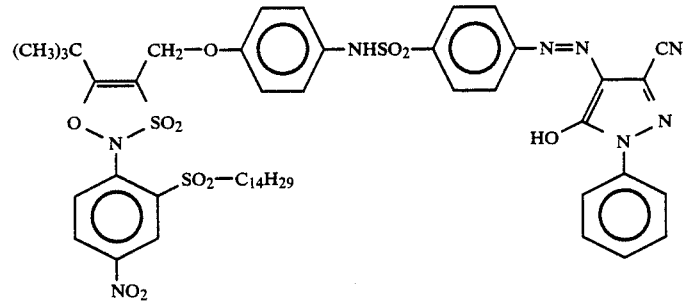

-continued
25
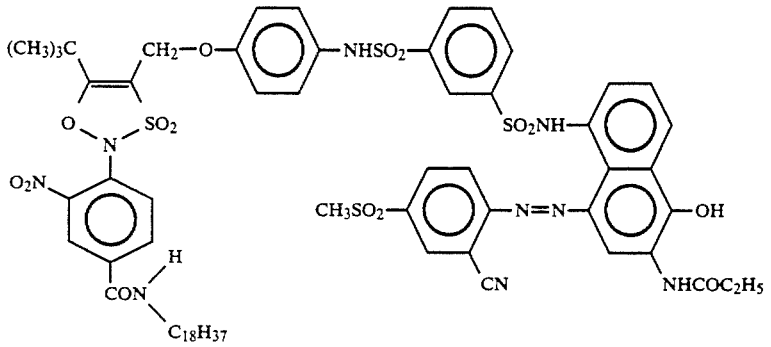
26
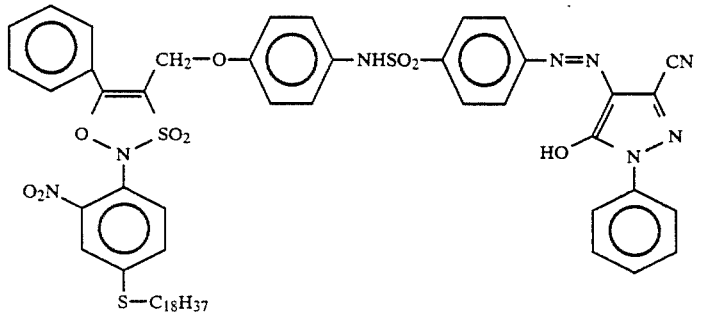
27
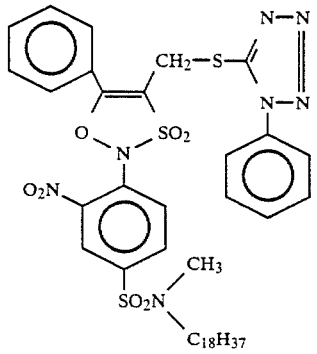
28
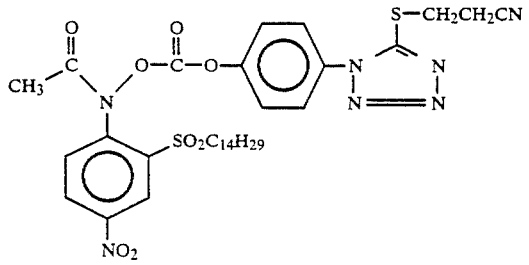
29
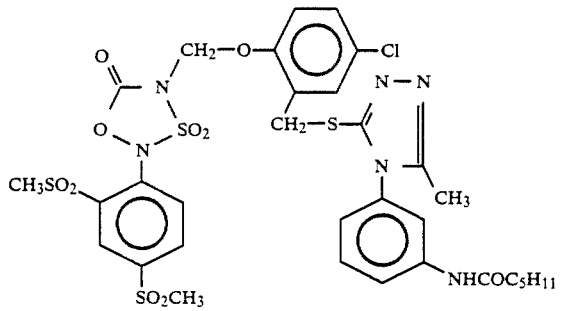

-continued
30
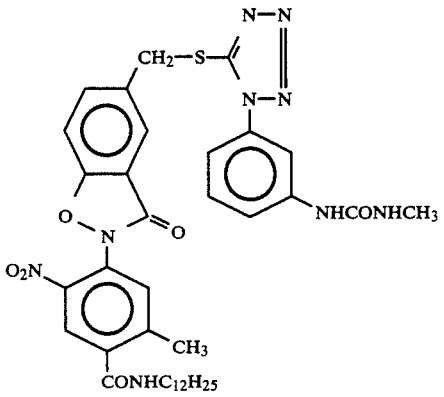
31
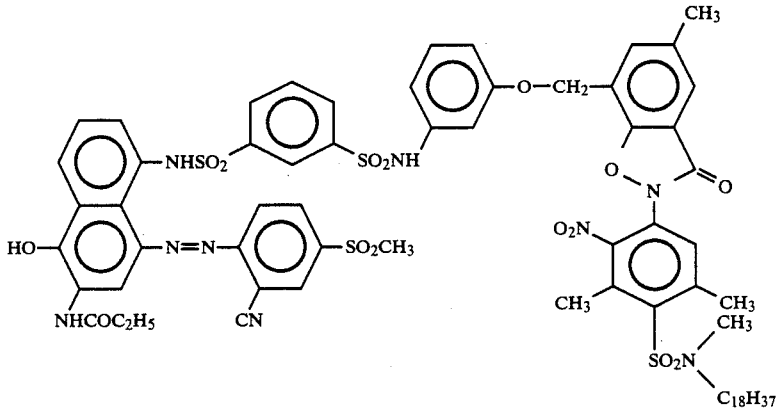
32
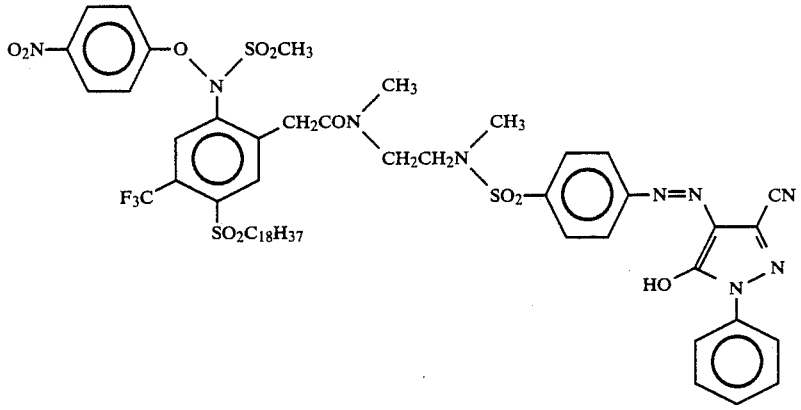
33
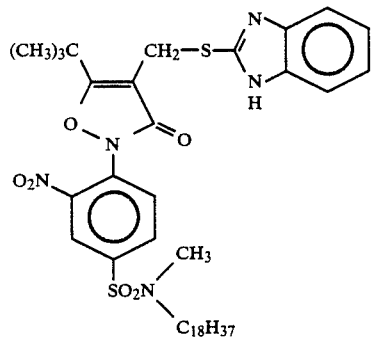

-continued
34
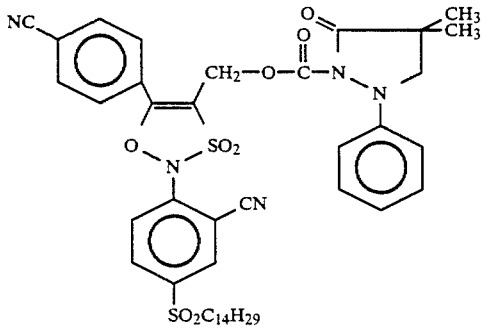
35
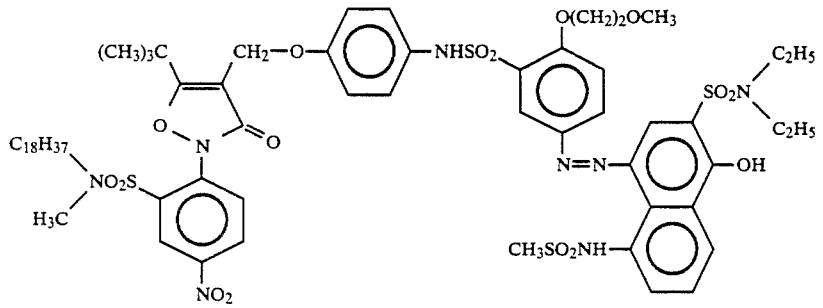
36
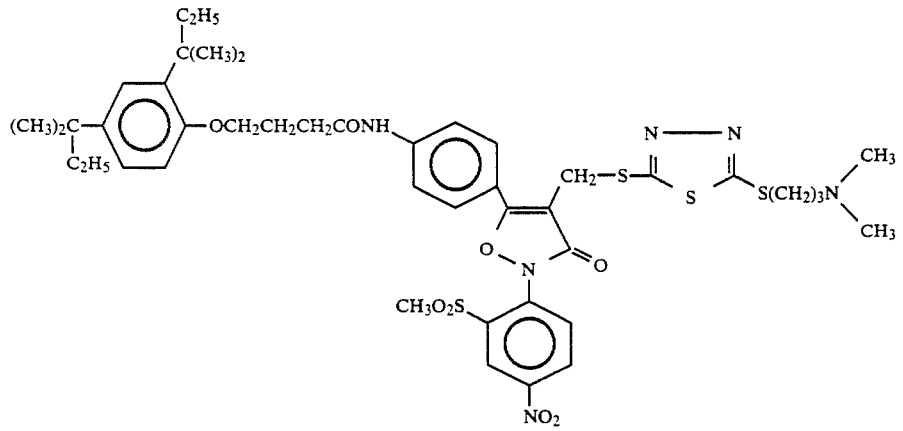
37
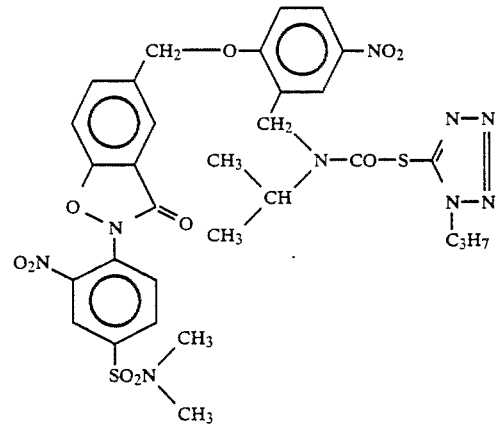

-continued
38
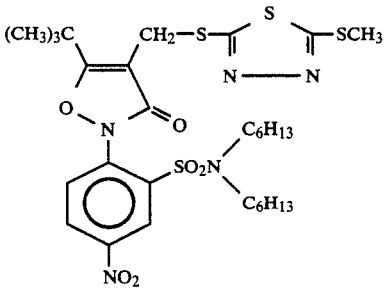
39
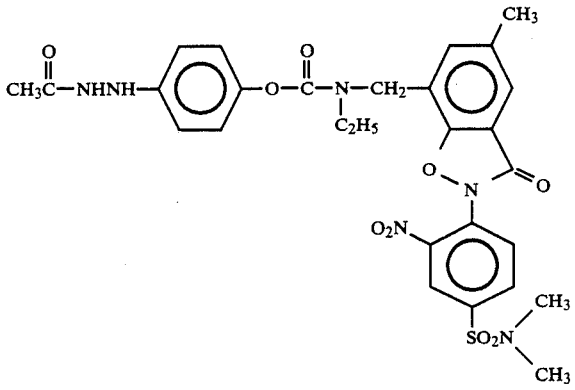
40
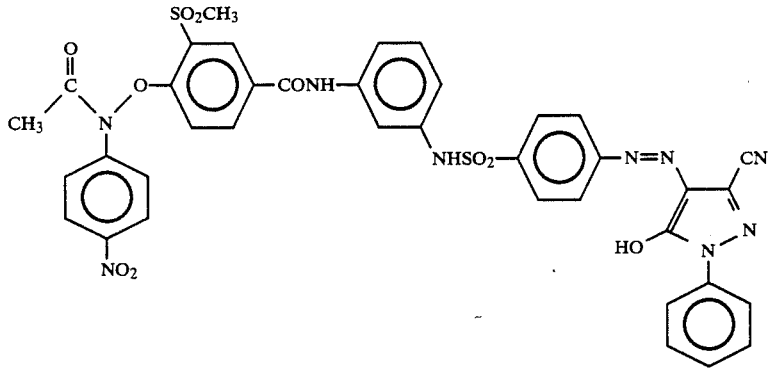
41
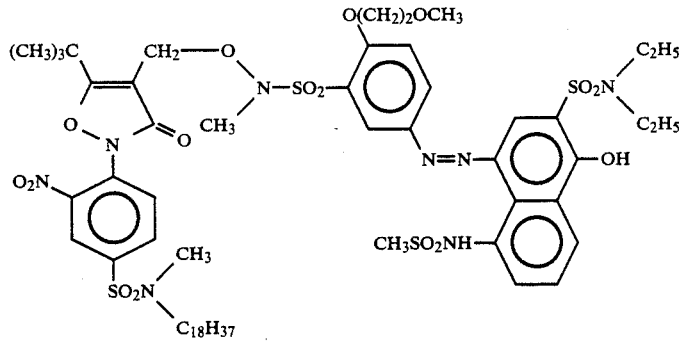

-continued
42
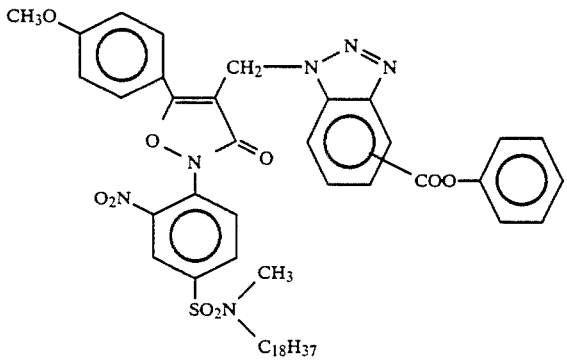
43
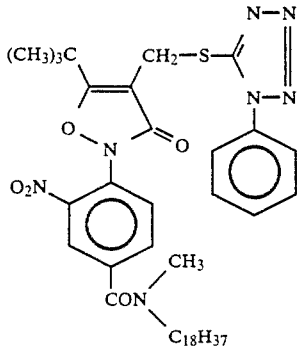
44
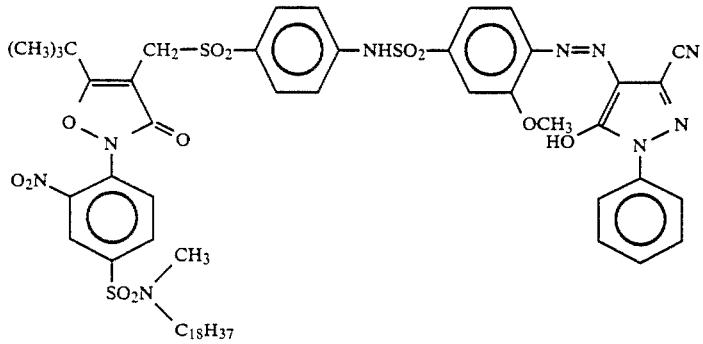
45
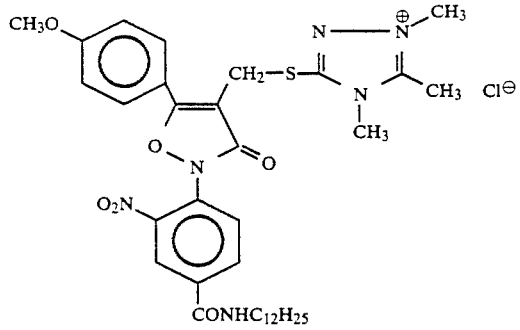

-continued
46
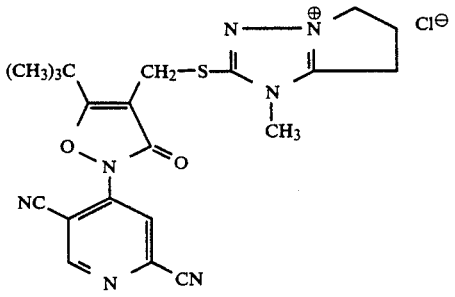
47
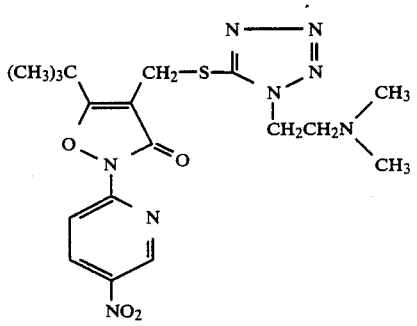
48
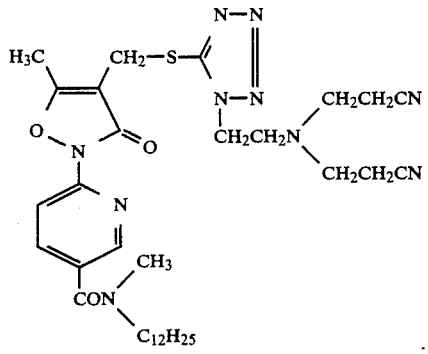
49
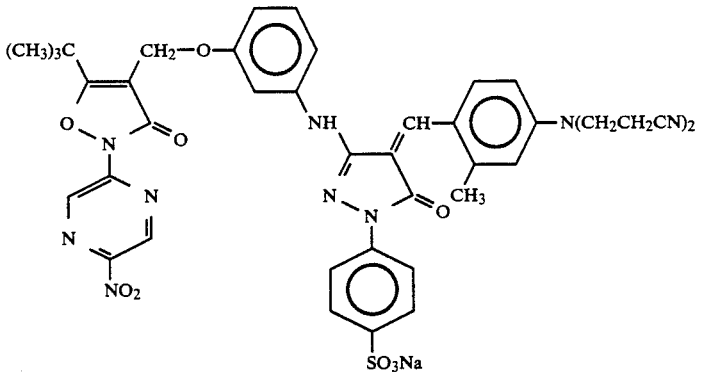

-continued
50
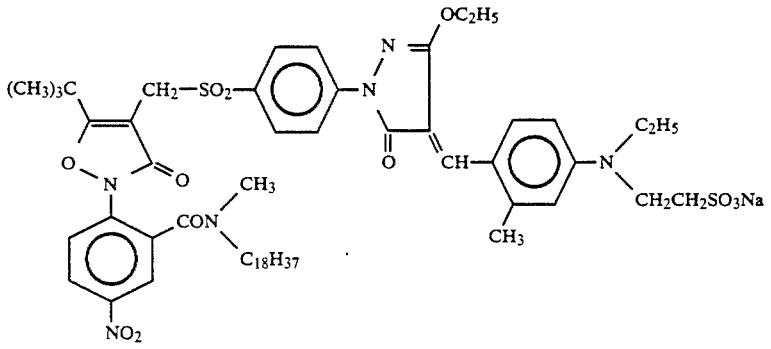
51
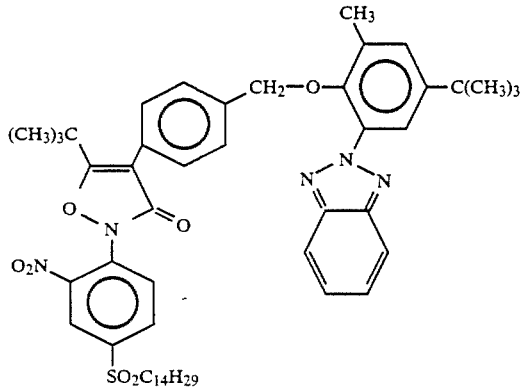
52
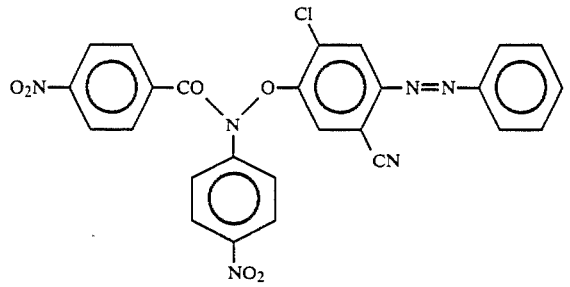
53
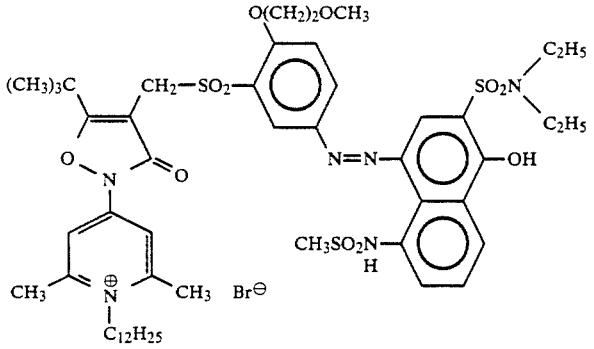

-continued
54
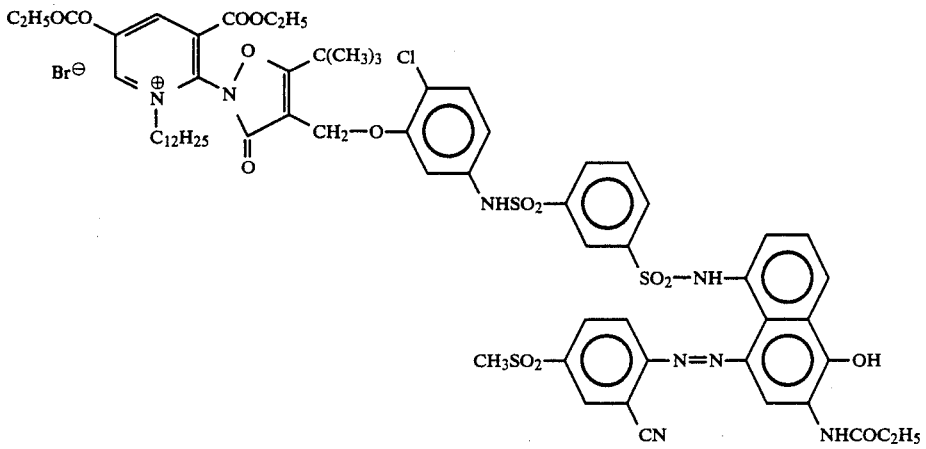
55
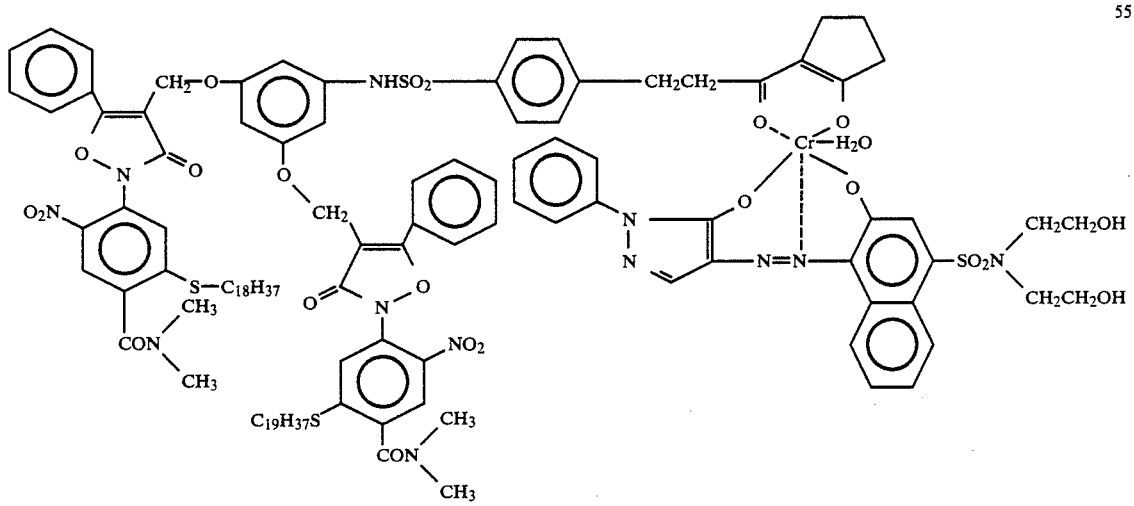
56
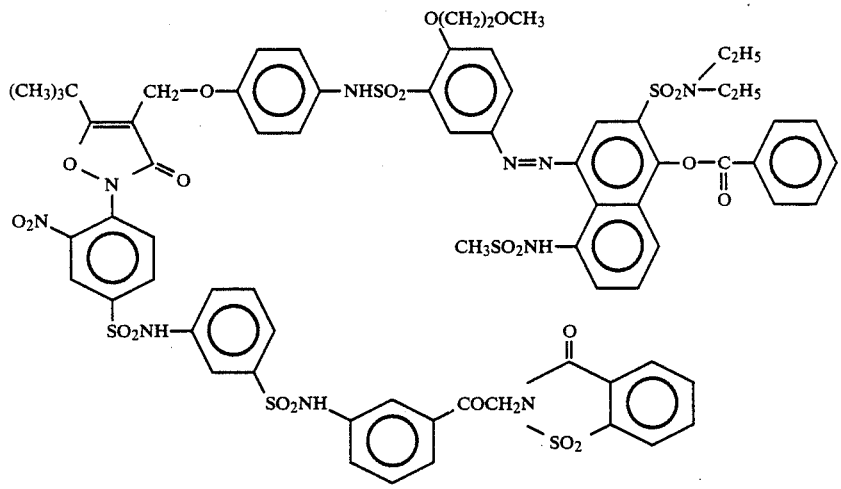

-continued
57
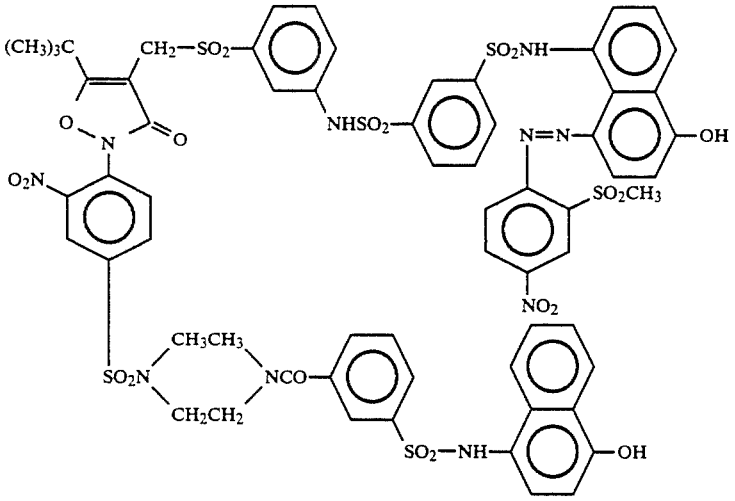
58
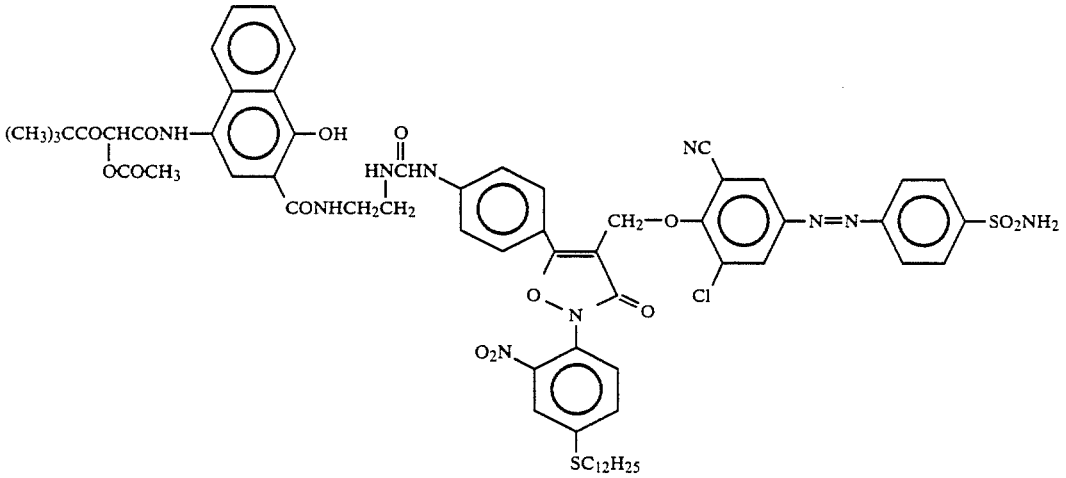
59
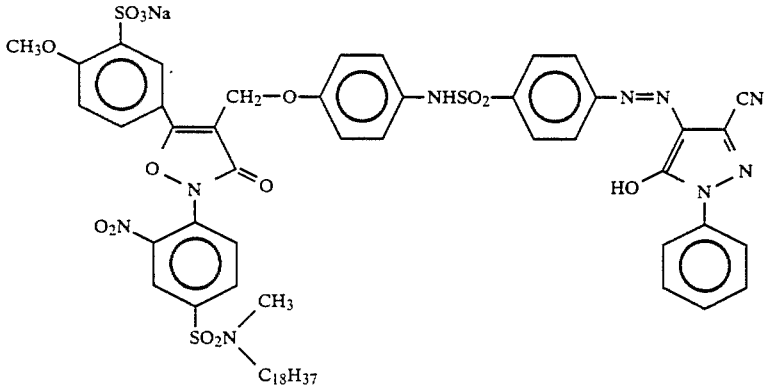
60
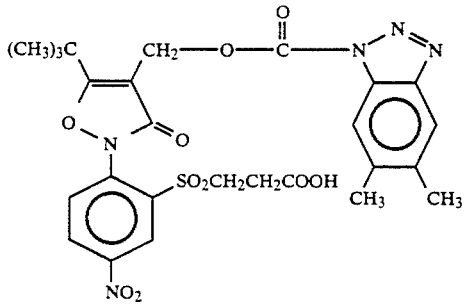

-continued
61
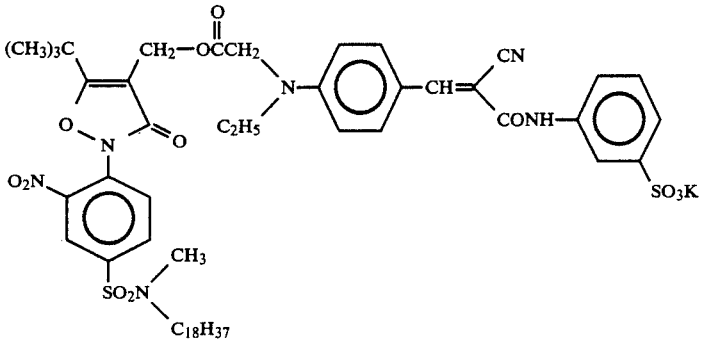
62
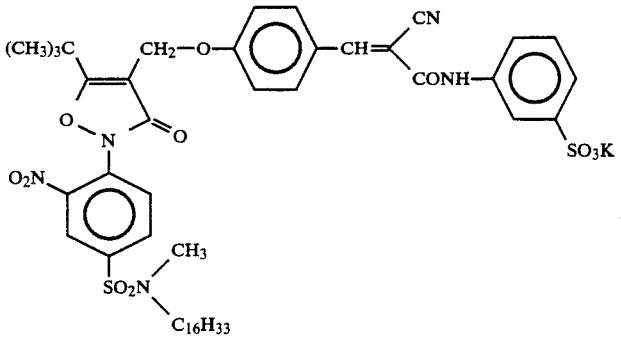
63
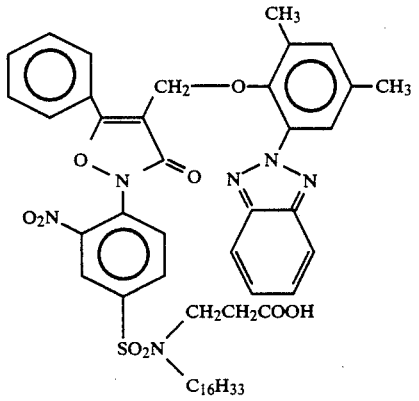
64
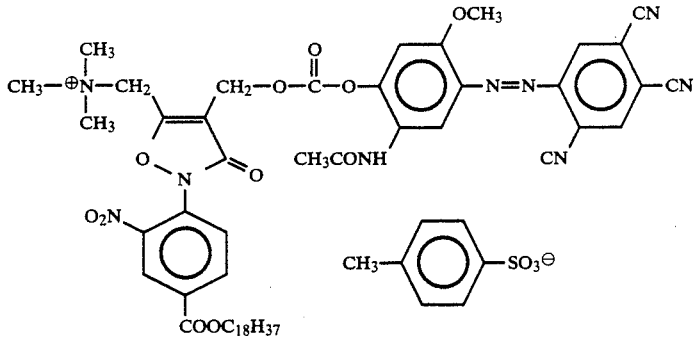

-continued
65
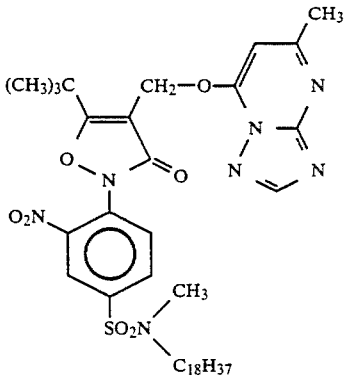
66
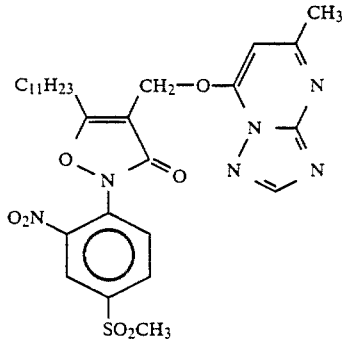
67
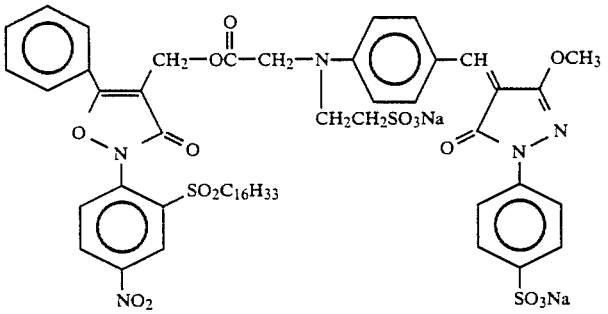
68
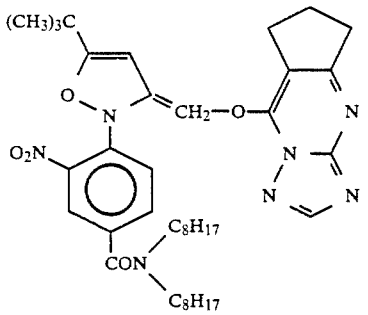

-continued
69
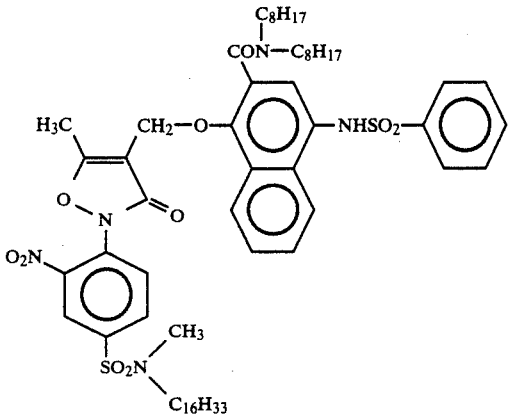
70
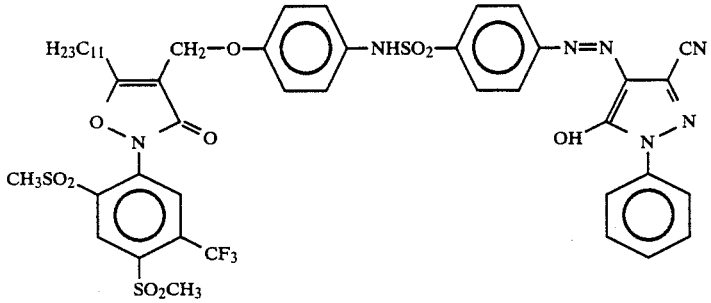
71
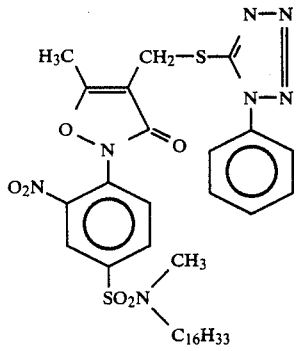
72
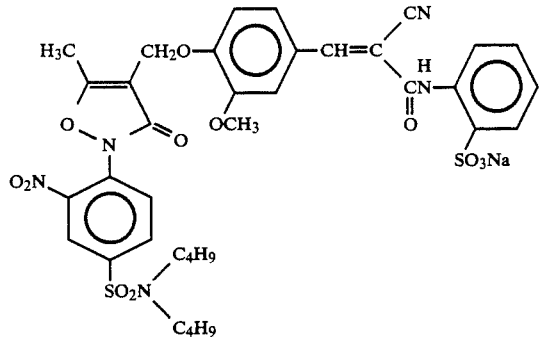

-continued
73
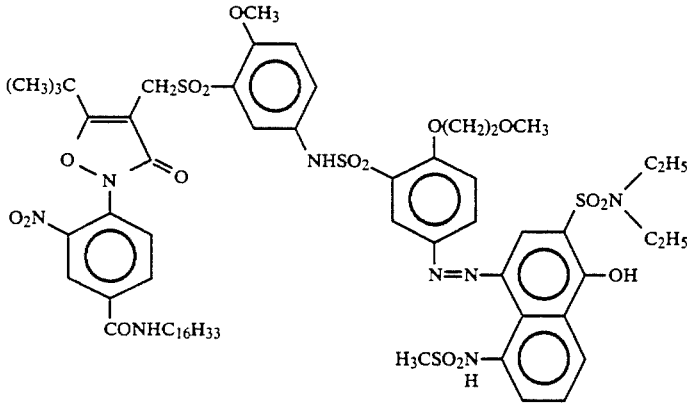
74
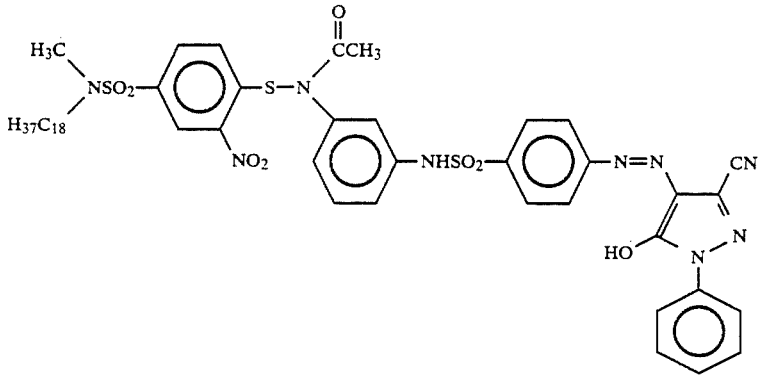
75
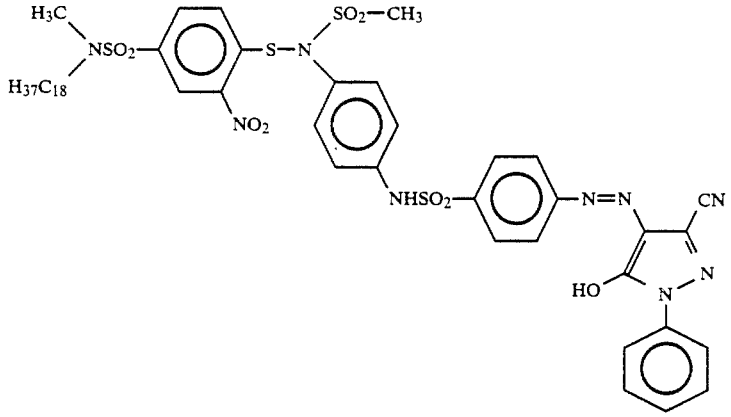
76
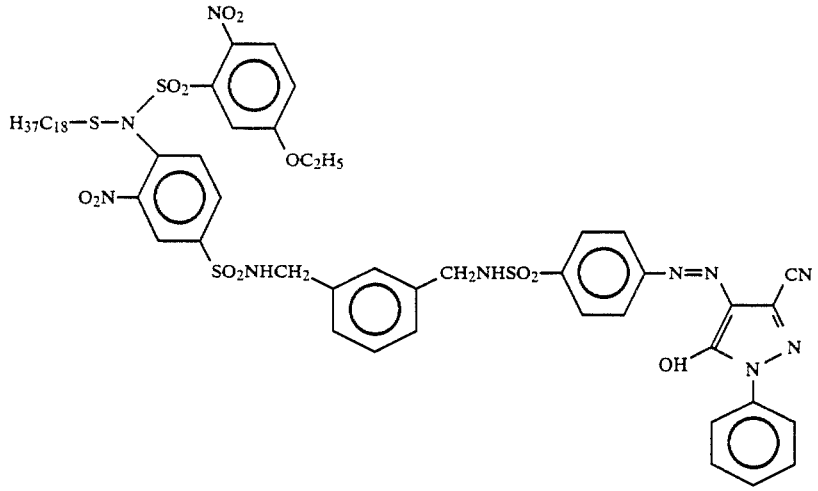

-continued
77
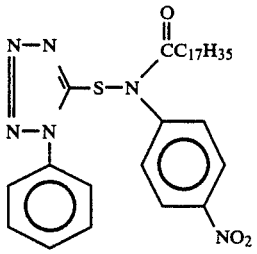
78
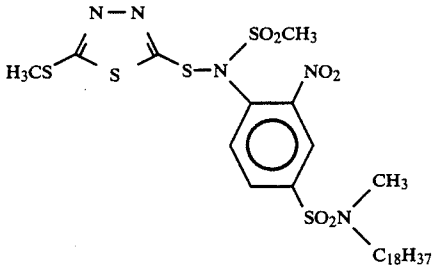
79
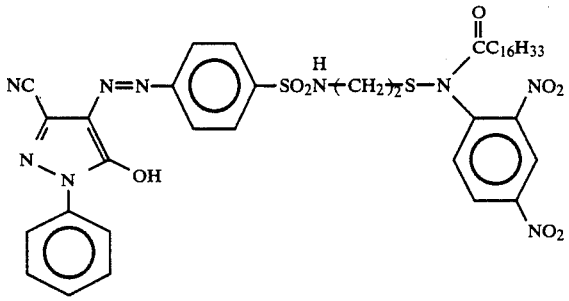
80
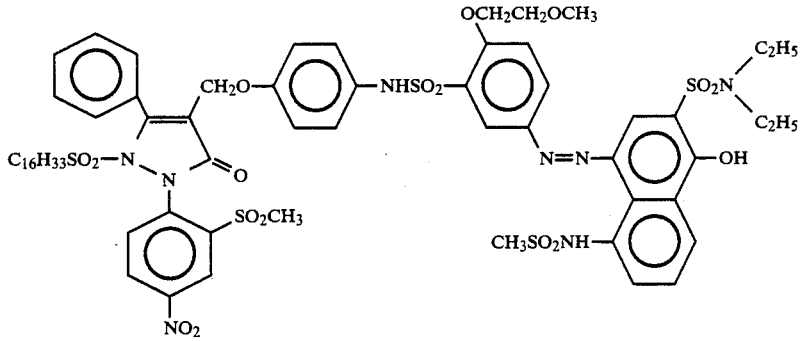
81
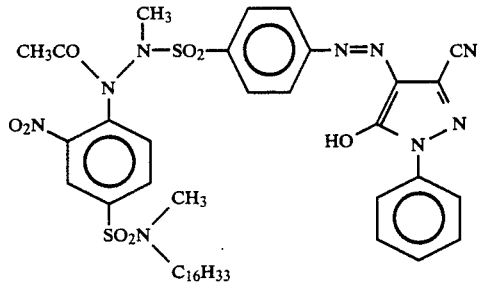

-continued
82
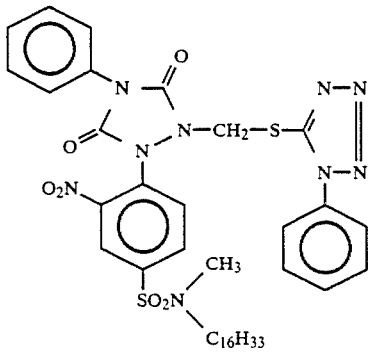
83
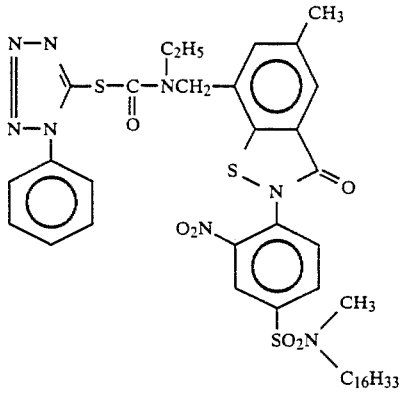
84
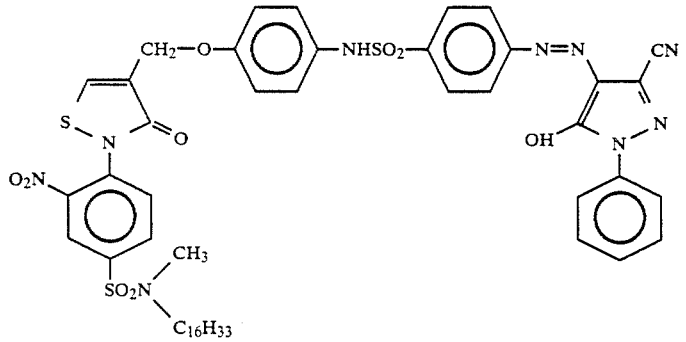
85
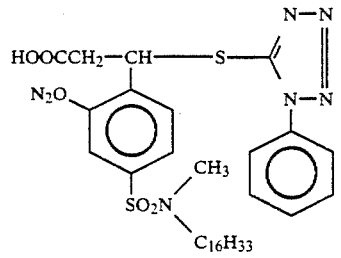

-continued
86
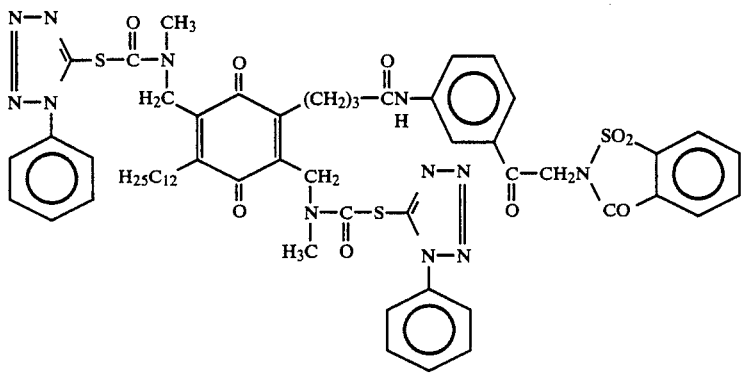
87
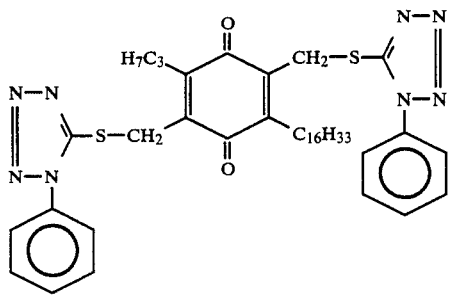
88
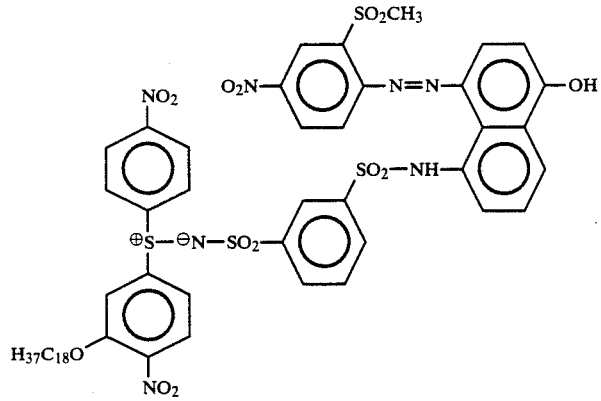
89
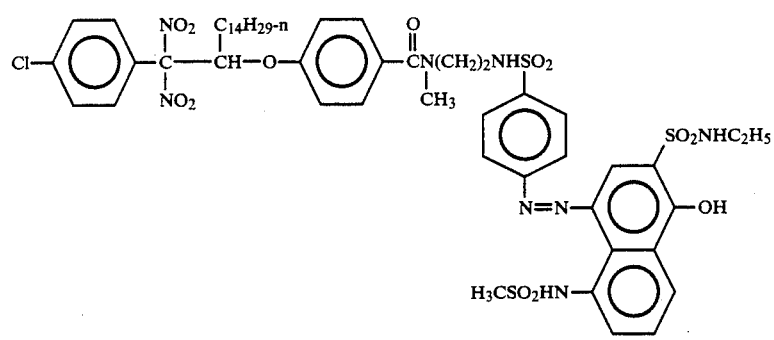

-continued

90

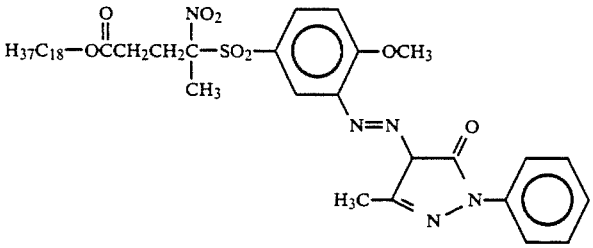

The moiety represented by PWR in formula (I) can be synthesized with reference to synthesis examples disclosed in the above-cited references, i.e., U.S. Pat. Nos. 4,139,389, 4,139,379, 4,564,577, 4,232,107, 4,343,893, 4,619,884, 4,450,223, and 4,609,610, Japanese Patent Application (OPI) Nos. 185333/84, 84453/82, 88257/86, and 142530/81, Research Disclosure, No. 24025, VI (1984), West German Patent Application (OLS) No. 3,008,588, and European Patent No. 220746A. Syntheses of the moiety corresponding to PWR in the compound of formula (II) are described in Japanese Patent Application (OPI) Nos. 215270/87 and 244048/87, U.S. patent application Ser. No. 07/157,357, etc.

The moiety represented by PUG can be synthesized by referring to the references cited above with reference to PUG. The moiety represented by Time can be synthesized by referring to Japanese Patent Application (OPI) Nos. 147244/86 and 244873/85 and patents cited therein.

The polymer which can be used in the present invention is not particularly limited as long as it contains at least 10 repeating units derived from the same monomer and has a molecular weight of 1000 or more. The polymer may be a linear polymer and may be a latex.

The present invention is characterized in that the above-described polymer and the compound of formula (I) coexist. The term "coexist" as used herein means that at least 80% of the compound of formula (I) exists in the phase where the polymer exists and that the polymer and the compound of formula (I) are so close that they may substantially contact each other. For example, when the polymer is present in an oily phase suspended in an aqueous phase just as emulsion particles, at least 80% of the compound of formula (I) should exist in the same oily phase.

Specific but non-limiting examples of the polymer to be used in the present invention are illustrated below.

(A) Vinyl Polymers

Monomers providing the vinyl polymers according to the present invention include acrylic esters, e.g., methyl acrylate, ethyl acrylate, n-propyl acrylate, isopropyl acrylate, n-butyl acrylate, isobutyl acrylate, sec-butyl acrylate, t-butyl acrylate, amyl acrylate, hexyl acrylate, 2-ethylhexyl acrylate, octyl acrylate, t-octyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-isopropoxy acrylate, 2-butoxyethyl acrylate, 2-(2-methoxyethoxy)ethyl acrylate, 2-(2-butoxyethoxy)ethyl acrylate, ω-methoxypolyethylene glycol acrylate (addition mole number n=9), 1-bromo-2-methoxyethyl acrylate, 1,1-dichloro-2-ethoxyethyl acrylate, etc.; methacrylic esters, e.g., methyl methacrylate, ethyl methacrylate, n-propyl methacrylate, isopropyl methacrylate, n-butyl methacrylate, isobutyl methacrylate, sec-butyl methacrylate, t-butyl methacrylate, amyl methacrylate, hexyl methacrylate, cyclohexyl methacrylate, benzyl methacrylate, chlorobenzyl methacrylate, octyl methacrylate, stearyl methacrylate, sulfopropyl methacrylate, N-ethyl-N-phenylaminoethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-acetoxyethyl methacrylate, 2-acetacetoxyethyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, ω-methoxy polyethylene glycol methacrylate (addition mole number n=6), allyl methacrylate, dimethylaminoethyl methacrylate methyl chloride salt, etc; vinyl esters, e.g., vinyl acetate, vinyl propionate, vinyl butyrate, vinyl isobutyrate, vinyl caproate, vinyl chloroacetate, vinyl methoxyacetate, vinyl phenylacetate, vinyl benzoate, vinyl salicylate, etc.; acrylamides, e.g., acrylamide, methylacrylamide, ethylacrylamide, propylacrylamide, butylacrylamide, t-butylacrylamide, cyclohexylacrylamide, benzylacrylamide, hydroxymethylacrylamide, methoxyethylacrylamide, dimethylaminoethylacrylamide, phenylacrylamide, dimethylacrylamide, diethylacrylamide, β-cyanoethylacrylamide, N-(2-acetacetoxyethyl)-acrylamide, diacetonacrylamide, etc.; methacrylamides, e.g., methacrylamide, methylmethacrylamide, ethylmethacrylamide, propylmethacrylamide, butylmethacrylamide, t-butylmethacrylamide, cyclohexylmethacrylamide, benzylmethacrylamide, hydroxymethylmethacrylamide, methoxyethylmethacrylamide, dimethylaminoethylmethacrylamide, phenylmethacrylamide, dimethylmethacrylamide, diethylmethacrylamide, β-cyanoethylmethacrylamide, N-(2-acetacetoxyethyl)methacrylamide, etc.; olefines, e.g., dicyclopentadiene, ethylene, propylene, 1-butene, 1-pentene, vinyl chloride, vinylidene chloride, isoprene, chloroprene, butadiene, 2,3-dimethylbutadiene, etc.; styrenes, e.g., styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, etc.; vinyl ethers, e.g., methyl vinyl ether, butyl vinyl ether, hexyl vinyl ether, methoxyethyl vinyl ether, dimethylaminoethyl vinyl ether, etc.; butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, glycidyl acrylate, glycidyl methyacrylate, N-vinyloxazolidone, N-vinylpyrrolidone, acrylonitrile, methacrylonitrile, vinylidene chloride, methylene malononitrile, vinylidene, etc.

The monomers to be used in the present invention, for example, the above-enumerated monomers, can be used in combinations of two or more for various purposes, for example, improvement of solubility. Further, for the purpose of controlling color developability or solubility, the polymer may further comprise comonomers having an acid radical in combination so far as the resulting copolymer does not become soluble in water. Examples of such comonomers include acrylic acid, methacrylic acid, itaconic acid, maleic acid, monoalkyl itaconates (e.g., monomethyl itaconate, monoethyl itaconate, monobutyl itaconate, etc.), monoalkyl maleates (e.g., monomethyl maleate, monoethyl maleate, monobutyl maleate, etc.), citraconic acid, styrenesulfonic acid, vinylbenzylsulfonic acid, vinylsulfonic acid, acryloyloxyalkylsulfonic acids (e.g., acryloyloxymethylsulfonic acid, acryloyloxyethylsulfonic acid, acryloyloxypropylsulfonic acid, etc.), methacryloyloxyalkylsulfonic acids (e.g., methacryloyloxyethylsulfonic acid, methacryloyloxypropylsulfonic acid, etc.), acrylamidoalkylsulfonic acids (e.g., 2-acrylamido-2-methylethanesulfonic acid, 2-acrylamido-2-methylpropanesulfonic acid, 2-acrylamido-2-methylbutanesulfonic acid, etc.), methacrylamidoalkylsulfonic acids (e.g., 2-methacrylamido-2-methylethanesulfonic acid, 2-methacrylamido-2-methylpropanesulfonic acid, 2-methacrylamido-2-methylbutanesulfonic acid, etc.), and the like.

These acids may be in the form of an acid with an alkali metal (e.g., Na, K, etc.) or ammonium.

Of the vinyl monomers so far enumerated and other vinyl monomers which can be used in the present invention, those monomers which provide a water-soluble polymer when homopolymerized (hereinafter referred to as hydrophilic monomer or comonomers) may be used as comonomers in an arbitrary proportion unless the resulting copolymer becomes water soluble. However, a recommended proportion of such a hydrophilic monomer in the copolymer is usually not more than 40 mol %, preferably not more than 20 mol %, and more preferably not more than 10 mol %. In cases when the hydrophilic comonomer to be copolymerized with the monomer of the present invention has an acid radical, the proportion of such a comonomer in the copolymer is usually not more than 20 mol %, preferably not more than 10 mol %, and more preferably 0 mol %, from the standpoint of image preservability.

Monomers which can be used preferably are methacrylates, acrylamides, and methacrylamides. It is usually preferred to copolymerize two or more monomers. Particularly preferred polymers are copolymers comprising acrylamide monomers and other monomers according to the present invention, and copolymers comprising methacrylate monomers and other monomers according to the present invention. Two or more kinds of polymers may be used in combination.

(B) Polyester resins obtained by condensation of polyhydric alcohols and polybasic acids Effective polyhydric alcohols to be used include glycols having a structural formula:

$$HO—R^{11}—OH$$

wherein $R^{11}$ represents a hydrocarbon chain having from 2 to about 12 carbon atoms, and preferably an aliphatic hydrocarbon chain, and polyalkylene glycols.

Effective polybasic acids are those having a structural formula:

$$HOOC—R^{12}—COOH$$

wherein $R^{12}$ represents a mere bond or a hydrocarbon chain having from 1 to about 12 carbon atoms.

Specific examples of the polyhydric alcohols are ethylene glycol, diethylene glycol, triethylene glycol, 1,2-propylene glycol, 1,3-propylene glycol, trimethylolpropane, 1,4-butanediol, isobutylenediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-diol, glycerin, diglycerin, triglycerin, 1-methylglycerin, erythritol, mannitol, sorbitol, etc.

Specific examples of the polybasic acids are oxalic acid, suberic acid, glutaric acid, adipic acid, pimelic acid, succinic acid, azelaic acid, sebacic acid, nonanedicarboxylic acid, decanedicarboxylic acid, undecanedicarboxylic acid, dodecanedicarboxylic acid, fumaric acid, maleic acid, itaconic acid, citraconic acid, phthalic acid, isophthalic acid, terephthalic acid, tetrachlorophthalic acid, mesaconic acid, isopimelic acid, a cyclopentadiene-maleic anhydride adduct, a rosin-maleic anhydride adduct, etc.

(C) Others

For example, polyesters obtained by ring-opening polymerization as shown below are included.

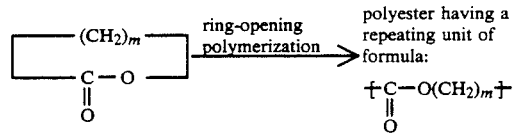

wherein m represents an integer of from 4 to 7; and $—CH_2)_m$ may be branched.

Monomers suitable for preparing the above-described polyester include β-propiolactone, ε-caprolactone, dimethylpropiolactone, etc.

Specific examples of the polymers which can be used in the present invention are listed below for illustrative purposes only but not for limitation.

(P-1) Polyvinyl acetate
(P-2) Polyvinyl propionate
(P-3) Polymethyl methacrylate (average molecular weight: ca. 15,000)
(P-4) Polyethyl methacrylate
(P-5) Polyethyl acrylate
(P-6) Vinyl acetate-vinyl alcohol copolymer (95:5, average molecular weight: ca. 27,000)
(P-7) Poly-n-butyl acrylate
(P-8) Poly-n-butyl methacrylate
(P-9) Polyisobutyl methacrylate (P-10) Polyisopropyl methacrylate
(P-11) Polyoctyl acrylate
(P-12) n-Butyl acrylate-acrylamide copolymer (95:5)
(P-13) Stearyl methacrylate-acrylic acid copolymer (90:10)
(P-14) 1,4-Butanediol-adipic acid polyester
(P-15) Ethylene glycol-sebacic acid polyester
(P-16) Polycaprolactone
(P-17) Polypropiolactone
(P-18) Polydimethylpropiolactone
(P-19) n-Butyl methacrylate-N-vinyl-2-pyrrolidone copolymer (90:10)
(P-20) Methyl methacrylate-vinyl chloride copolymer (70:30)
(P-21) Methyl methacrylate-styrene copolymer (90:10)
(P-22) Methyl methacrylate-ethyl acrylate copolymer (50:50)
(P-23)n-Butyl methacrylate-methyl methacrylate-styrene copolymer (50:30:20)
(P-24) Vinyl acetate-acrylamide copolymer (85:15)
(P-25) Vinyl chloride-vinyl acetate copolymer (65:35)
(P-26) Methyl methacrylate-acrylonitrile copolymer (65:35)
(P-27) Diacetonacrylamide-methyl methacrylate copolymer (50:50)
(P-28) Methyl vinyl ketone-isobutyl methacrylate copolymer (55:45)
(P-29) Ethyl methacrylate-n-butyl acrylate copolymer (70:30)
(P-30) Diacetonacrylamide-n-butyl acrylate copolymer (60:40)
(P-31) Methyl methacrylate-styrene methyl methacrylate-diacetonacrylamide copolymer (40:40:20)
(P-32) n-Butyl acrylate-styrene methacrylate-diacetonacrylamide copolymer (70:20:10)
(P-33) Stearyl methacrylate-methyl methacrylate-acrylic acid copolymer (50:40:10)
(P-34) Methyl methacrylate-styrene-vinylsulfonamide copolymer (70:20:10)
(P-35) Methyl methacrylate-phenyl vinyl ketone copolymer (70:30)
(P-36) n-Butyl acrylate-methyl methacrylate-n-butyl methacrylate copolymer (35:35:30)
(P-37) n-Butyl methacrylate-pentyl methacrylate-N-vinyl-2-pyrrolidone copolymer (38:38:24)
(P-38) Methyl methacrylate-n-butyl methacrylate-isobutyl methacrylate-acrylic acid copolymer (37:29:25:9)
(P-39) n-Butyl methacrylate-acrylic acid copolymer (95:5,average molecular weight: ca. 34,000)
(P-40) Methyl methacrylate-acrylic acid copolymer (95:5)
(P-41) Benzyl methacrylate-acrylic acid copolymer (90:10)
(P-42) n-Butyl methacrylate-methyl methacrylate-benzyl methacrylate-acrylic acid copolymer (35:35:25:5)
(P-43) n-Butyl methacrylate-methyl methacrylate-benzyl methacrylate copolymer (35:30:30)
(P-44) Polypentyl acrylate
(P-45) Cyclohexyl methacrylate-methyl methacrylate-n-propyl methacrylate copolymer (37:29:34)
(P-46) Polypentyl methacrylate
(P-47) Methyl methacrylate-n-butyl methacrylate copolymer (65:35)
(P-48) Vinyl acetate-vinyl propionate copolymer (75:25)
(P-49) n-Butyl methacrylate-sodium 3-acryloxybutane-1-sulfonate copolymer (97:3)
(P-50) n-Butyl methacrylate-methyl methacrylate-acrylamide copolymer (35:35:30)
(P-51) n-Butyl methacrylate-methyl methacrylate-vinyl chloride copolymer (37:36:27)
(P-52) n-Butyl methacrylate-styrene copolymer (90:10)
(P-53) Methyl methacrylate-N-vinyl-2-pyrrolidone copolymer (90:10)
(P-54) n-Butyl methacrylate-vinyl chloride copolymer (90:10)
(P-55) n-Butyl methacrylate-styrene copolymer (70:30)
(P-56) Poly(N-sec-butylacrylamide)
(P-57) Poly(N-t-butylacrylamide)
(P-58) Diacetonacrylamide-methyl methacrylate copolymer (62:38)
(P-59) Polycyclohexyl methacrylate
(P-60) N-t-Butylacrylamide-methyl methacrylate copolymer (40:70)
(P-61) Poly(N,N-dimethylacrylamide)
(P-62) Poly(t-butyl methacrylate)
(P-63) t-Butyl methacrylate-methyl methacrylate copolymer (70:30)
(P-64) Poly(N-t-butylmethacrylamide)
(P-65) N-t-Butylacrylamide-methylphenyl methacrylate copolymer (60:40)
(P-66) Methyl methacrylate-acrylonitrile copolymer (70:30)
(P-67) Methyl methacrylate-methyl vinyl ketone copolymer (38:72)
(P-68) Methyl methacrylate-styrene copolymer (75:25)
(P-69) Methyl methacrylate-hexyl methacrylate copolymer (70:30)

The ratios in the parentheses are by mol.

The ratio of the compound of formula (I) to the polymer coexisting therewith can be selected arbitrarily and preferably ranges from 1/100 to 100/1 by weight, excluding polymers which do not coexist with the compound of formula (I) from the calculation.

Introduction of the compound of formula (I) and the polymer into a hydrophilic colloid can be carried out by various dispersion methods as follows.

(1) A method comprising dissolving or dispersing the compound of formula (I) and the polymer directly in a hydrophilic colloid, or dissolving or dispersing them in an aqueous solution or solvent, and then using for the emulsion layer or hydrophilic colloidal layer.

The compound or polymer may be introduced in the form of a solution in an appropriate solvent, such as methanol, ethanol, propanol, methyl cellosolve, halogenated alcohols as described in Japanese Patent Application (OPI) No. 9715/73 and U.S. Pat. No. 3,756,830, acetone, methyl ethyl ketone, water, pyridine, etc. or a mixture thereof. In this case, the solution may contain various surface active agents.

(2) A method comprising dissolving the compound and polymer of the present invention in an oil, i.e., a substantially water-insoluble high-boiling point solvent having a boiling point above about 160° C., and dispersing the solution in a hydrophilic colloidal solution.

This method is commonly and frequently employed in the art, and so-called emulsifying dispersion comes under this category. It is also possible to follow this technique without using the high-boiling point organic solvent, i.e., a so-called oilless dispersion.

In place of or in combination with the above-described high-boiling point organic solvents, organic solvents having a boiling point between 30° C. and about 150° C. or water-soluble organic solvents, such as lower alkyl acetates (e.g., ethyl acetate, butyl acetate, etc.), ethyl propionate, sec-butyl alcohol, methyl isobutyl ketone, β-ethoxyethyl acetate, methyl cellosolve acetate, cyclohexanone, methyl ethyl ketone, N,N-dimethylformamide, dimethyl sulfoxide, methyl cellosolve, acetone, tetrahydrofuran, dioxane, etc., can be employed. In this case, it is advantageous that the compound of formula (I) and the polymer should be dissolved in these organic solvents simultaneously.

It is very effective to incorporate a surface active agent into either an aqueous phase or an oily phase.

The aqueous phase under dispersion may contain a hydrophilic colloid, but a dispersion using no hydrophilic colloid, i.e., binder, is also very advantageous.

The step involved in the dispersion technique falling under this category is subject to wide variation. With respect to, for example, a phase, while an oil-in-water (O/W) phase is frequently utilized, a technique of phase inversion of the emulsion as disclosed in Japanese Patent Application (OPI) No. 129136/80 is also useful to bring out the effects of the present invention.

The low-boiling point organic solvents or organic solvents having water solubility of several percent or higher can be removed after dispersion by distillation under reduced pressure, washing with water, ultrafiltration, or the like. More specifically, the method described in Japanese Patent Application (OPI) No. 158437/85 is useful to this effect.

(3) A method comprising impregnating the compound of formula (I) in a polymer latex to prepare a polymer latex composition for filling a hydrophilic colloidal layer.

The polymer latex which can be used includes urethane polymers and polymers obtained from vinyl monomers. Suitable vinyl monomers to be used include acrylic esters (e.g., methyl acrylate, ethyl acrylate, butyl acrylate, hexyl acrylate, octyl acrylate, dodecyl acrylate, glycidyl acrylate, etc.), α-substituted acrylates (e.g., methyl methacrylate, butyl methacrylate, octyl methacrylate, glycidyl methacrylate, etc.), acrylamides (e.g., butylacrylamide, hexylacrylamide, etc.), α-substituted acrylamides (e.g. butylmethacrylamide, dibutylmethacrylamide, etc.), vinyl esters (e.g., vinyl acetate, vinyl butyrate, etc.), vinyl halides (e.g., vinyl chloride, etc.), vinylidene halides (e.g., vinylidene chloride, etc.), vinyl ethers (.g., vinyl methyl ether, vinyl octyl ether, etc.), styrene, α-substituted styrenes (e.g., α-methylstyrene, etc.), nucleus-substituted styrenes (e.g., hydroxystyrene, chlorostyrene, methylstyrene, etc.), ethylene, propylene, butylene, butadiene, acrylonitrile, and the like. These vinyl monomers may be used either individually or in combination or with other vinyl monomers as minor comonomers. Examples of the other vinyl comonomers are itaconic acid, acrylic acid, methacrylic acid, hydroxyalkyl acrylates, hydroxyalkyl methacrylates, sulfoalkyl acrylates, sulfoalkyl methacrylates, styrenesulfonic acid, etc.

The above-described filling polymer latices can be prepared in accordance with the methods disclosed, e.g., in Japanese Patent Publication No. 39853/76 and Japanese Patent Application (OPI) Nos. 59943/76, 137131/78, 32552/79, 107941/79, 133465/80, 19043/81, 19047/81, 126830/81, and 149038/83.

(4) A method comprising dissolving the compound of formula (I) and the polymer by using a surface active agent.

The surface active agent to be used may be either oligomeric or polymeric. The polymeric surface active agents include those described in Japanese Patent Application (OPI) No. 13031/80, and the oligomeric ones include Demol® E or N (trade names of Kao Atlas Co., Ltd.) and those described in Japanese Patent Application (OPI) Nos. 108113/82 and 63124/82.

Techniques generally known for solubilization are included under this method.

(5) A method similar to the above-described second method but using a polymer in place of the high-boiling point organic solvent.

Reference can be made to it in, e.g., U.S. Pat. No. 3,619,195 and West German Patent No. 1,957,467.

A polymer dispersion method as disclosed, e.g., in Japanese Patent Application (OPI) No. 184247/85 and U.S. Pat. No. 4,366,236 is also useful. The method as disclosed is, of course, applicable even though the main compound to be dispersed is varied.

(6) A method utilizing encapsulation using a polymer having a carboxyl group, a sulfo group, etc. in the side chain thereof as described in Japanese Patent Application (OPI) No. 113434/84.

(7) A method comprising mixing a solution of the compound of formula (I) in an alkali with a hydrophilic colloidal solvent and gradually lowering the pH of the mixture while stirring (called alkali dispersion).

In this method, the polymer of the invention is added to the hydrophilic colloidal solvent together with the compound of formula (I) or separately. This method is suitable for dispersing compounds having a water-soluble group and is characterized by ease of obtaining a fine micelle dispersion. It is useful to employ a surface active agent, an organic solvent, etc. in combination.

In addition to the above-described methods, coexistence of the compound of formula (I) and the polymer according to the present invention may be achieved by the methods described, e.g., in Japanese Patent Application (OPI) Nos. 19534/76, 87429/82, 151636/85, 151633/85, 4034/85, and 107642/85, and U.S. Pat. No. 2,852,782. These known methods can be applied to the present invention by substituting the compound of formula (I) for the substance to be dispersed in the respective method, such as couplers. In particular, a method in which monomers are polymerized in the presence of the compound of formula (I) is useful.

In carrying out the above-illustrated various dispersion methods, it is desirable to use a dispersing machine having a large shear force or high ultrasonic energy. Emulsifying dispersion machines having a high shear force include a high-speed stirring type dissolver, homomixer, homoblender or homogenizer, and, as another type, a Mantongolin, a colloid mill, etc.

When the dispersed phase is in the form of particles, the dispersed particle size is of importance. For example, in the case of oil droplets containing a coupler, photographic characteristics greatly depend on the particle size. Therefore, control of the particle size is an important factor for assuring the effectiveness of the present invention. A coupler dispersion which can be used in this invention preferably has a particle size as small as 0.5 μm or less. In some cases, however, dispersed particles having not such small sizes can be rather advantageous in view of the total photographic characteristics. Accordingly, an optimum range of particle size is determined by appropriately taking into consideration various factors, such as the kind of dispersing machine, the speed and time of rotation, the kind and use of a surface active agent, the viscosity of an oily phase or the amount of an organic solvent, the viscosity of an aqueous phase or the binder concentration, the aqueous to oily phase volume ratio, whether phase inversion is involved or not, the pH level, and the like, and combinations of these factors.

Because the compound of formula (I) releases a photographically useful group or its precursor on receipt of an electron from a reducing substance, the reducing substance is, in turn, oxidized. If the oxidation-reduction reaction imagewise takes place, the reducing substance which is not oxidized remains in a reverse image.

The reducing substance which can be used in the present invention may be either organic or inorganic and preferably has an oxidation potential lower than the standard redox potential of a silver ion/silver system, e.g., 0.80 V.

The inorganic reducing substances include metals having an oxidation potential of 0.8 V or less (e.g., Mn, Ti, Si, Zn, Cr, Fe, Co, Mo, Sn, Pb, W, Sb, Cu, and Hg), H2, ions having an oxidation potential of 0.8 V or less or complex compounds thereof (e.g., $Cr^{2+}$, $V^{2+}$, $Cu^{+}$, $Fe^{2+}$, $MnO_4^{2-}$, $I^-$, $Co(CN)_6^{4-}$, $Fe(CN)_6^{4-}$, $(Fe\text{-}EDTA)^{2-}$, etc.), metal hydrides having an oxidation potential of 0.8 V or less (e.g., NaH, LiH, KH, $NaBH_4$, $LiAl(O\text{-}C_4H_9\text{-}t)_3H$, $LiAl(OCH_3)_3H$, etc.), and sulfur or phosphorus compounds having an oxidation potential of 0.8 V or less (e.g., $Na_2SO_3$, NaHS, $NaHSO_3$, $H_3P$, $H_2S$, $Na_2S$, $Na_2S_2$, etc.).

The organic reducing substances include organic nitrogen compounds, such as aliphatic or aromatic amines; organic sulfur compounds such as aliphatic or aromatic thiols; organic phosphorus compounds, such as aliphatic or aromatic phosphines, and preferably compounds following Kendall-Pelz rule (T. H. James, *The Theory of the Photographic Process,* 4th Ed., 299).

Examples of the compounds usable as a reducing substance in the present invention include inorganic reducing agents, such as sodium sulfite, sodium hydrogensulfite, etc., benzenesulfinic acids, hydroxylamines, hydrazines, hydrazides, borane-amine complexes, hydroquinones, aminophenols, catechols, p-phenylenediamines, 3-pyrazolidinones, hydroxytetronic acid, ascorbic acid, 4-amino-5-pyrazolones, and the like. In addition, the reducing agents described in pages 291 to 334 of the above-described literature by T. H. James as well as the reducing agent precursors described in Japanese Patent Application (OPI) Nos. 138736/81 and 40245/82 and U.S. Pat. No. 4,330,617 can also be employed.

Specific examples of the reducing agents which can be used preferably include 3-pyrazolidones and precursors thereof, e.g., 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, 5-methyl-3-pyrazolidone, 1,5-diphenyl-3-pyrazolidone, 1-phenyl-4-methyl-4-stearoyloxymethyl-3-pyrazolidone, 1-phenyl-4-methyl-4-lauroyloxymethyl-3-pyrazolidone, 1-phenyl-4,4-bis(lauroyloxymethyl)-3-pyrazolidone, 1-phenyl-2-acetyl-3-pyrazolidone, 1-phenyl-3-acetoxypyrazolidone, etc.; hydroquinones and precursors thereof, e.g., hydroquinone, toluhydroquinone, 2,6-dimethylhydroquinone, t-butylhydroquinone, 2,5-di-t-butylhydroquinone, t-octylhydroquinone, 2,5-di-t-octylhydroquinone, pentadecylhydroquinone, sodium 5-pentadecylhydroquinone-2-sulfonate, p-benzolyloxyphenol, 2-methyl-4-benzoyloxyphenol, 2-t-butyl-4-(4-chlorobenzoyloxy)phenol, sodium hydroquinone-2-sulfonate, 2-[3,5-bis(2-hexyldecanamido)benzamido]hydroquinone, 2-(3-hexadecanamido)benzamidohydroquinone, 2-(2-hexyldecanamido)hydroquinone, etc.; p-phenylenediamine color developing agents, e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl4-amino-N-ethyl-N-8-butoxyethylaniline, 3-methyl-4-amino-N-ethyl-N-β-methanesulfonamidoethylaniline, 4-amino-3-methyl-N-ethyl-N-β-methoxyethylaniline, etc.; and aminophenol reducing agents, e.g., 4-amino-2,6-dichlorophenol, 4-amino-2,6-dibromophenol, 4-amino-2-methylphenol sulfate, 4-amino-3-methylphenol sulfate, 4-amino-2,6-dichlorophenol hydrochloride, etc. 2,6-Dichloro-4-substituted sulfonamidophenols and 2,6-dibromo-4-substituted sulfonamidophenols described in *Research Disclosure,* No. 15108 and U.S. Pat. No. 4,021,240, and p-(N,,N-dialkylaminophenyl)sulfamines described in Japanese Patent Application (OPI) No. 116740/84 are also useful. In addition to the above phenolic reducing agents, naphthol reducing agents, such as 4-aminonaphthol derivatives and 4-substituted sulfonamidonaphthol derivatives are also useful. General color developing agents applicable as reducing agents further include aminohydroxypyrazole derivatives described in U.S. Pat. No. 2,895,825, aminopyrazoline derivatives described in U.S. Pat. No. 2,892,714, and hydrazone derivatives described in *Research Disclosure,* Nos. 19412 and 19415, pp. 227–230 and 236–240 (June, 1980). These color developing agents may be used either individually or in combination of two or more.

In what follows, functions of the compounds of formula (I) according to the present invention in silver halide photographic materials will be illustrated.

The compound of the present invention incorporated into the silver halide photographic materials is reduced through the electron transfer indicated by the arrows in Scheme A:

Scheme A:

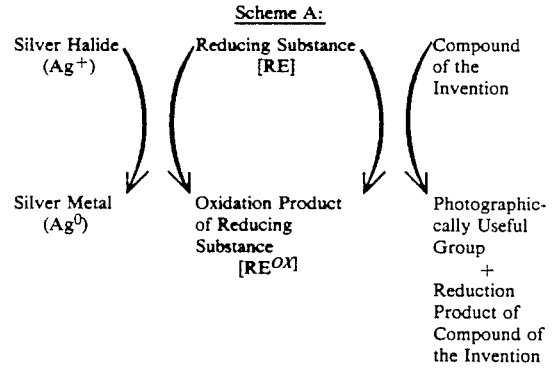

In Scheme A, reducing substance [RE], which is the above-described organic or inorganic reducing substance, may be externally supplied from a processing solution or may be previously incorporated into the photographic material. Further, the reducing substance may be contained in the photographic material and also the same or a different kind of reducing agent [R] may be supplied from a processing solution.

When a common negative-working silver halide emulsion is used, the reducing substance [RE] is consumed for reduction of silver halide in accordance with the extent of exposure to light. Therefore, only the part of the supplied reducing substance [RE] that remains unused for reduction of silver halide, that is, in an amount inversely corresponding to the exposure is subjected to reaction with the compound of the invention. In other words, the lesser the exposure, the more the photographically useful group is released. When, on the contrary, an autopositive emulsion is used, since reduction of silver halide occurs in unexposed areas, the reducing substance is consumed in the unexposed areas. Therefore, the reaction between the compound of the invention and the reducing substance becomes more active to release a larger amount of the photographically useful group as the exposure increases.

As mentioned above, the compound according to the present invention releases a photographically useful group in a small amount in a developed area (an area where silver halide is reacted with a reducing substance) and in a large amount in a non-developed area. In order to adjust, and usually, increase the ratio of releasing a photographically useful group in a developed area to that in a non-developed area, a reducing substance called an electron transport agent [ETA] may be used in combination as shown in Scheme B:

Scheme B:

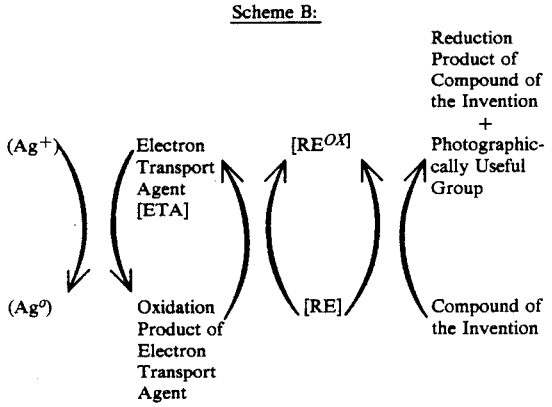

The electron transport agent [ETA] can be selected from among the above-illustrated reducing substances, and preferably organic reducing agents. In order to attain more favorable activities of the electron transport agent [ETA], [ETA] is desirably positioned in the middle between the reducing substance [RE] and silver halide in terms of redox potential.

The mode of supply of the electron transport agent [ETA] and reducing substance [FE] is the same as described with respect to Scheme A.

In Scheme B, the process of releasing a photographically useful group is the same as in Scheme A, except that an electron is transferred from the reducing substance to silver halide via the electron transport agent. When the reducing substance is immobile, electron transfer to silver halide is sometimes slow As can be understood from Scheme A, if electron transfer from the reducing substance to silver halide is slow, the reaction between the reducing substance and the compound of the invention preferentially takes place so that the difference in quantity of released photographically useful group between a developed area and a non-developed area becomes small./ Accordingly, the electron transport agent can be utilized to the effect that the electron transfer from the immobile reducing substance to silver halide may proceed smoothly thereby to make such a difference of release between a developed area and a non-developed area greater. In this connection, the electron transport agent, when combined with an immobile reducing substance [RE], should have greater mobility than [RE]. As shown in Scheme B, effective use of an immobile reducing substance can be made by employing an electron transport agent.

The reducing substance to be combined with [ETA] may be any of those enumerated above as long as it is substantially immobile in the layers of photographic materials. Particularly preferred among them are hydroquinones, aminophenols, aminonaphthols, 3-pyrazolidinones, saccharin, precursors of these reducing substances, picoliniums, and the compounds disclosed in Japanese Patent Application (OPI) No. 110827/78 as electron donors.

Specific examples of the reducing agent which can be used in the present invention are shown below.

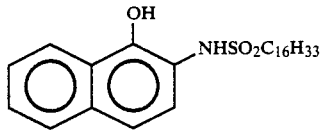

S-1

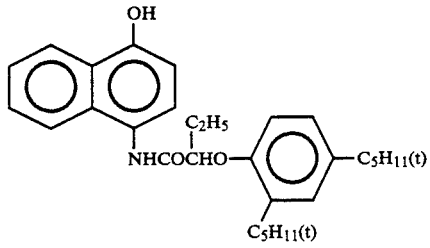

S-2

-continued
S-3
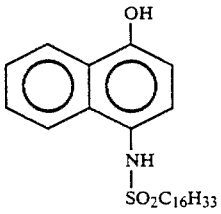
S-4
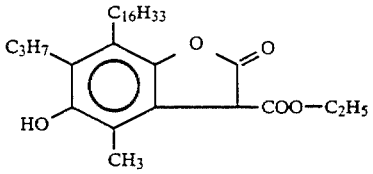
S-5
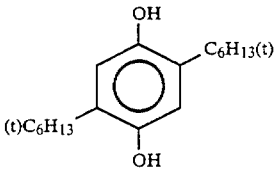
S-6
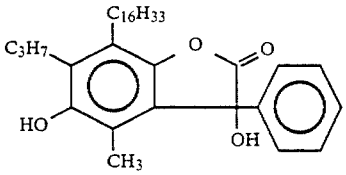
S-7
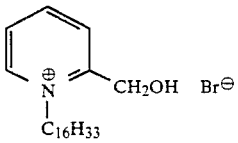
S-8
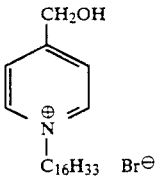
S-9
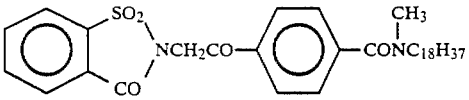
S-10
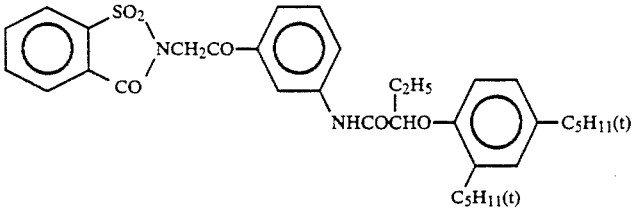

-continued
S-11
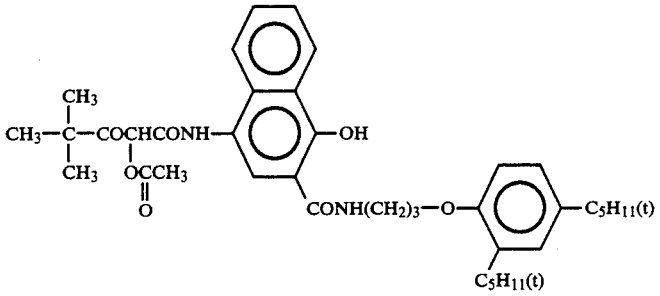
S-12
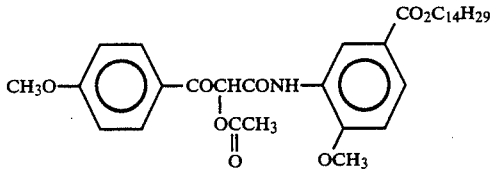
S-13
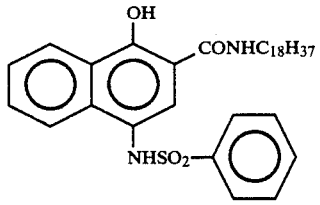
S-14
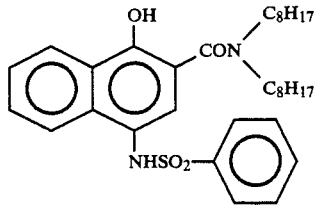
S-15
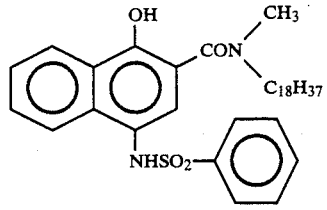
S-16
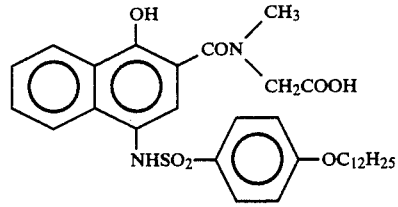
S-17
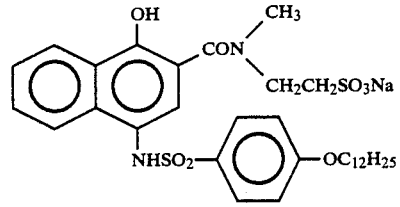

-continued
S-18
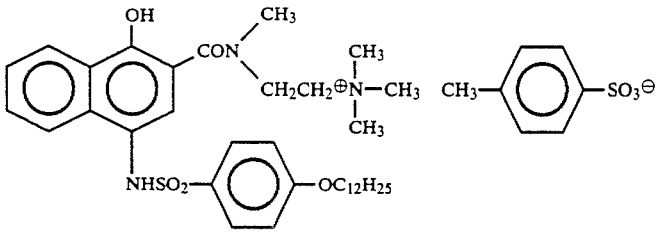
S-19
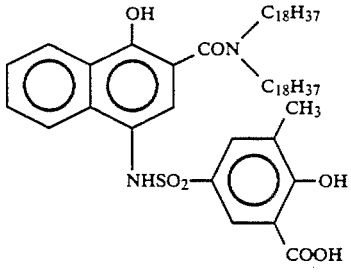
S-20
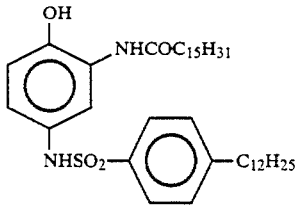
S-21
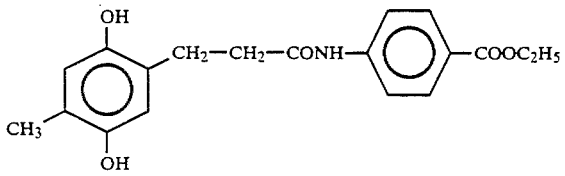
S-22
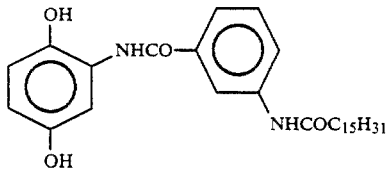
S-23
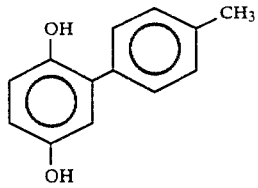
S-24
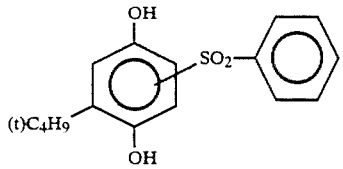
S-25
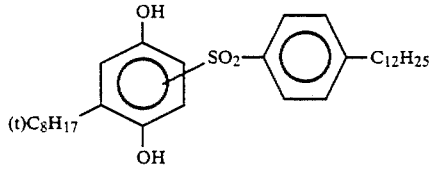

-continued
S-26
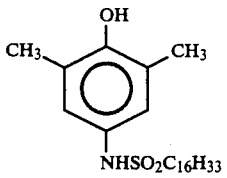
S-27
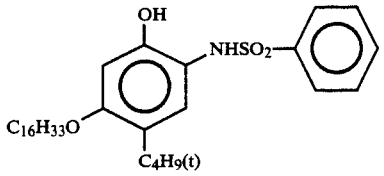
S-28
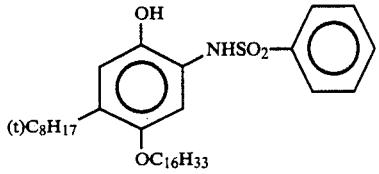
S-29
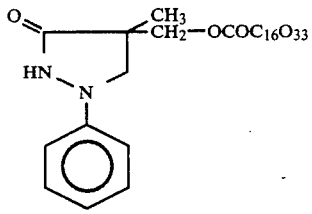
S-30
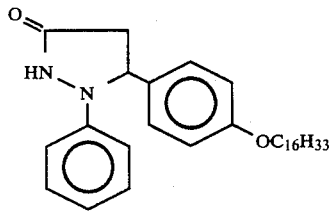
S-31
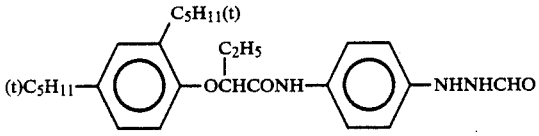
S-32
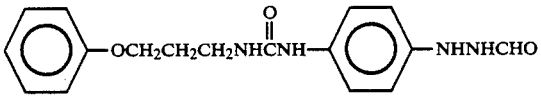
S-33
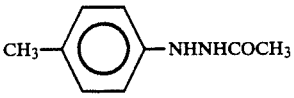
S-34
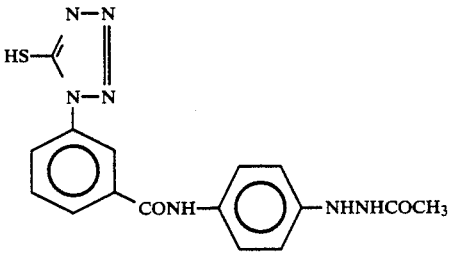

-continued
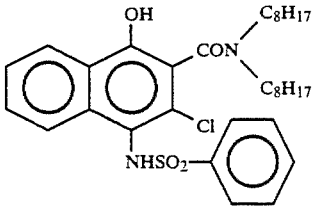
S-35
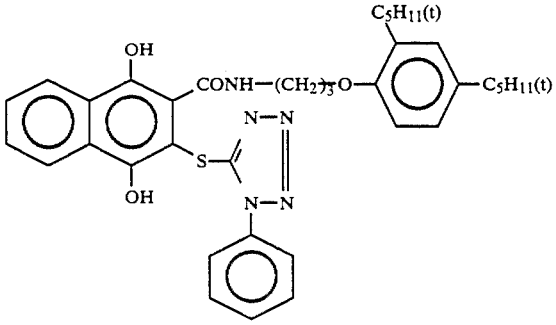
S-36
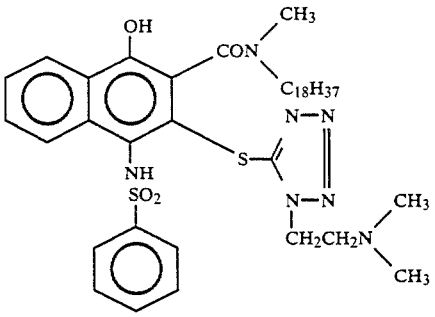
S-37
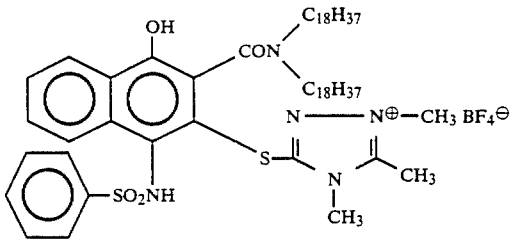
S-38
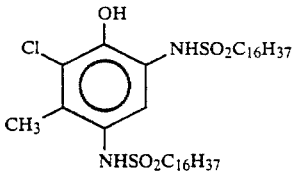
S-39
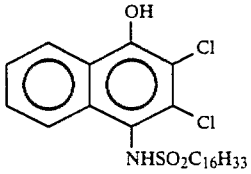
S-40

-continued
S-41
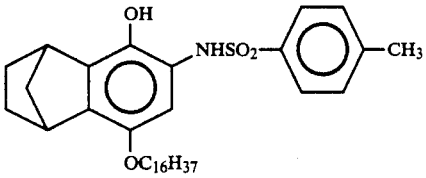
S-42
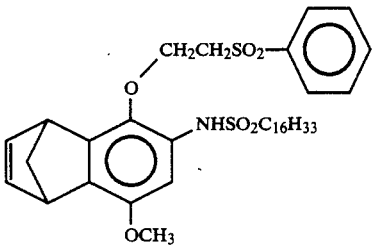
S-43
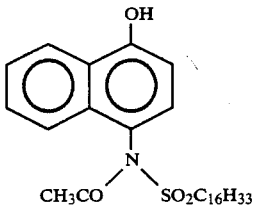
S-44
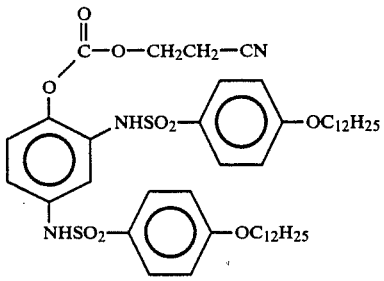
S-45
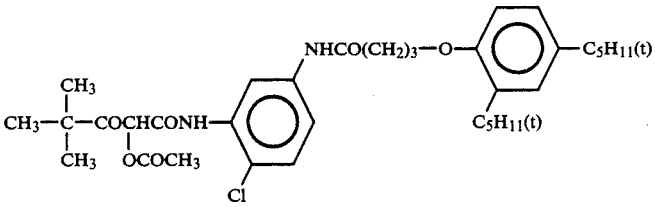
S-46
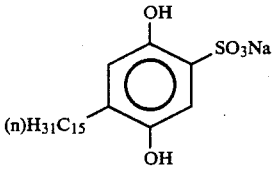
S-47
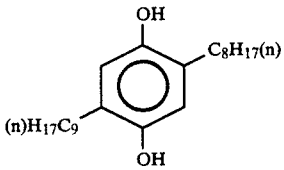

-continued

S-48

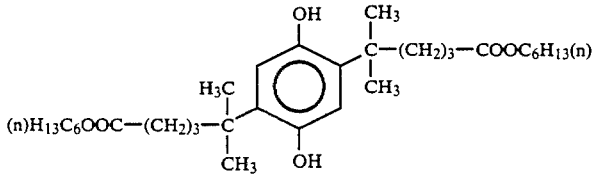

S-49

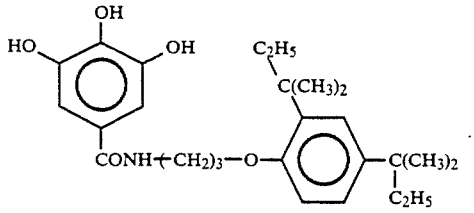

S-50

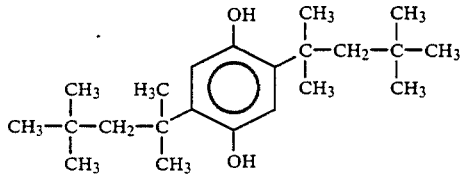

S-51

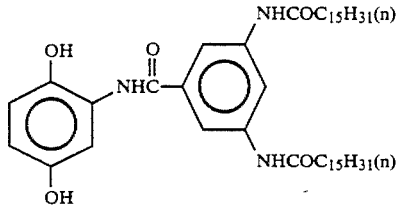

S-52

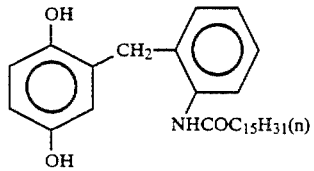

S-53

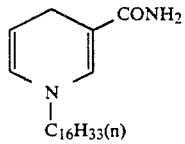

In the case where the compound of formula (I) and the reducing substance are provided on the same support, it is preferable to incorporate them in the same layer or layers adjacent to each other.

On the other hand, reducing substances which can be incorporated into a processing solution include alkali-soluble reducing substances, such as ordinary developing agents, hydroquinones, inorganic reducing agents, and the like. Many of these reducing substances are frequently employed for other purposes, and their function as reducing agent for the compound of formula (I) can be combined with the other function. For instance, the reducing substance may also serve as a color mixing inhibitor or discoloration inhibitor. Developing agents such as phenidone combine the function of silver development through cross oxidation of a dye-providing redox compound with the function of reducing the compound of formula (I).

The present invention can be applied to various conventional silver halide photographic materials. For example, the compounds of the present invention can be used in color photographic materials having a coupler system for the purpose of acceleration of development or desilvering and the like. The color photographic materials to which the present invention is applicable include color negative films for photography (for general use, for professional use, or for motion pictures), color reversal films, color papers, color reversal papers, positive motion picture films, and so on.

The compounds of the present invention can also be applied to color photographic materials according to the silver dye bleach process as described, e.g., in T. H. James (ed.), *The Theory of the Photographic Process*, Chapter 12, "Principles and Chemistry of Color Photography IV. Silver Dye Bleach Process", 4th Ed., pp. 363–366, Macmillan, New York (1977).

Further, the compounds of the present invention can be used in black-and-white photographic materials for the purpose of accelerating the development progress to obtain a desired maximum image density through short time processing. The black-and-white photographic materials include direct X-ray films for medical use, black-and-white films for general photography, lith films, scanner films, and the like.

In case the present compounds are applied to conventional silver halide photographic materials, two systems are preferred for the reaction of the aforesaid reducing substance or the combination of the aforesaid reducing substance and ETA with the photographic material. In one system, the reducing substance or the combination of the reducing substance and ETA is applied to the photographic material in the form of a developing solution in developement thereof; and in the other system, the reducing substance is previously incorporated in the photographic material and the ETA is applied to the material in the form of a developing solution. In the former system, the preferred amount to be used is from 0.001 mole/liter to 1 mole/liter, which is the concentration of the substance(s) in the total developing solution. In the latter system of previous incorporation in the element, from 0.5 to 5 moles of the reducing substance is preferably incorporated into the material per mole of the present compound(s), and the concentration of ETA in the solution is preferably from 0.001 mole/liter to 1 mole/liter.

On the other hand, in case the present compounds are applied to a heat developable photographic material, the reducing substance or the combination of the reducing substance and ETA is preferably previously incorporated into the heat developable photographic material. In this case, the preferred amounts are from 0.5 to 5 moles of the reducing substance and from 0.1 to 10 moles of ETA, per mole of the present compound(s).

Silver halide emulsions which can be used in the present invention can be generally prepared by mixing a water-soluble silver salt (e.g., silver nitrate) and a water-soluble halogen salt (e.g., potassium bromide) in the presence of a water-soluble high polymer solution (e.g., gelatin). The silver halide includes silver chloride, silver bromide, and mixed silver halide, e.g., silver chlorobromide, silver iodobromide, silver chloroiodobromide, etc. Silver halide grains preferably have a mean grain size of not greater than 2 μm, and more preferably not more than 0.4 μm, the mean grain size being the diameter in the case of spherical or nearly spherical grains or the edge length in the case of cubic grains, being averaged based on a projected area. Grain size distribution may be either narrow or broad.

The silver halide grains may have any crystal form, such as a cubic form, an octahedral form, a composite form thereof, a tabular form as described in Japanese Patent Application (OPI) Nos. 127921/83 and 113926/83, and the like.

Two or more silver halide emulsions separately prepared may be used as a mixture. The individual silver halide grains may be homogeneous throughout the crystal structure or may have a layered structure composed of an outer shell and a core having different halogen compositions. Further, the grains may be of a conversion type as described in British Patent 635,841 and U.S. Pat. No. 3,622,318. The grains may be either of a surface latent image type in which a latent image is predominantly formed on the surface area or of an inner latent image type in which a latent image is predominantly formed in the inside thereof.

During the formation of the silver halide grains or during subsequent physical ripening, a cadmium salt, a zinc salt, a lead salt, a thallium salt, an iridium salt or a complex salt thereof, a rhodium salt or a complex salt thereof, an iron salt or a complex salt thereof, etc. may be present in the system.

The silver halide emulsion may be used without chemical sensitization, that is, as a primitive emulsion, but is usually subjected to chemical sensitization. Chemical sensitization can be carried out by sulfur sensitization using active gelatin or a sulfur-containing compound capable of reacting with silver, e.g., thiosulfates, thioureas, mercapto compounds, rhodanines, etc.; reduction sensitization using a reducing substance, e.g., stannous salts, amines, hydrazine derivatives, formamidinesulfines, silane compounds, etc.; noble metal sensitization using a noble metal compound, e.g., gold compounds as well as complex salts of group VIII metals, e.g., platinum, iridium, palladium, etc.; and combinations thereof.

Binders or protective colloids which can be used in the emulsion layers or intermediate layers include gelatin to advantage. Other hydrophilic colloids may also be employed. Examples of the hydrophilic colloids are proteins, such as gelatin derivatives, graft polymers of gelatin and other high polymers, albumin, casein, etc.; cellulose derivatives, e.g., hydroxyethyl cellulose, carboxymethyl cellulose, cellulose sulfate, etc.; sugar derivatives, e.g., sodium alginate, dextran, starch derivatives, etc.; and a variety of synthetic hydrophilic polymers, such as polyvinyl alcohol, polyvinyl alcohol partial acetal, poly-N-vinylpyrrolidone, polyacrylic acid, polymetharylic acid, polyacrylamide, polyvinylimidazole, polyvinylpyrazole, etc., as well as copolymers comprising the monomers constituting the homopolymers.

Gelatin to be used includes not only lime-processed gelatin but acid- or enzyme-processed gelatin and hydrolysis products or enzymatic decomposition products of gelatin.

The photographic emulsion layers or other hydrophilic colloidal layers can contain organic or inorganic hardening agents. Examples of the hardening agents include chromates (e.g., chromium alum, chromium acetate, etc.), aldehydes (e.g., formaldehyde, glyoxal, glutaraldehyde, etc.), N-methylol compounds (e.g., dimethylolurea, methyloldimethylhydantoin, etc.), dioxane derivatives (e.g., 2,3-dihydroxydioxane, etc.), active vinyl compounds (e.g., 1,3,5-triacryloylhexahydro-s-triazine, 1,3-vinylsulfonyl-2-propanol, etc.), active halogen compounds (e.g., 2,4-dichloro-6-hydroxy-s-triazine, etc.), mucohalogenic acids (e.g., mucochloric acid, mucophenoxychloric acid, etc.), N-carbamoylpyridinium salts [e.g., (1-morpholinocarbonyl-3-pyridinio)methanesulfonate, etc.], and haloamidinium salts [e.g., 1-(1-chloro-1-pyridinomethylene)pyrrolidinium-2-naphthalenesulfonate, etc.], and combinations thereof. Preferred of these compounds are active vinyl compounds and active halogen compounds.

The photographic emulsion layers or other hydrophilic colloidal layers of the photographic materials may further contain various surface active agents as a coating aid or antistatic or for improvement of slip properties, improvement of emulsifying dispersibility, prevention of adhesion, improvement of photographic characteristics (e.g., acceleration of development, increase of contract, and increase of sensitivity), and the like.

Examples of the surface active agents to be added include nonionic surface active agents, such as saponin (steroid type), alkylene oxide derivatives (e.g., polyethylene glycol, polyethylene glycol/polypropylene glycol condensation products, polyethylene glycol alkyl ether or alkylaryl ether, polyethylene glycol esters, polyethylene glycol sorbitan esters, polyalkylene glycol alkylamines or amides, silicon-polyethylene oxide adducts, etc.), glycidol derivatives (e.g., alkenylsuccinic acid polyglycerides, alkylphenol polyglycerides, etc.), fatty acid esters of polyhydric alcohols, and alkyl esters of sugars; anionic surface active agents containing an acid group (e.g., carboxyl, sulfo, phospho, sulfate, and phosphate groups), such as alkylcarboxylates, alkylsulfonates, alkylbenzenesulfonates, alkylnaphthalenesulfonates, alkylsulfates, alkyl phosphates, N-acyl-N-alkyltaurines, sulfosuccinates, sulfoalkylpolyoxyethylene alkylphenyl ethers, polyoxyethylene alkylphosphates, and the like; amphoteric surface active agents, such as amino acids, aminoalkylsulfonic acids, aminoalkyl sulfates or phosphates, alkylbetaines, amine oxides, and the like; and cationic surface active agents, such as alkylamine salts, aliphatic or aromatic quaternary ammonium salts, heterocyclic quaternary ammonium salts, e.g., pyridinium, imidazolium, etc., aliphatic or heterocyclic phosphonium or sulfonium salts, and the like. In particular, fluorine-containing compounds are preferred as antistatics.

The photographic emulsions to be used in this invention may be spectrally sensitized with methine dyes or others. Dyes to be used for spectral sensitization include cyanine dyes, merocyanine dyes, complex cyanine dyes, complex merocyanine dyes, holopolar cyanine dyes, hemicyanine dyes, styryl dyes, and hemioxonol dyes. Of these, cyanine dyes, merocyanine dyes and complex merocyanines dyes are particularly useful. Any of basic heterocyclic nuclei generally utilized in cyanine dyes can be applied to these dyes. Such basic heterocyclic nuclei include pyrroline, oxazoline, thiazoline, pyrrole, oxazole, thiazole, selenazole, imidazole, tetrazole, and pyridine nuclei; the above-described nuclei to which an alicyclic hydrocarbon ring is fused; and the abovedescribed nuclei to which an aromatic hydrocarbon ring is fused, e.g., indolenine, benzindolenine, indole, benzoxazole, naphthoxazole, benzothiazole, naphthothiazole, benzoselenazole, benzimidazole, and quinoline nuclei. These nuclei may have substituents on the carbon atoms thereof.

To the merocyanine dyes or complex merocyanine dyes can be applied a 5- to 6-membered heterocyclic nucleus having a ketomethylene structure, e.g., pyrazolin-5-one, thiohydantoin, 2-thiooxazolidin-2,4-dione, thiazolidin-2,4-dione, rhodanine, and thiobarbituric acid nuclei. These sensitizing dyes may be used either individually or in combinations thereof. In particular, combinations of sensitizing dyes are often used for supersensitization.

For the purpose of increasing sensitivity or contrast or accelerating development, the photographic emulsion layers may contain, for example, polyalkylene oxides or derivatives thereof (e.g., ethers, esters, and amides), thioether compounds, thiomorpholines, quaternary ammonium salt compounds, urethane derivatives, urea derivatives, imidazole derivatives, 3-pyrazolidones, etc.

For the purpose of improving dimensional stability and the like, the photographic emulsion layers or other hydrophilic colloidal layers can also contain a dispersion of a water-insoluble or sparingly water-soluble synthetic polymer, such as homo- or copolymers of alkyl (meth)acrylates, glycidyl (meth)acrylate, styrene, etc., individually or in combination or copolymers comprising these monomers and acrylic acid, methacrylic acid, etc.

The hydrophilic colloidal layers of the photographic material may further contain various water-soluble dyes as filter dyes or for prevention of irradiation or for other purposes. Such water-soluble dyes include oxonol dyes, hemioxonol dyes, styryl dyes, merocyanine dyes, cyanine dyes, and azo dyes, with oxonol dyes, hemioxonol dyes, and merocyanine dyes being particularly useful.

For the purpose of preventing fog during preparation, preservation or photographic processing of the photographic materials or stabilizing photographic performance properties, the photographic emulsion layers can contain various compounds other than the compounds of formula (I). Such compounds include azoles, such as benzothiazolium salts, nitroimidazoles, nitrobenzimidazoles, chlorobenzimidazoles, bromobenzimidazoles, nitroindazoles, benzotriazoles, aminotriazoles, etc.; mercapto compounds, e.g., mercaptothiazoles, mercaptobenzothiazoles, mercaptobenzimidazoles, mercaptothiadiazoles, mercaptotetrazoles (especially 1-phenyl-5-mercaptotetrazole), mercaptopyrimidines, mercaptotriazines, etc.; thioketo compounds, e.g., oxazolinethione, etc.; azaindenes, e.g., triazaindenes, pentaazaindenes, etc.; benzenethiosulfonic acid, benzenesulfinic acid, benzenesulfonic acid amide, etc.; and many other compounds known as antifoggants or stabilizers.

The photographic materials according to the present invention can contain color image forming couplers, i.e., compounds capable of developing a color upon oxidative coupling with an aromatic primary amine developing agent, such as phenylenediamine derivatives, aminophenol derivatives, and so on. Couplers that are nondiffusible due to a hydrophobic group called a ballast group or couplers in a polymer form are preferred. The couplers may be either 2-equivalent or 4-equivalent to a silver ion. In addition to the color forming couplers, the photographic materials may further contain colored couplers having a color correction effect, couplers capable of releasing a development inhibitor on development (so-called DIR couplers), or colorless DIR coupling compounds which produce a colorless coupling product and release a development inhibitor.

Magenta-forming couplers include 5-pyrazolone couplers, pyrazolobenzimidazole couplers, cyanoacetylcoumarone couplers, open-chain acylacetonitrile couplers, pyrazolotriazole couplers, etc. Yellow-forming couplers include acylacetamide couplers (e.g., benzoylacetanilides and pivaloylacetanilides), etc. Cyan-forming couplers include naphthol couplers and phenol couplers.

In order to satisfy characteristics required for the photographic materials, one layer may contain two or more of these couplers and the like, or two or more layers may contain the same coupler.

Introduction of the coupler into silver halide emulsion layers can be carried out by known methods, such as the method described in U.S. Pat. No. 2,322,027. For example, the coupler is dissolved in an organic solvent, and the solution is then dispersed in a hydrophilic colloid. The organic solvent to be used includes high-boiling point organic solvents, such as alkyl phthalates (e.g., dibutyl phthalate and dioctyl phthalate), phosphoric esters (e.g., diphenyl phosphate, triphenyl phosphate, tricresyl phosphate, and dioctylbutyl phosphate), citric esters (e.g., acetyl tributyl citrate), benzoic esters (e.g., octyl benzoate), alkylamides (e.g., diethyllaurylamide), fatty acid esters (e.g., dibutoxyethyl succinate and diethyl azelate), trimesic esters (e.g., tributyl trimesate), and the like; and organic solvents having a boiling point of from about 30° C. to about 150° C., such as lower alkyl acetates (e.g., ethyl acetate and butyl acetate), ethyl propionate, sec-butyl alcohol, methyl isobutyl ketone, β-ethoxyethyl acetate, methyl cellosolve acetate, etc. Mixtures of these high-boiling organic solvents and low-boiling organic solvents may also be used.

Polymer dispersion methods as disclosed in Japanese Patent Publication Nos. 30494/73 and 39853/76, Japanese Patent Application (OPI) Nos. 102334/75, 5133/76, and 59943/76, WO 8800723, European Patent 56531A, West German Patent 2,830,917, and U.S. Pat. No. 3,619,195 are also employable.

When a coupler has an acid group, e.g., a carboxyl group, a sulfo group, etc., it is formulated as an alkaline aqueous solution and then introduced into a hydrophilic colloid, as disclosed in Japanese Patent Publication No. 7561/68.

The photographic material of the present invention can contain known discoloration inhibitors, e.g., hydroquinone derivatives, gallic acid derivatives, p-alkoxyphenols, p-hydroxyphenol derivatives, and bisphenols.

In addition to the above-mentioned additives, the photographic materials according to the present invention can contain other various known additives. Specific examples of useful additives are described in *Research Disclosure* No. 17643 and ibid, No 18716 as tabulated below.

| Photographic Additives | | |
|---|---|---|
| Kind | RD 17643 | RD 18716 |
| Chemical sensitizer | p. 23 | p. 648, right column |
| Sensitivity increasing agent | | p. 648, right column |
| Spectral sensitizer and supersensitizer | pp. 23–24 | from p. 648, right column to p. 649, left column |
| Brightening agent | p. 24 | |
| Antifoggant and stabilizer | pp. 24–25 | p. 649, right column |
| Light absorbent, filter dye, and UV absorbent | pp. 25–26 | from p, 649, right column to p. 650, left column |
| Stain inhibitor | p. 25, right column | p. 650, from left to right column |
| Dye image stabilizer | p. 25 | |
| Hardening agent | p. 26 | p. 651, left column |
| Binder | p. 26 | p. 651, left column |
| Plasticizer and lubricant | p. 27 | p. 650, right column |
| Coating aid and surface active agent | pp. 26–27 | p. 650, right column |
| Antistatic agent | p. 27 | p. 650, right column |

The photographic materials of the present invention can be subjected to development processing according to known methods using known processing solutions. The processing temperature is usually selected from about 18° C. to about 50° C. Temperatures lower than 18° C. or higher than 50° C. may also be employed. Depending on purposes, either of black-and-white photographic processing for forming a silver image or color photographic processing for forming a color image can be applied.

A black-and-white developing solution comprises known developing agents, such as dihydroxybenzenes (e.g., hydroquinone), 3-pyrazolidones (e.g., 1-phenyl-3-pyrazolidone), aminophenols (e.g., N-methyl-p-aminophenol), and the like, either individually or in combinations thereof.

A color developing solution to be used generally comprises an alkaline aqueous solution containing, as a main component, a known aromatic primary amine developing agent, for example, phenylenediamines, e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-Nβ-methanesulfonamidoethylaniline, 4-amino-3-methyl-N-ethyl-N-β-methoxyethylaniline, etc.

In addition, color developing agents as described in L.F.A. Mason, *Photographic Processing Chemistry,* 226–229, Focal Press (1966), U.S. Pat. Nos. 2,193,015 and 2,592,364 and Japanese Patent Application (OPI) No. 64933/73 may also be used.

The developing solutions generally contain pH buffers, such as sulfites, carbonates, borates or phosphates of alkali metals, and developing inhibitors or antifoggants, such as bromides, iodides, and organic antifoggants, and the like. If desired, the developing solutions may further contain water softeners; preservatives, e.g., hydroxylamines; organic solvents, e.g., benzyl alcohol and diethylene glycol; development accelerators, e.g., polyethylene glycol, quaternary ammonium salts, and amines; dye-forming couplers; competing couplers; fogging agents, e.g., sodium boron hydride; auxiliary developing agents, e.g., 1-phenyl-3-pyrazolidone; tackifiers; polycarboxylic acid type chelating agents as described in U.S. Patent 4,083,723; antioxidants as described in West German Patent Application (OLS) No. 2,622,950; and the like.

The photographic emulsion layers after color development are usually subjected to bleaching. Bleaching may be effected simultaneously with fixation, or these two steps may be carried out separately. Bleaching agents to be used include compounds of polyvalent metals, e.g., iron (III), cobalt (III), chromium (VI), copper (II), etc., peracids, quinones, nitroso compounds, and the like. Examples of these bleaching agents are ferricyanides; bichromates; organic complex salts of iron (III) or cobalt (III}, such as complex salts with aminopolycarboxylic acids, e.g., ethylenediaminetetraacetic acid, nitrilotriacetic acid, 1,3-diamino-2-propanoltetraacetic acid, etc., or organic acids, e.g., citric acid, tartaric acid, malic acid, etc.; persulfates; permanganates; nitrosophenol; and so on. Of these, potassium ferricyanide, sodium (ethylenediaminetetraacetato)iron (III), and ammonium (diethylenetriaminepentaacetato)iron (III) are particularly useful. (Ethylenediaminetetraacetato)iron (III) complex salts are useful in both an independent bleaching bath and a combined bleach-fix mono bath.

A bleaching or bleach-fix bath can contain bleach accelerators as described in U.S. Pat. Nos. 3,042,520 and 3,241,966 and Japanese Patent Publication Nos. 8506/70 and 836/70, thiol compounds as described in Japanese Patent Application (OPI) No. 65732/78, and various other additives.

Washing is carried out by using one washing vessel or, in many cases, two or more washing vessels arranged countercurrently. The amount of water to be supplied can be set arbitrarily depending on the purpose or the type of the color photographic material. For example, the amount of water is calculated according to the method described in S. R. Goldwasser, *Journal of Motion Picture and Television Engineering,* Vol. 64, 248–253, "Water Flow Rates in Immersion-Washing of Motion Picture Film" (May, 1955).

In the washing processing, the problem of generation of bacteria or fungi arising from water saving may be coped with by using washing water whose calcium and magnesium contents have been reduced as described in Japanese Patent Application (OPI) No. 288838/87 or adding antibacterial or antifungal agents, e.g., the compounds described in *Journal of Antibacterial and Antifungal Agents,* Vol. 11, No. 5, 207–223 (1983) and the compounds described in Hiroshi Horiguchi, *Bokinbobai no Kagaku* to washing water. Further, chelating agents, e.g., ethylenediaminetetraacetic acid, diethylenetriaminepentaacetic acid, etc., can be added to washing water as a water softener.

When water saving is effected, the amount of water to be used usually ranges from 100 to 2,000 ml per $m^2$ of a color photographic material, and, in view of consistency between color image stability and water saving effect, preferably ranges from 200 to 1,000 ml per $m^2$ of a color photographic material.

The processing solution for the washing usually has a pH of from 5 to 9.

The compounds according to the present invention can be used in any photographic materials adopting a color image formation system in which a diffusible dye is imagewise formed or released and then fixed, which embraces various embodiments, such as a color diffusion transfer process using a developing solution for development as described, e.g., in Belgian Pat. No. 757,959, a heat development process in which a diffusible hydrophilic dye image is formed by heat development in a substantially water-free condition as described, e.g., in U.S. Pat. No. 4,500,626, European Patents 76,492A and 210,660A, and Japanese Patent Application (OPI) Nos. 79247/83, 58543/83, and 238056/86, and the like.

In the above-described color image formation system, dye providing substances are used in combination with a silver halide emulsion. The dye providing substance can be represented by formula (IV):

$$\text{Dy—Y} \qquad \text{(IV)}$$

wherein Dy represents a dye moiety or a precursor thereof; and Y represents a substrate having a function to change diffusibility of the dye providing substance of formula (IV) as a result of development.

The term "to change diffusibility" as used herein means that (i) the dye providing substance (IV) changes its essential nondiffusibility to diffusibility, or a nondiffusible dye providing substance releases a diffusible dye, or (ii) the dye providing substance (IV) changes its essential diffusibility to nondiffusibility. This change in diffusibility arises as a result of oxidation of Y or reduction of Y, depending on the property of Y.

Examples of the substrate Y which cause a change of diffusibility of the dye providing substance (IV) through oxidation include those coming under a group of so-called dye-releasing redox substrates, such as p-sulfonamidonaphthols, inclusive of p-sulfonamidophenols, as specifically described in Japanese Patent Application (OPI) Nos. 33826/73 and 50736/78 and European Patent 76,492; o-sulfonamidophenols, inclusive of o-sulfonamidonaphthols, as specifically described in Japanese Patent Application (OPI) Nos. 113624/76, 12642/81, 16130/81, 16131/81, 4043/82, and 650/82, U.S. Pat. No. 4,053,312, and European Patent 76,492; hydroxysulfonamido heterocyclic compounds as specifically described in Japanese Patent Application (OPI) No. 104343/76 and European Patent 76,492; 3-sulfonamidoindoles as specifically described in Japanese Patent Application (OPI) Nos. 104343/76, 46730/78, 130122/79, and 85055/82, and European Patent 76,492; α-sulfonamidoketones as specifically described in Japanese Patent Application (OPI) Nos. 3819/78 and 48534/79 and European Patent 76,492; and the like.

Another group of substrates are so-called intramolecular assist type substrates which release a dye by an intramolecular nucleophilic attack after oxidation of Y, as described in Japanese Patent Application (OPI) Nos. 20735/82 and 65839/84.

Still another group of examples are those which release a dye through intramolecular cyclization under a basic condition but become substantially incapable of releasing a dye on oxidation of Y as specifically described in Japanese Patent Application (OPI) No. 63618/76. As a modification, substrates capable of releasing a dye upon ring reformation of an isoxazolone ring by the action of a nucleophilic reagent as specifically described in Japanese Patent Application (OPI) Nos. 111628/84 and 4819/77 are also useful.

A further group of substrates are those capable of releasing a dye moiety upon dissociation of an acidic proton under a basic condition but become substantially incapable of releasing a dye upon oxidation of Y as specifically described in Japanese Patent Application (OPI) Nos. 69033/78 and 130927/79.

On the other hand, examples of the substrates (Y) which change diffusibility of the dye providing substances upon reduction include the nitro compounds described in Japanese Patent Application (OPI) No. 110827/78 and the quinone compounds described in Japanese Patent Application (OPI) No. 110829/78 and U.S. Pat. Nos. 4,356,249 and 4,358,525. These compounds are reduced with a reducing agent that remains unconsumed during development processing (called an electron donor) and receive an intramolecular attack of a nucleophilic group resulting from the reduction thereby to release a dye. As a modification, quinone type substrates which release a dye moiety on dissociation of an acidic proton of a reduction product thereof as specifically described in Japanese Patent Application (OPI) Nos. 130927/79 and 164342/81 are also useful. Dye providing compounds having similar activity are described in Japanese Patent Application (OPI) Nos. 215270/87 and 244048/87, U.S. patent application Ser. No. 07/157,357, etc.

In the case when a substrate which changes diffusibility through reduction is utilized, it is essential to use an appropriate reducing agent (electron donor) which mediates between exposed silver halide and a dye providing substance. Specific examples of the reducing agent to be used are described in the above-cited references. Substances containing an electron donor in the substrate Y thereof (called LDA compounds) are also usable.

A typical structure of a film unit to be used for a wet or heat development color diffusion transfer process comprises a transparent support having provided thereon a laminate of an image-receiving element and a light-sensitive element. This film unit does not require peeling of a light-sensitive element from an image-receiving element after formation of a transfer image (non-peel type). More specifically, the image-receiving element comprises at least one mordant layer, and the light-sensitive element preferably comprises a combination of a blue-sensitive emulsion layer, a green-sensitive emulsion layer, and a red-sensitive emulsion layer, a combination of a green-sensitive emulsion layer, a red-sensitive emulsion layer, and an infrared-sensitive emulsion layer, or a combination of a blue-sensitive emulsion layer, a red-sensitive emulsion layer, and an infrared-sensitive emulsion layer, and with each of these emulsion layers is combined a yellow dye providing substance, a magenta dye providing substance, or a cyan dye providing substance. The terminology "infrared-sensitive emulsion layer" as used herein means an emulsion layer having sensitivity to light of 700 nm or more, and particularly 740 nm or more. Between the mordant layer and the light-sensitive layer or a layer containing the dye providing substance, a white reflecting layer containing a solid pigment, e.g., titanium dioxide, is provided so that a transfer image may be seen through the transparent support.

A light-shielding layer may be provided between the white reflecting layer and the light-sensitive layer so that development processing may be completed in a bright room. If desired, a release layer may be provided in an appropriate position so that a part or the whole of the light-sensitive element may be peeled apart from the image-receiving element. Such a structure is disclosed, e.g., in Japanese Patent Application (OPI) No. 67840/81 and Canadian Patent No. 674,082.

Another non-peel type film structure comprises a transparent support having provided thereon the above-described light-sensitive element, a white reflecting layer, and an image-receiving layer in this order. Structures having an image-receiving element, a white reflecting layer, a release layer, and a light-sensitive element on the same support, in which the light-sensitive element is intentionally peeled off from the image-receiving element, are described in U.S. Pat. No. 3,730,718.

On the other hand, typical film units comprising two different supports on which a light-sensitive element and an image-receiving element are separately provided, respectively, are classified into two large groups: one is a peel type, and another is a non-peel type. In some detail, a preferred structure of the peel type film unit is composed of a support having a light reflecting layer on its back side and at least one image-receiving layer on its surface side, and a support having a light-shielding layer having provided thereon a light-sensitive layer. Before light exposure, the light-sensitive layer and a mordant layer are not facing each other. After light exposure, e.g., during development processing, the light-sensitive element is reversed so that the light-sensitive layer and the image-receiving layer may be brought into contact. The light-sensitive element is stripped off from the image-receiving layer immediately after completion of transfer image formation in the mordant layer.

A preferred structure of a non-peel type film unit is composed of a transparent support having provided thereon at least one mordant layer, and a transparent support or a support having a light-shielding layer having provided thereon a light-sensitive element, the light-sensitive layer and the mordant layer contacting with each other.

Examples of the support which can be used include paper, plastic films, polyolefin-laminated paper, etc.

Any of the above-illustrated film unit structures is applicable to both a color diffusion transfer process and a heat development process. In the former process, the film unit may be combined with a container which contains an alkaline processing solution and is destroyable on pressure application (processing element). In a non-peel type film unit in which an image-receiving element and a light-sensitive element are laminated on the same support, the processing element is preferably provided between the light-sensitive element and a cover sheet thereon. In a film unit in which a light-sensitive element and an image-receiving element are formed on different supports, the processing element is preferably placed between the light-sensitive element and the image-receiving element before development processing at the latest. The processing element preferably contains a light-shielding agent (e.g., carbon black and dyes whose color changes with pH change) and/or a white pigment (e.g., titanium dioxide) according to the structure of the film unit. Further, in a film unit for color diffusion transfer process, a neutralization timing mechanism composed of a neutralizing layer and a neutralization timing layer is preferably incorporated into a cover sheet, an image-receiving element, or a light-sensitive element.

In a film unit according to a heat development process, a heat generating layer containing conductive particles, e.g., fine metal particles, carbon black, graphite, etc., may be provided in an appropriate position on the support, light-sensitive element, or image-receiving element so that Joule's heat generated on passing electricity for heat development or dye diffusion transfer may be utilized.

The present invention is now illustrated in greater detail with reference to Examples, but it should be understood that the present invention is not deemed to be limited thereto.

Unless otherwise specified, all percents, ratios, etc. are by weight.

In the following Examples 1, 2, and 3, the preparation of gelatin dispersions of the compounds of the present invention was carried out in the following manner.

10 g of the compound of formula (I) of the present invention and the polymer or oil as shown in each of Tables 1 and 3 were dissolved in 50 ml of ethyl acetate at 50° C. Separately, 5 g of gelatin and 0.5 g of sodium dodecylbenzenesulfonate were dissolved in 50 ml of water at 50° C. The both solutions were mixed and emulsified in an emulsifier (a homogenizer made by Nippon Seiki K.K.) at 15,000 rpm and at 20° C. The resulting emulsion was cooled at about 10° C. whereby it became in the half-set state. Thereafter, the emulsion was charged in a syringe having a hole diameter of 2 mm and extruded into water at about 10° C. (a noodle washing). One hour after the extrusion, the emulsions in the noodle state were gathered and again dissolved at 40° C., followed by storing in a refrigerator. The emulsions were appropriately used and applied at the coverage as shown in Tables 1 and 3.

In Examples 2 and 3, in the case that the relation in amount between the compound of formula (I) and the polymer or oil is different, the amounts of the starting materials were appropriately changed.

EXAMPLE 1

Preparation of Light-Sensitive Sheet

On a polyethylene terephthalate transparent support were coated the following layers in the order listed to prepare an integral light-sensitive sheet for a color diffusion transfer process.

(1) Mordant layer containing 3.0 g/m$^2$ of gelatin and 3.0 g/m$^2$ of a latex of a polymer having the following formula as a mordant.

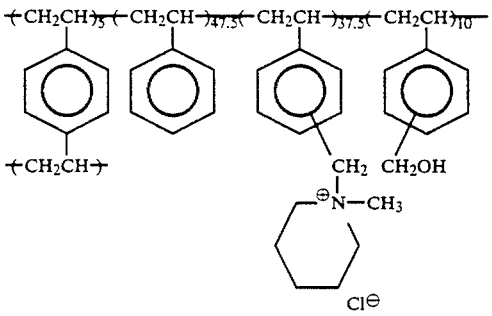

(2) White reflecting layer containing 20 g/m$^2$ of titanium dioxide and 2.0 g/m$^2$ of gelatin.

(3) Light-shielding layer containing 2.0 g/m$^2$ of carbon black and 1.5 g/m$^2$ of gelatin.

(4) Layer containing 0.44 g/m$^2$ of a cyan dye-releasing redox compound of formula:

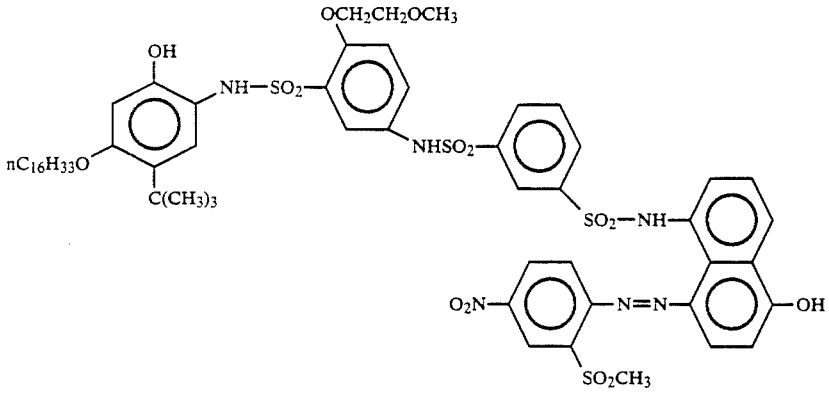

0.09 g/m$^2$of tricyclohexyl phosphate, 0.008 g/m$^2$ of 2,5-di-t-pentadecylhydroquinone, and 0.8 g/m$^2$ of gelatin.

(5) Layer containing 1.5 g/m$^2$ of titanium dioxide and 0.40 g/m$^2$ of gelatin.

(6) Red-sensitive emulsion layer containing a red-sensitive internal latent image type direct positive silver bromide emulsion (silver content: 1.03 g/m$^2$), 1.2 g/m$^2$ of gelatin, 0 04 g/m$^2$ of a nucleating agent of formula:

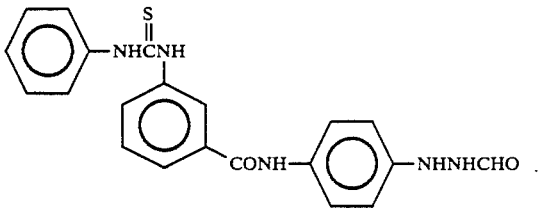

and 0.13 g/m$^2$ of sodium 2-sulfo-5-n-pentadecylhydroquinone.

(7) Layer containing 0.43 g/m$^2$ of 2,5-di-t-pentadecylhydroquinone, 0.1 g/m$^2$ of polymethyl methacrylate, and 0.4 g/m$^2$ of gelatin.

(8) Layer containing 0.3 g/m$^2$ of a magenta dye-releasing redox compound of formula:

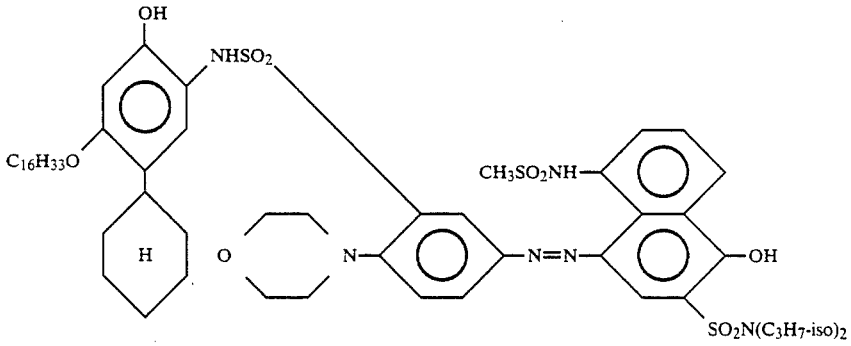

0.08 g/m$^2$ of tricyclohexyl phosphate, 0.009 g/m$^2$ of 2,5 di-pentadecylhydroquinone and 0.5 g/m$^2$ of gelatin.

(9) Layer containing 0.8 g/m$^2$ of titanium dioxide, 0.25 g/m$^2$ of gelatin, and the compound and the polymer or oil as shown in Table 1 below.

(10) Green-sensitive emulsion layer containing a green-sensitive internal latent image type direct positive silver bromide emulsion (silver content: 0.82 g/m$^2$), 0.9 g/m² of gelatin, 0.03 mg/m² of the same nucleating agent as used in Layer (6), and 0.08 g/m² of sodium 2-sulfo-5-n-pentadecylhydroquinone.

(11) Layer having the same composition as Layer (7).

(12) Layer containing 0.5 g/m² of a yellow dye-releasing redox compound of formula:

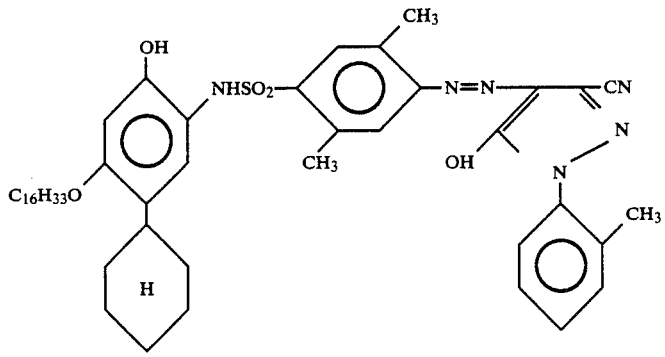

0.13 g/m² of tricyclohexyl phosphate, and 0.5 g/m² of gelatin.

(13) Layer containing 0.23 g/m² of gelatin.

(14) Blue-sensitive emulsion layer containing a blue-sensitive internal latent image type direct positive silver bromide emulsion (silver content: 1.09 g/m²), 1.1 g/m² of gelatin, 0.04 mg/m² of the same nucleating agent as used in Layer (6), and 0.07 g/m² of sodium 2-sulfo-5-n-pentadecylhydroquinone.

(15) Layer containing 0.55 g/m² of gelatin, $4.0\times10^{-4}$ mol/m² of each of ultraviolet absorbents A and B shown below, the compound and the polymer or oil as shown in Table 1, 0.05 g/m² of 2,5-di-t-pentadecylhydroquinone, and 0.10 g/m² of polymethyl methacrylate.

Ultraviolet Absorbent A:

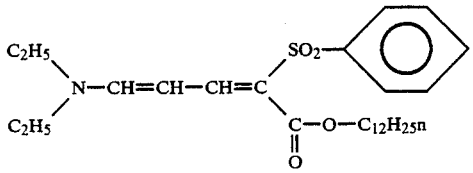

Ultraviolet Absorbent B:

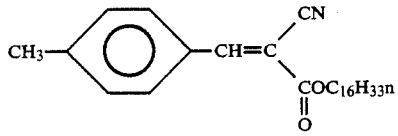

(16) Protective layer containing 0.10 g/m² of a polymethyl methacrylate latex (average particle size: 4 μm), 0.3 g/m² of gelatin, and 0.02 g/m² of triacryloyltriazine as a hardening agent.

Preparation of Cover Sheet

On a polyethylene terephthalate transparent support were coated the following layers in the order listed to prepare a cover sheet.

(1) Neutralizing layer containing 9.0 g/m² of an acrylic acid-butyl acrylate copolymer (8:2 by weight) having an average molecular weight of 50,000 and 0.18 g/m² of 1,4-bis(2,3-epoxypropoxy)butane.

(2) Second neutralization timing layer containing a 95/5 (by weight) mixture of cellulose acetate having a degree of acetylation of 51.0% and a methyl vinyl ether/monomethyl maleate alternating copolymer, and 0.825 mmol/m² of 1,3-bis[2-(1-phenyl-5-tetrazolylthio)ethylsulfonyl]-2-propanol.

(3) Auxiliary neutralizing layer containing 0.735 g/m² of a methyl vinyl ether/maleic anhydride alternating copolymer, 0.315 g/mz of a styrene/maleic acid alternating copolymer, and 0.45 g/m² of cellulose acetate having a degree of acetylation of 55.0%.

(4) First neutralization timing layer having a solid content of 2.5 g/m², formed by coating a 6:4 (solids basis) blend of a polymer latex obtained by emulsion polymerization of styrene/butyl acrylate/ acrylic acid/N-methylolacrylamide at a weight ratio of 49.7/42.3/4/4 and a polymer latex obtained by emulsion polymerization of methyl methacrylate/acrylic acid/N-methylolacrylamide at a weight ratio of 93/3/4.

| Processing Solution Formulation: | |
|---|---|
| 1-p-Tolyl-4-hydroxymethyl-4-methyl-3-pyrazolidone | 14.0 g |
| Sodium t-butylhydroquinonesulfonate | 0.3 g |
| 5-Methylbenzotriazole | 3.5 g |
| Anhydrous sodium sulfite | 0.2 g |
| Sodium carboxymethylcellulose | 58 g |
| Potassium hydroxide (28 wt % aqueous solution) | 200 ml |
| Benzyl alcohol | 1.5 ml |
| Carbon black | 150 g |
| Water | 685 ml |

Each of the resulting light-sensitive sheets was exposed to light through a continuous wedge, kept at 75° C. for 2 hours, and passed through a pair of pressure rollers to spread the above-described processing solution between the light-sensitive sheet and the cover sheet.

The minimum density of each sample was measured, and the results obtained are shown in Table 1.

In order to evaluate preservation stability of the light-sensitive sheet, each of the light-sensitive sheets was preserved at room temperature (fresh sample) or under accelerated aging conditions (at 45° C. and 80% RH for 3 days). Each of the samples was subjected to the same spreading processing as described above at 25° C., and the maximum density was measured. The results obtained are also shown in Table 1.

TABLE 1

| Sample No. | Layer (9) Compound | Layer (9) Polymer or Oil | Layer (15) Compound | Layer (15) Polymer or Oil | Dmin at 35° C. G | Dmin at 35° C. B | Dmax G 45° C. Fresh | Dmax G 45° C. × 80% × 3 Days | Dmax B 45° C. Fresh | Dmax B 45° C. × 80% × 3 Days | Remark |
|---|---|---|---|---|---|---|---|---|---|---|---|
| 1 | none | none | none | none | 0.33 | 0.35 | 2.18 | 1.98 | 1.90 | 1.87 | Comparison |
| 2 | Compound 11 0.040 g/m² | none | Compound 11 0.080 g/m² | none | 0.29 | 0.30 | 2.16 | 1.77 | 1.89 | 1.53 | " |
| 3 | Compound 11 0.040 g/m² | tri-cyclo-hexyl phosphate 0.040 g/m² | Compound 11 0.080 g/m² | tri-cyclo-hexyl phosphate 0.08 g/m² | 0.27 | 0.27 | 2.10 | 1.35 | 1.87 | 1.13 | " |
| 4 | Compound 11 0.040 g/m² | P-3 0.02 g/m² | Compound 11 0.080 g/m² | P-3 0.04 g/m² | 0.24 | 0.26 | 2.18 | 2.05 | 1.90 | 1.86 | Invention |
| 5 | Compound 11 0.040 g/m² | P-3 0.04 g/m² | Compound 11 0.080 g/m² | P-3 0.08 g/m² | 0.24 | 0.25 | 2.18 | 2.07 | 1.91 | 1.87 | " |
| 6 | Compound 11 0.040 g/m² | P-6 0.04 g/m² | Compound 11 0.080 g/m² | P-6 0.08 g/m² | 0.24 | 0.25 | 2.17 | 2.10 | 1.91 | 1.85 | " |
| 7 | Compound 11 0.040 g/m² | P-40 0.04 g/m² | Compound 11 0.080 g/m² | P-40 0.08 g/m² | 0.24 | 0.25 | 2.20 | 2.02 | 1.89 | 1.88 | " |
| 8 | Compound 27 0.040 g/m² | P-3 0.04 g/m² | Compound 27 0.080 g/m² | P-3 0.08 g/m² | 0.24 | 0.25 | 2.23 | 2.13 | 1.90 | 1.87 | " |

As can be seen from Table 1, the samples according to the present invention not only have low minimum density when processed at a high temperature but also exhibit excellent preservation stability before development, showing compatibility of activity of an antifoggant-releasing compound with preservation stability. In contrast, the comparative samples which were prepared by using tricyclohexyl phosphate as typical conventional solvent for an emulsifying dispersion, instead of the polymer of the present invention are insufficient in both performance properties.

EXAMPLE 2

On a black support were coated the following 1st to 11th layers in the order listed to prepare a light-sensitive element.

(1) Layer containing 0.36 mmol/m² of a cyan DRR compound of formula:

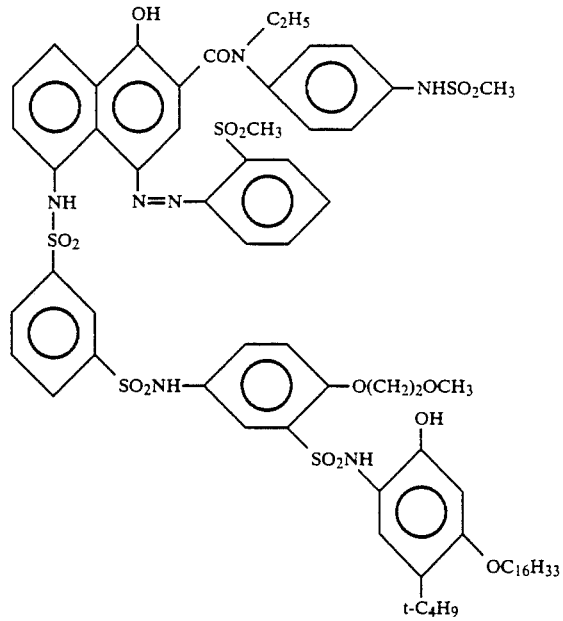

0.09 g/m² of tricyclohexyl phosphate, 0.01 g/m² of 2,5-di(t-pentadecyl)hydroquinone, and 0.44 g/m² of gelatin.

(2) Red-sensitive emulsion layer containing a red-sensitive internal latent image type direct reversal silver bromide emulsion (silver content: 0.5 g/m²), 0.78 g/m² of gelatin, 27 g/m² of a nucleating agent of formula:

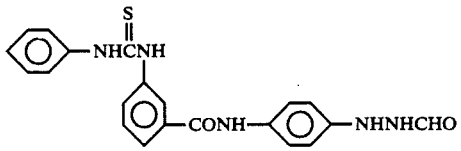

and 0.06 g/m² of sodium pentadecylhydroquinonesulfonate.

(3) Layer containing 0.71 g/m² of 2,5-di(t-pentadecyl)hydroquinone, 0.24 g/m² of a vinylpyrrolidone/vinyl acetate copolymer (7.3 by mol), and 0.4 g/m² of gelatin.

(4) Layer containing 0.3 g/m² of gelatin.

(5) Layer containing 0.49 g/m² of a magenta DRR compound of formula:

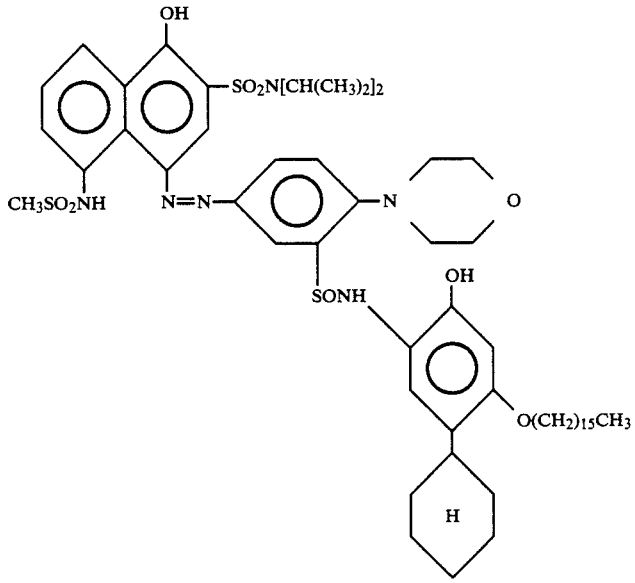

0.8 g of tricyclohexyl phosphate, 0.01 g/m² of 2,5-di(t-pentadecyl)hydroquinone, and 0.5 g/m² of gelatin.

(6) Green-sensitive emulsion layer containing a green-sensitive internal latent image type direct reversal silver bromide emulsion (silver content: 0.34 g/m²), 0.66 g/m² of gelatin, 12.9 μg/m² of the same nucleating agent as used in Layer (2), and 0.04 g/m² of sodium pentadecylhydroquinonesulfonate.

(7) Layer containing 0.71 g/m² of 2,5-di(t-pentadecyl)hydroquinone, 0.24 g/m² of a vinylpyrrolidone/vinyl acetate copolymer (7:3 by mol), and 0.4 g/m² of gelatin.

(8) Layer containing 0.25 g of gelatin.

(9) Layer containing 0.48 g/m² of a yellow DRR compound of formula:

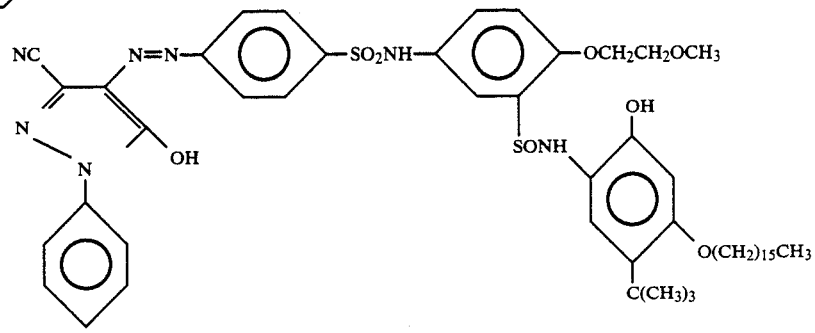

0.03 g/m² of tricyclohexyl phosphate, 0.004 g/m² of 2,5-di(t-pentadecyl)hydroquinone, and 0.43 g/m² of gelatin.

(10) Blue-sensitive emulsion layer containing a blue-sensitive internal latent image type direct reversal silver bromide emulsion (silver content: 0.84 g/m²), 0.9 g/m² of gelatin, 29 g/m² of the same nucleating agent as used in Layer (2), and 0.05 g/m² of sodium pentadecylhydroquinonesulfonate.

(11) Layer containing 1.0 g/m² of gelatin.

The Thus obtained light-sensitive element was designated as Sample 21.

Samples 22 and 23 were prepared in the same manner as for Sample 21, except that each of the red-sensitive, green-sensitive, and blue-sensitive emulsion layers further contained a dispersion having the following composition.

| | |
|---|---|
| Sample 22: | |
| Compound 71 (antifoggant) | 0.1 mmol/m² |
| Tricresyl phosphate | 0.01 g/m² |
| Sample 23: | |
| Compound 71 (antifoggant) | 0.1 mmol/m² |

-continued

| | |
|---|---|
| Polymer P-3 | 0.01 g/m$^2$ |

On a surface side of a white support having a carbon black layer and a titanium layer on the back side thereof in this order were coated the following 1st to 5th layers in the order listed to prepare a dye-receiving sheet.

(1) Layer containing 22 g/m$^2$ of an acrylic acid/butyl acrylate copolymer (80:20 by weight) and 0.44 g/m$^2$ of 1,4-bis(2,3-epoxypropoxy)butane.

(2) Layer containing 3.8 g/m$^2$ of acetyl cellulose (having such a degree of acetylation that a sample weighing 100 g produces 39.4 g of an acetyl group on hydrolysis), 0.2 g/m$^2$ of a styrene/maleic anhydride copolymer (60:40 by weight) having a molecular weight of about 50,000, and 0.115 g/m$^2$ of 5-(β-cyanoethylthio)-1-phenyltetrazole.

(3) Layer containing 2.5 g/m$^2$ of a vinylidene chloride/methyl acrylate/acrylic acid copolymer latex (85:12:3 by weight) and 0.05 g/m$^2$ of a polymethyl methacrylate latex (particle size: 1 to 3 μm).

(4) Mordant layer containing 3.0 g/m$^2$ of a mordant of formula:

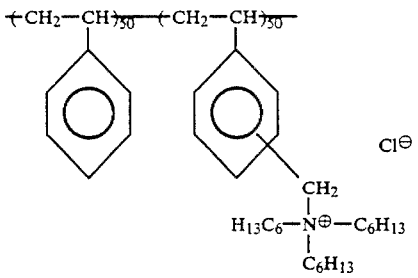

and 3.0 g/m$^2$ of gelatin.

(5) Layer containing 1 g/m$^2$ of phthalated gelatin.

In a destroyable container was charged 0.8 g of a processing solution having the following formulation.

| Processing Solution Formulation: | |
|---|---|
| Benzyl alcohol | 0.20 ml |
| 1-Phenyl-4-hydroxymethyl-4-methyl-3-pyrazolidinone | 0.3 g |
| Methylhydroquinone | 0.012 g |
| 5-Methylbenzotriazole | 0.6 g |
| Sodium sulfite | 0.18 g |
| Hydroxymethyl cellulose | 4 g |
| Potassium hydroxide (28 wt % aqueous solution) | 22.4 ml |
| Water | 67 ml |

Each of Samples 21 to 23 was exposed to light a wedge, and the processing solution was spread between the light-sensitive element and the dye-receiving sheet to a thickness of 60 μm. After allowing the sample to stand at 25° C. for 2 minutes, the dye-receiving sheet was stripped off to obtain a transfer dye image thereon.

The samples were evaluated for preservation stability before development in the same manner as in Example 1. The results of sensitometry are shown in Table 2. It can be seen from Table 2 that Sample 23 containing the antifoggant-releasing compound according to the present invention provides a transfer image suffering less fog and exhibits satisfactory preservability as compared with Sample 21 (comparative sample).

TABLE 2

| Sample No. | Dmin | | | Dmax Fresh | | | Dmax 45° C. × 80% RH × 3 Days | | |
|---|---|---|---|---|---|---|---|---|---|
| | B | G | R | B | G | R | B | G | R |
| 21 (Comparison) | 0.16 | 0.16 | 0.21 | 1.93 | 2.23 | 2.80 | 1.87 | 2.15 | 2.75 |
| 22 (Comparison) | 0.12 | 0.11 | 0.16 | 1.95 | 2.25 | 2.79 | 1.53 | 2.03 | 2.33 |
| 23 (Invention) | 0.11 | 0.10 | 0.15 | 1.91 | 2.21 | 2.78 | 1.88 | 2.13 | 2.77 |

EXAMPLE 3

The following layers were coated on a transparent polyethylene terephthalate support in the order listed to prepare a light-sensitive element.

(1) Dye-receiving layer containing 4.0 g/m$^2$ of copoly[styrene-N-vinylbenzyl-N,N,N-trihexylammonium] and 4.0 g/m$^2$ of gelatin.

(2) White reflecting layer containing 22 g/m$^2$ of titanium dioxide and 2.2 g/m$^2$ of gelatin.

(3) Opaque layer containing 2.7 g/m$^2$ of carbon black and 2.7 g/m$^2$ of gelatin.

(4) Yellow dye-providing layer containing (a) a gelatin dispersion comprising 0.5 mmol/m$^2$ of a yellow dye-providing Compound 1, 0.6 mmol/m$^2$ of Compound S-11, and the oil or polymer shown in Table 3, and (b) 1.1 g/m$^2$ [inclusive of gelatin of (a) above] of gelatin.

(5) Blue-sensitive emulsion layer containing (a) 0.5 g/m$^2$ of a blue-sensitive silver iodobromide emulsion and (b) 1.1 g/m$^2$ [inclusive of gelatin in (a) above] of gelatin.

(6) Protective layer containing 0.9 g/m$^2$ of a polymethyl methacrylate latex (average particle size: 4 μm), 0.4 mmol/m$^2$ each of the same ultraviolet absorbents as used in Samples 1 to 8 of Example 1 (Ultraviolet Absorbents A and B), 0.15 g/m$^2$ of bisvinylsulfonyl methyl ether as hardening agent, and 1.3 g/m$^2$ of gelatin.

On a transparent polyethylene terephthalate film were coated the following layers in the order listed to prepare a cover sheet.

(1) Acid neutralizing layer containing 17 g/m$^2$ of polyacrylic acid, 0.06 g/m$^2$ of N-hydroxysuccinimide benzenesulfonate, and 0.5 g/m$^2$ of ethylene glycol.

(2) Timing layer (thickness: 2 μm) comprising cellulose acetate having a degree of acetylation of 54%.

(3) Timing layer (thickness: 4 μm) comprising a vinylidene chloride/acrylic acid copolymer latex.

A processing solution having the following formulation was prepared.

| Processing Solution Formulation: | |
|---|---|
| Potassium hydroxide | 48 g |
| 4-Hydroxymethyl-4-methyl-1-p-tolyl-3-pyrazolidinone | 10 g |
| 5-Methylbenzotriazole | 2.5 g |
| Sodium sulfite | 1.5 g |
| Potassium bromide | 1 g |
| Benzyl alcohol | 1.5 ml |
| Carboxymethyl cellulose | 6.1 g |
| Carbon black | 150 g |

-continued

| Processing Solution Formulation: | |
|---|---|
| Water to make | 1 liter |

Each of the resulting light-sensitive elements was exposed to light through a wedge and brought into contact with the cover sheet. The samples were passed through a pair of parallel rollers to spread the processing solution between the light-sensitive element and the cover sheet to a thickness of 80 μm.

Each of the samples was evaluated for preservation stability in the same manner as in Example 1.

After 1 hour from the processing, the samples were sub to sensitometry, and the results obtained are shown in Table 3.

TABLE 3

| Sample | | Fresh | | 45° C. × 80% RH × 3 Days | |
|---|---|---|---|---|---|
| No. | Oil or Polymer | Dmax | Dmin | Dmax | Dmin |
| 31 (Comparison) | N,N-diethyllauryl-amide | 1.78 | 0.30 | 1.75 | 0.43 |
| 32 (Invention) | Polymer P-3 | 1.76 | 0.28 | 1.75 | 0.30 |

As is apparent from Table 3, the sample according the present invention wherein the dye-providing compound is copresent with the polymer exhibits not only a low minimum density but suffers little increase of minimum density during preservation. The higher minimum densities of the comparative sample seem to be due to partial release of the dye-providing compound during preservation under high temperature and high humidity conditions. It is considered, therefore, that the dye-providing compound in the comparative sample undergoes reaction with the coexisting reducing agent during preservation.

EXAMPLE 4

A mixed aqueous solution of potassium bromide and sodium chloride and an aqueous solution of silver nitrate were added simultaneously to a gelatin aqueous solution containing 0.07 g of 3,4-dimethyl-1,3-thiazolin-2-thione per mol of silver while vigorously stirring at 65° C. over a period of about 14 minutes to prepare a monodispersed silver chlorobromide emulsion having a mean grain size of about 0.23 μm (silver bromide content: 80 mol %). To the emulsion were added 61 mg of sodium thiosulfate and 42 mg of chloroauric acid tetrahydrate per mol of silver, followed by heating at 65° C. for 60 minutes to effect chemical sensitization. The resulting silver chlorobromide grains were allowed to grow under the same precipitation environment as described above to finally obtain a monodispersed core/-shell silver chlorobromide emulsion having a mean grain size of about 0.65 μm (silver bromide content: 70 mol %). The coefficient of variation of grain size was about 12%. To the emulsion were added 1.5 mg of sodium thiosulfate and 1.5 mg of chloroauric acid tetrahydrate per mol of silver, followed by heating at 60° C. for 60 minutes to effect chemical sensitization to obtain an internal latent image type silver halide emulsion C-1.

A multi-layer color light-sensitive material was prepared using the thus prepared silver halide emulsion C-1 in accordance with the following layer structure.

| | | |
|---|---|---|
| **E9 Layer (Protective Layer; Uppermost Layer):** | | |
| Gelatin | 1.28 | $g/m^2$ |
| Acryl-modified polyvinyl alcohol (degree of modification: 17%) | 0.17 | $g/m^2$ |
| Liquid paraffin | 0.03 | $g/m^2$ |
| Polymethyl methacrylate latex (average particle size: 2.8 μm) | 0.05 | $g/m^2$ |
| **E8 Layer (Ultraviolet Absorbing Layer):** | | |
| Gelatin | 0.54 | $g/m^2$ |
| Ultraviolet absorbent (ExUV-2) | 0.21 | $g/m^2$ |
| Solvent (ExS-4) | 0.08 | $g/m^2$ |
| **E7 Layer (Blue-Sensitive Emulsion Layer):** | | |
| Silver halide emulsion (C-1) | 0.40 | $g\text{-}Ag/m^2$ |
| Spectral sensitizing dye (ExSS-4) | $4.2 \times 10^{-4}$ | mol/mol-Ag |
| Gelatin | 2.17 | $g/m^2$ |
| Yellow coupler (ExYC-1) | 0.51 | $g/m^2$ |
| Solvent (ExS-2) | 0.20 | $g/m^2$ |
| Solvent (ExS-4) | 0.20 | $g/m^2$ |
| Development regulator (ExGC-1) | 0.06 | $g/m^2$ |
| Stabilizer (ExA-1) | 0.001 | $g/m^2$ |
| Nucleation accelerator (ExZS-1) | $5.0 \times 10^{-4}$ | $g/m^2$ |
| Nucleating agent (ExZK-1) | $1.2 \times 10^{-6}$ | $g/m^2$ |
| **E6 Layer (Intermediate Layer):** | | |
| Gelatin | 0.47 | $g/m^2$ |
| Color mixing inhibitor (ExKB-1) | 0.03 | $g/m^2$ |
| Solvent (ExS-1) | 0.03 | $g/m^2$ |
| Solvent (ExS-2) | 0.03 | $g/m^2$ |
| **E5 Layer (Yellow Filter Layer):** | | |
| Colloidal silver | 0.09 | $g/m^2$ |
| Gelatin | 0.49 | $g/m^2$ |
| Color mixing inhibitor (ExKB-1) | 0.03 | $g/m^2$ |
| Solvent (ExS-1) | 0.03 | $g/m^2$ |
| Solvent (ExS-2) | 0.03 | $g/m^2$ |
| **E4 Layer (Intermediate Layer):** | | |
| The same as E6 Layer. | | |
| **E3 Layer (Green-Sensitive Emulsion Layer):** | | |
| Silver halide emulsion (C-1) | 0.23 | $g\text{-}Ag/m^2$ |
| Spectral sensitizing dye (ExSS-3) | $3.0 \times 10^{-4}$ | mol/mol-Ag |
| Gelatin | 1.05 | $g/m^2$ |
| Magenta coupler (ExMC-1) | 0.16 | $g/m^2$ |
| Dye image stabilizer (ExSA-1) | 0.20 | $g/m^2$ |
| Solvent (ExS-3) | 0.25 | $g/m^2$ |
| Development regulator (ExGC-1) | 0.02 | $g/m^2$ |
| Stabilizer (ExA-1) | 0.006 | $g/m^2$ |
| Nucleation accelerator (ExZS-1) | $2.7 \times 10^{-4}$ | $g/m^2$ |
| Nucleating agent (ExZK-1) | $1.4 \times 10^{-5}$ | $g/m^2$ |
| **E2 Layer (Intermediate Layer):** | | |
| Gelatin | 1.41 | $g/m^2$ |
| Color mixing inhibitor (ExKB-1) | 0.09 | $g/m^2$ |
| Solvent (ExS-1) | 0.10 | $g/m^2$ |
| Solvent (ExS-2) | 0.10 | $g/m^2$ |
| **E1 Layer (Red-Sensitive Emulsion Layer):** | | |
| Silver halide emulsion (C-1) | 0.26 | $g\text{-}Ag/m^2$ |
| Spectral sensitizing dye (ExSS-1) | $1.0 \times 10^{-4}$ | mol/mol-Ag |
| Spectral sensitizing dye (ExSS-2) | $6.1 \times 10^{-5}$ | mol/mol-Ag |
| Gelatin | 1.11 | $g/m^2$ |
| Cyan coupler (ExCC-1) | 0.21 | $g/m^2$ |
| Cyan coupler (ExCC-2) | 0.26 | $g/m^2$ |
| Ultraviolet absorbent (ExUV-1) | 0.17 | $g/m^2$ |
| Solvent (ExS-1) | 0.23 | $g/m^2$ |
| Development regulator (ExGC-1) | 0.02 | $g/m^2$ |
| Stabilizer (ExA-1) | 0.006 | $g/m^2$ |
| Nucleation accelerator (ExZS-1) | $3.0 \times 10^{-4}$ | $g/m^2$ |
| Nucleating agent (ExZK-1) | $8.0 \times 10^{-6}$ | $g/m^2$ |
| **Support:** | | |
| Polyethylene-laminated paper containing titanium dioxide and ultramarine on the side of E1 layer. | | |
| **B1 Layer (Backing Layer):** | | |
| Gelatin | 8.70 | $g/m^2$ |
| **B2 Layer (Protective Layer):** | | |
| The same as E9 Layer. | | |

Each of the above-described layers further contained a gelatin hardening agent (ExGK-1) and a surface active agent.

The compounds used in the preparation of the sample are as follows.

Cyan Coupler (ExCC-1):
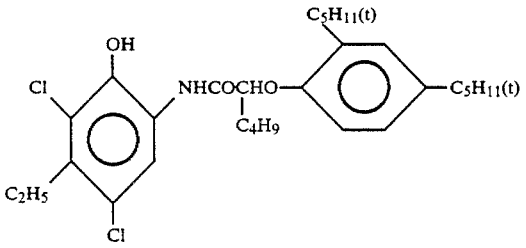
Cyan Coupler (ExCC-2):
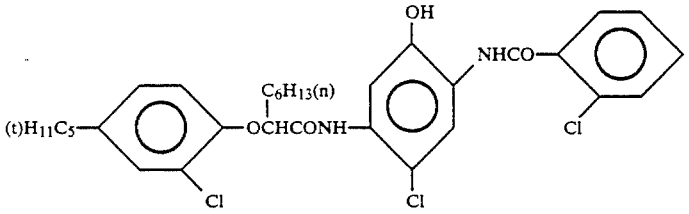
Magenta Coupler (ExMC-1):
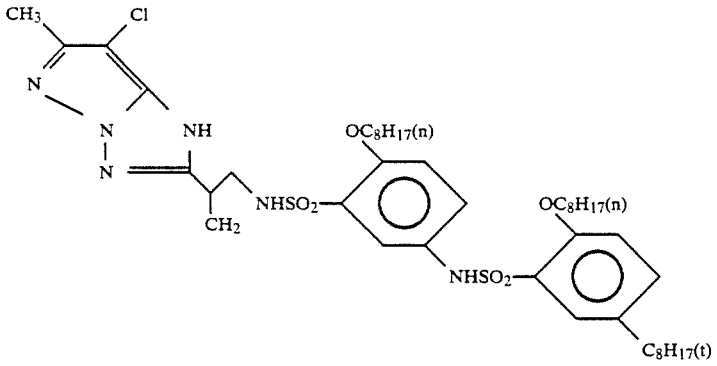
Yellow Coupler (ExYC-1):
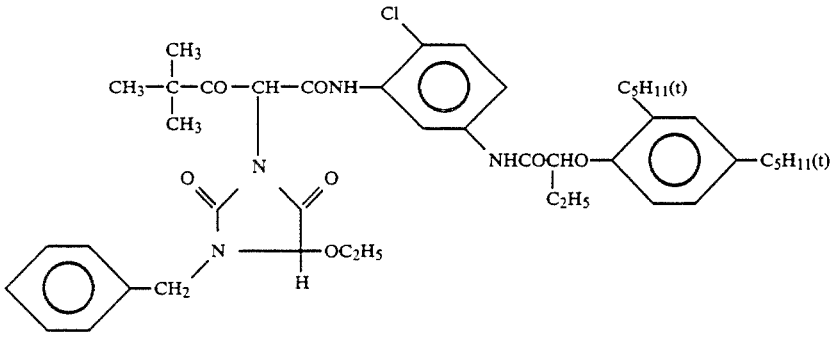
Spectral Sensitizing Dye (ExSS-1):
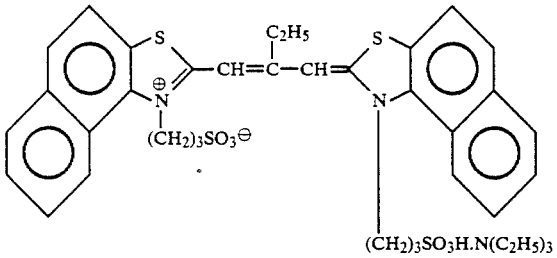
Spectral Sensitizing Dye (ExSS-2):

-continued
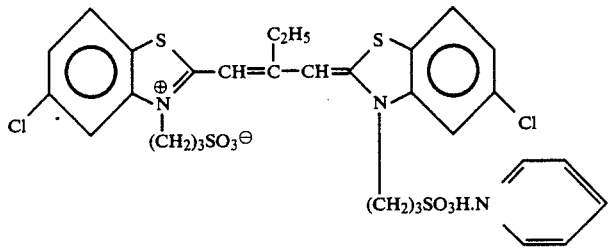
Spectral Sensitizing Dye (ExSS-3):
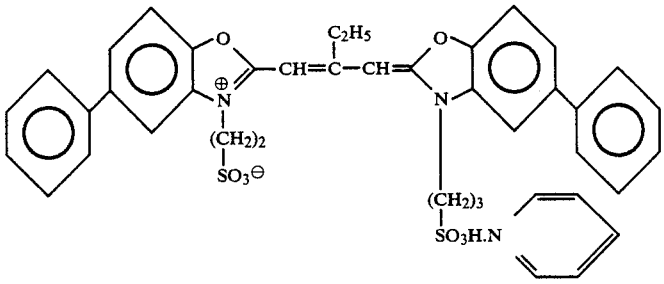
Spectral Sensitizing Dye (ExSS-4):
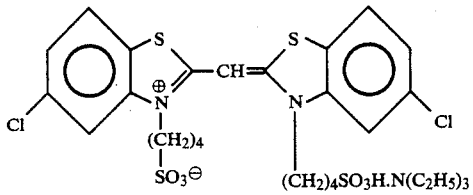
Solvent (ExS-1):
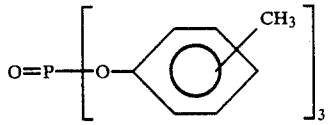
Solvent (ExS-2):
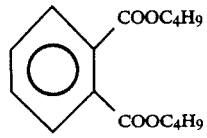
Solvent (ExS-3):
1:1 (by volume mixture of
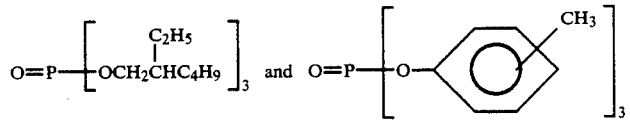
Solvent (ExS-4):
$O{-}P{\leftarrow}O{-}C_9H_{19}(iso))_3$
Ultraviolet Absorbent (ExUV-1):
A 5:8:9 (by weight) mixture of (1), (2), and (3).

-continued (1)

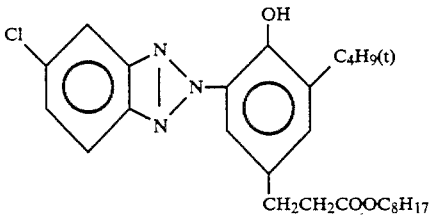

(2)

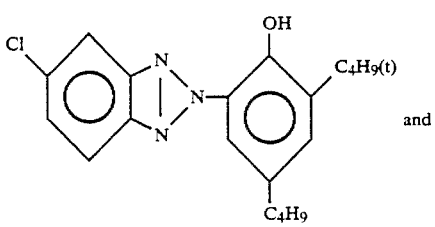

and (3)

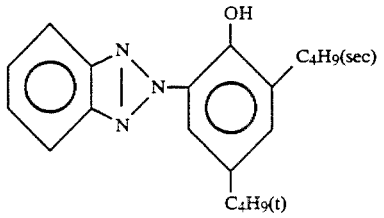

Ultraviolet Absorbent (ExUV-2):
A 2:9:8 (by weight) mixture of (1), (2), and (3).
Dye Image Stabilizer (ExSA-1):

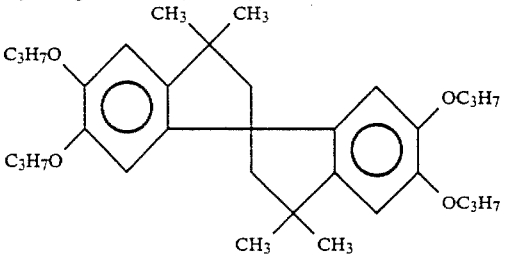

Color Mixing Inhibitor (ExKB-1):

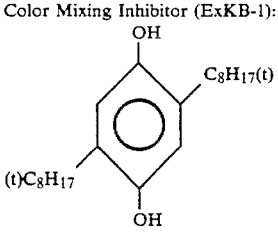

Development Regulator (ExGC-1):

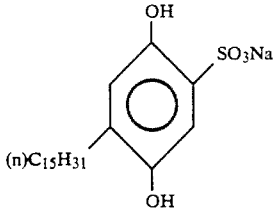

Stabilizer (ExA-1):
4-Hydroxy-5,6-trimethylene-1,3,3a,7-tetraazaindene
Nucleation Accelerator (ExZS-1):
2-(3-Dimethylaminopropylthio)-5-mercapto-1,3,4-thiadiazole hydrochloride
Nucleating Agent (ExZK-1):
6-Ethoxythiocarbonylamino-2-methyl-1-propargylquinolinium trifluoromethanesulfonate
Gelatin Hardening Agent (ExGK-1):

-continued

Sodium 1-hydroxy-3,5-dichloro-s-triazine

The thus prepared light-sensitive material was designated as Sample 41.

Sample 42 was prepared in the same manner as for Sample 41, except that the E1 layer further contained Dispersion A prepared as follows.

| Dispersion A: | | |
|---|---|---|
| Solution I: | Compound 71 | 5.0 g |
| | Polymer P-3 | 5.0 g |
| | Ethyl acetate | 30 ml |
| Solution II: | 10 wt % gelatin aqueous solution | 60 g |
| | Sodium dodecylbenzenesulfonate | 0.5 g |

Solutions I and II were mixed, and the mixture was emulsified in a homogenizer at 15,000 rpm for 5 minutes. Dispersion A was added to E1 Layer in an amount of 0.1 mmol/m$^2$ on conversion to Compound 71.

Each of Samples 41 and 42 was processed according to the following procedure.

| | Processing Step: Time | Temperature |
|---|---|---|
| Color Development | 80 sec. | 38 ° C. |
| Bleach-Fix | 30 sec. | 38 ° C. |
| Washing (1) | 30 sec. | 38 ° C. |
| Washing (2) | 30 sec. | 38 ° C. |

The washing was carried out according to a counter-current replenishment system in which a replenisher was fed to a washing bath (2), and the overflow from the washing bath (2) was forwarded to a washing bath (1).

| Color Developing Solution Formulation: | |
|---|---|
| Diethylenetriaminepentaacetic acid | 0.5 g |
| 1-Hydroxyethylidene-1,1-diphosphonic acid | 0.5 g |
| Diethylene glycol | 8.0 g |
| Benzyl alcohol | 10.0 g |
| Sodium bromide | 0.5 g |
| Sodium chloride | 0.7 g |
| Sodium sulfite | 2.0 g |
| N,N-Diethylhydroxylamine | 3.5 g |
| 3-Methyl-4-amino-N-ethyl-N-(β-methanesulfonamidoethyl)aniline | 6.0 g |
| Potassium carbonate | 30.0 g |
| Fluorescent brightening agent (stilbene type) | 1.0 g |
| Pure water to make | 1 l |
| pH | 10.50 |
| Bleach-Fix Bath Formulation: | |
| Ammonium thiosulfate | 110 g |
| Sodium hydrogensulfite | 10 g |
| Ammonium (ethylenediaminetetra-acetate) iron (III) dihydrate | 40 g |
| Disodium ethyenediaminetetra-acetate dihydrate | 5 g |
| 2-Mercapto-1,3,4-triazole | 0.5 g |
| Pure water to make | 1 l |
| pH (adjusted with aqueous ammonia or hydrochloric acid) | 7.0 |
| Washing Water: | |
| Pure water | |

The term "pure water" as used herein means tap water from which all cations other than a hydrogen ion and all anions other than a hydroxyl ion had been removed to a concentration of 1 ppm or less.

$D_R$ density of the thus processed sample was measured by means of a color densitometer, and the results obtained are shown in Table 4 below.

TABLE 4

| Sample No. | Fresh Dmax | Fresh Dmin | 45° C. × 80% RH × 3 Days Dmax | 45° C. × 80% RH × 3 Days Dmin | Remarks |
|---|---|---|---|---|---|
| 41 | 2.57 | 0.14 | 2.07 | 0.13 | Comparison |
| 42 | 2.59 | 0.10 | 2.10 | 0.10 | Invention |

It can be seen from Table 4 that the light-sensitive material according to the present invention has a markedly low minimum density and exhibits no bad preservability before development processing.

While the invention has been described in detail and with reference to specific embodiments thereof, it will be apparent to one skilled in the art that various changes and modifications can be made therein without departing from the spirit and scope thereof.

What is claimed is:

1. A photographic light-sensitive material comprising a support having provided thereon at least one silver halide emulsion layer, wherein said light-sensitive material contains (1) a compound represented by formula (I)

PWR—Time—$_t$PUG wherein PWR represents a group capable of releasing (Time—$_t$PUG upon being reduced; PUG represents a photographically useful group; Time represents a group capable of releasing PUG through a reaction subsequent to the release from FWR in the form of —Time—$_t$PUG; and t represents 0 or 1, and (2) a polymer comprising at least 10 repeating units derived from the same monomer and having a molecular weight of 100 or more.

2. A photographic light-sensitive material as claimed in claim 1, wherein said compound is represented by formula (II):

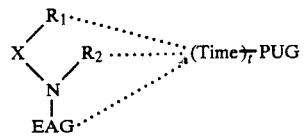

(II)

wherein X represents an oxygen atom, a sulfur atom or a nitrogen containing group of formula —N($R_3$)—; $R_1$, $R_2$, and $R_3$ each represents a mere bond or a group other than a hydrogen atom; EAG represents an electron accepting group; or $R_1$, $R_2$, $R_3$, and EAG are connected to each other to form a ring; Time represents a group capable of releasing PUG upon cleavage of the N—X bond through a reaction subsequent to the release from the rest of the compound in the form of —Time—$_t$PUG; PUG and t are as defined in claim 1; when t is 0, Time represents a mere bond; and the dotted lines represent possible bonds, provided that at least one dotted line is a bond.

3. A photographic light-sensitive material as claimed in claim 2, wherein said compound is represented by formula (III):

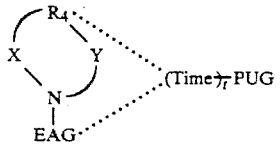

(III)

wherein Y represents a divalent linking group; and $R_4$ represents an atom group forming a 5- to 8-membered nitrogen-containing monocyclic or condensed heterocyclic ring together with X and Y; and X, EAG, Time, t, PUG, and the dotted lines are as defined in claim 2.

4. A photographic light-sensitive material as claimed in claim 3, wherein X is an oxygen atom.

5. A photographic light-sensitive material as claimed in claim 3, wherein Y is

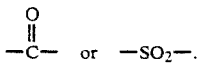

6. A photographic light-sensitive material as claimed in claim 3, wherein EAG is a group represented by formula (A):

(A)

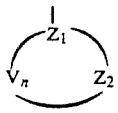

wherein $Z_1$ represents

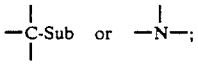

$V_n$ represents an atom group forming a 3- to 8-membered aromatic ring together with $Z_1$ and $Z_2$; and n represents an integer of from 3 to 8, and $V_3$ is $—Z_3—$, $V_4$ is $—Z_3—Z_4—$, $V_5$ is $—Z_3—Z_4Z_5—$, $V_6$ is $—Z_3—Z_4—Z_5—Z_6—$, $V_7$ is $—Z_3—Z_4—Z_5—Z_6—Z_7—$, $V_8$ is $—Z_3Z_4—Z_5Z_6—Z_7—Z_8—$; $Z_2$, $Z_3$, $Z_4$, $Z_5$, $Z_6$, $Z_7$, and $Z_8$ each represents

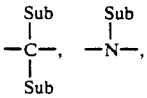

—O—, —S— or $—SO_2—$; and Sub represents a mere bond (π-bond), a hydrogen atom or a substituent, provided that when more than one Sub is present, each is the same or different, or they are connected to each other to form a 3 to 8-membered saturated or unsaturated carbon ring or heterocyclic ring.

7. A photographic light-sensitive material as claimed in claim 6, wherein Sub is selected so that a sum of Hammett's sigma constant and Hammett's para values is at least +0.50.

* * * * *